US006292263B1

(12) United States Patent
Norita et al.

(10) Patent No.: US 6,292,263 B1
(45) Date of Patent: Sep. 18, 2001

(54) THREE-DIMENSIONAL MEASURING APPARATUS

(75) Inventors: Toshio Norita, Osaka; Hiroshi Uchino, Kyoto, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/251,456

(22) Filed: Feb. 17, 1999

(30) Foreign Application Priority Data

| Feb. 18, 1998 | (JP) | 10-035665 |
| Feb. 24, 1998 | (JP) | 10-041744 |
| Feb. 27, 1998 | (JP) | 10-046657 |
| Feb. 27, 1998 | (JP) | 10-046658 |
| Mar. 6, 1998 | (JP) | 10-055187 |
| Mar. 6, 1998 | (JP) | 10-055188 |

(51) Int. Cl.[7] ......................... G01B 11/24; G01B 11/14; G01N 21/86
(52) U.S. Cl. ................... 356/376; 356/375; 250/559.22
(58) Field of Search .................. 356/375, 376; 250/559.22

(56) References Cited

U.S. PATENT DOCUMENTS 5,668,631   9/1997   Norita et al. .

FOREIGN PATENT DOCUMENTS

| 62-63804 | 3/1987 | (JP) . |
| 3-209112 | 9/1991 | (JP) . |
| 4-83133 | 3/1992 | (JP) . |

*Primary Examiner*—Frank G. Font
*Assistant Examiner*—Amanda Merlino
(74) *Attorney, Agent, or Firm*—McDermott, Will & Emery

(57) ABSTRACT

A 3D measuring apparatus is disclosed, in which a light beam is projected in such a manner as to raster scan toward a virtual surface. Specific data corresponding to the angle of incidence of the light beam is output, which light beam is reflected from an object of measurement at the time point of passing through each of a plurality of sampling sections into which the virtual surface is segmented in the main scanning direction X and the subsidiary scanning direction Y. With the position data Xg in the main scanning direction and the position data Yg in the subsidiary scanning direction for each sampling section as an address, the specific data are written in a memory. Also, the incident light beam is received by a photo-electric conversion device of one-dimensional position detection type, and the optical image of the object is compressed unidirectionally and formed on the photo-detection surface of the photo-electric conversion device.

6 Claims, 45 Drawing Sheets

Fig. 4
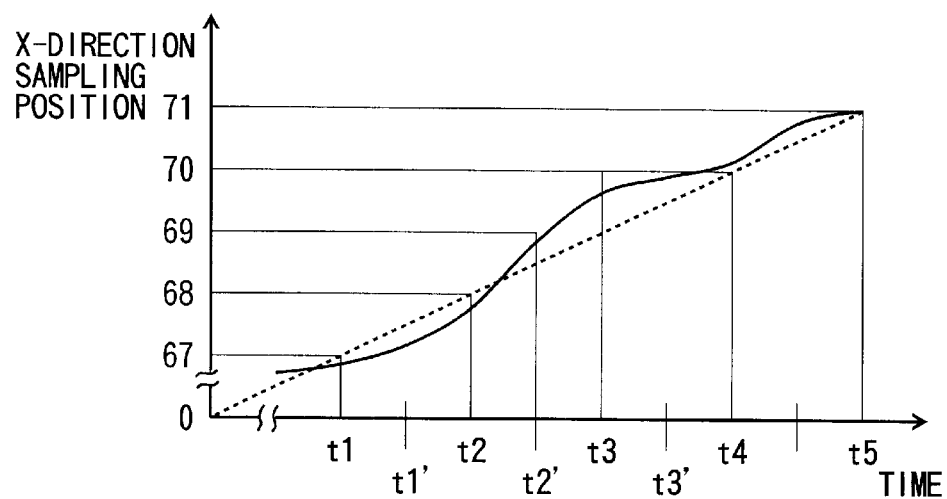
[ONE SAMPLING PER PIXEL]
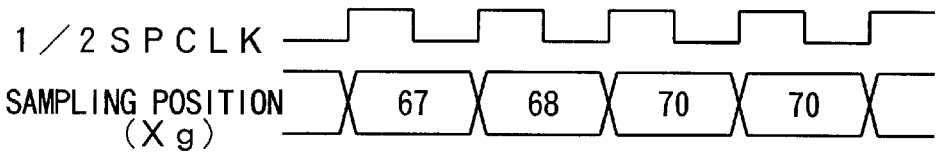
[TWO SAMPLINGS PER PIXEL]
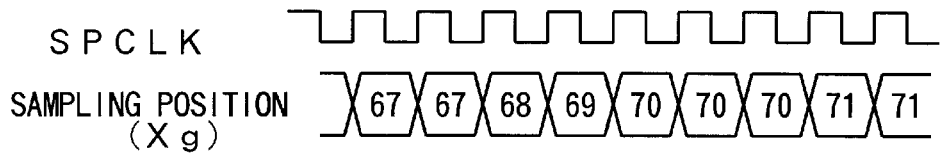

EFFECTIVE SCANNING RANGE FOR WIDE

EFFECTIVE SCANNING RANGE FOR TELE

THREE-DIMENSIONAL MEASURING APPARATUS

BACKGROUND OF THE INVENTION

This application is based on Japanese Patent Application No. 35665/1998 filed on Feb. 18, 1998, 41744/1998 filed on Feb. 24, 1998, 46657/1998 filed on Feb. 27, 1998, 46658/1998 filed on Feb. 27, 1998, 55187/1998 filed on Mar. 6, 1998, and 55188/1998 filed on Mar. 6, 1998, the contents of which are incorporated herein by reference.

1. Field of the Invention

The present invention relates to a three-dimensional (3D) measuring apparatus for measuring the profile of an object in a non-contact way by projecting a light beam on the object.

2. Description of the prior art

A non-contact type 3D measuring apparatus (3D camera) called a range finder is capable of high-speed measurement as compared with the contact-type version and therefore finds such applications as data input into a CG system or a CAD system, the human body measurement and visual recognition of a robot.

A well-known measuring method suitable for the range finder is a light projection method. According to this method, an object is optically scanned to produce a distance image (3D image) based on the principle of trigonometry. This method is a kind of an active measuring method for raster scanning of an object by projecting a beam-like reference light. The raster scanning is divided into a method in which the main scanning is carried out unidirectionally from left to right, for example, and a method in which the scanning from left to right is alternated with the scanning in reverse direction (reciprocal main scanning). The distance image is a mass of pixels indicating three-dimensional positions of a plurality of points on the object. The calculation for determining a distance image from the pickup information is carried by a range finder or an external information processing system such as a computer system.

Generally, the measurement information obtained by the range finder is input to the information processing system on-line or off-line using a storage medium and subjected to a predetermined processing such as analysis, change, storage, and display.

The range finder is possibly used for displaying a distance image with a display unit connected thereto or as a 3D video camera for displaying on the monitor the position and profile change of a moving object by repeating the measurements. In such a case, the distance image or the one-frame measurement data constituting the base of forming the distance image is temporarily stored in a memory, and required to be read out in each frame period of display. In the process, the memory is controlled by simply writing the data in the order of generation sequentially at a predetermined sampling period concurrently with the raster scanning. An address pointer is incremented at sampling periods.

Such a method of memory control, however, requires rearrangement (rewrite) or the read address control to meet the line-by-line display requirement. Especially for improving the measurement rate in reciprocal main scanning, the address designation for read operation is complicated.

The reference light reflected on the object enters the photo-detection surface of a photo-electric conversion element. The spot position on the photo-detection surface corresponds to the angle of incidence, and therefore the distance from the object can be calculated by detecting the spot position.

In the prior art, in order to receive the light reflected from each position in the scanning range, a 2D image pickup device such as a CCD area sensor or a PSD (position sensing-type photo-detector) or a pseudo-2D photo-detection surface is formed by use of an arrangement of a plurality of 1D pickup devices.

As described above, in the 3D measurement in which the light beam is projected, the larger the photo-detection surface for photo-electric conversion, the lower the S/N ratio of the detection signal. This is because the percentage that the spot represents of the photo-detection surface is reduced. For some devices, the response speed is also decreased with the increase in the photo-detection surface area.

On the other hand, a look-up table method is useful for distance calculation. Specifically, the distance data for various angles of incidence are determined using a calculation formula based on the specifications including the focal distance of the photo-detection lens or the relative positions of the projection side and the light-detection side, and the data thus obtained are stored in memory. The address of the memory is designated by the output of the photo-detection device indicating the angle of incidence and thus the desired distance data are read out. The distance data can alternatively be calculated by arithmetic operation instead of using the look-up table (LUT).

The provision of the zooming function to the range finder increases the freedom of framing for determining the scanning range. Also, it is convenient if measurement is possible from a point either far or near from the object.

The zooming function, however, changes the focal length of the photo-detection lens which is one of the measurement conditions. Specifically, the value of the coefficient in the calculation formula of the distance data is changed. When obtaining the distance data by LUT, therefore, the LUT is required for each of various focal lengths. This poses the problem of a large-capacity memory required for storing as many LUTs as the zooming stages. The larger the required memory capacity is, the higher the resolution of measurement.

Also, in the measurement by raster scan with a light beam described above, the time required for measurement is determined by the rate of main scanning. The subsidiary scanning can be slower than the main scanning. A higher speed of measurement is desirable. Especially, for a moving object, measurement is required to be repeated at shorter intervals of time. However, the speed of the mechanism for deflecting the light beam (such as a galvanometer mirror) has its own upper limit.

The provision of the zooming function in the range finder for changing the angle of visibility for light detection, on the other hand, improves the freedom of framing for determining the scanning range (the visual field). Also, it is convenient if the measurement of a predetermined resolution is possible from a point either far or near from the object of measurement.

Also, a method using a slit light as a reference light ray (sometimes called the light cut-off method) is widely known. In this method, a slit-like reference light of a length corresponding to the main scanning range is projected for linear scanning. As compared with the spot scanning by projecting a beam-like reference light, therefore, the scanning time per frame is shorter.

As described above, the PSD is sometimes used in place of an ordinary CCD image sensor as a photo-electric conversion device. Specifically, in this method, a pseudo-2D photo-detection surface is formed by arranging a multiplicity (for example, 128) of 1D PSDs having a band-shaped photo-detection surface along the direction of main scanning. Each PSD outputs an analog signal corresponding to the position of the light entering the band-shaped photo-detection surface thereof. The use of the PSD which eliminates the use of the charge accumulation permits higher-speed scanning than the CCD. At the same time, the resolution in the direction of subsidiary scanning is remarkably improved (improved infinitely theoretically).

With the above-mentioned measurement with the PSD array, however, the resolution in the direction of main scanning is defined by the number of lines in which the PDSs are arranged. The higher the number of PDSs arranged, the higher the cost. Also, the head amplifier is required for each PSD, and therefore the number of PSDs that can be arranged on a predetermined size of the circuit is limited.

SUMMARY OF THE INVENTION

The present invention has been developed in view of the above-mentioned problems, and an object thereof is to store data at positions in the visual field of measurement and positions in the memory space constituting a virtual screen corresponding to each other and to simplify the control operation of a memory.

According to a preferred embodiment of the invention, there is provided a 3D measuring apparatus in which a light beam is projected in such a manner as to raster scan toward a virtual surface and specific data are output corresponding to the angle of incidence of the light beam reflected on an object of measurement at the time point when the light beam passes through each of subdivision sampling sections (periods) of the virtual surface in the directions of main scanning and subsidiary scanning. The 3D measuring apparatus comprises a memory for storing the specific data, and memory control means for accessing the memory with the position data in the main scanning direction and the position data in the subsidiary scanning direction in each sampling section as an address and writing the specific data of each sampling section in the memory.

According to another preferred embodiment of the invention, in order to improve the S/N ratio of the photo-electric conversion signal and to realize measurement of high accuracy, an optical image of the object of measurement is formed on the photo-detection surface of a photo-electric conversion device using an optical member having a unidirectional focusing characteristic represented by a cylindrical lens.

According to still another preferred embodiment of the invention, the zooming function is carried out with an image-forming lens unit controlled by a zoom control circuit included in the photo-detection system. In this way, the measurement conditions such as the scanning range and the scanning rate are changed. In order to reduce the memory capacity, the contents of the register for storing the coefficients for the calculation formulae or the LUT are not fixed but rewritten in accordance with the change in the measurement conditions.

BRIEF DESCRIPTION OF THE DRAWINGS

FIG. 4 is a diagram showing a method for preventing the image drop-off;

FIG. 8 is a diagram showing a modification for application of a frame memory;

FIG. 14 is a diagram showing a modification for application of a frame memory;

FIG. 15 is a diagram showing a modification for application of a frame memory;

FIG. 17 is a block diagram showing the essential parts of a control system according to a third embodiment;

DESCRIPTION OF THE PREFERRED EMBODIMENTS

[First embodiment]

Figure 1:
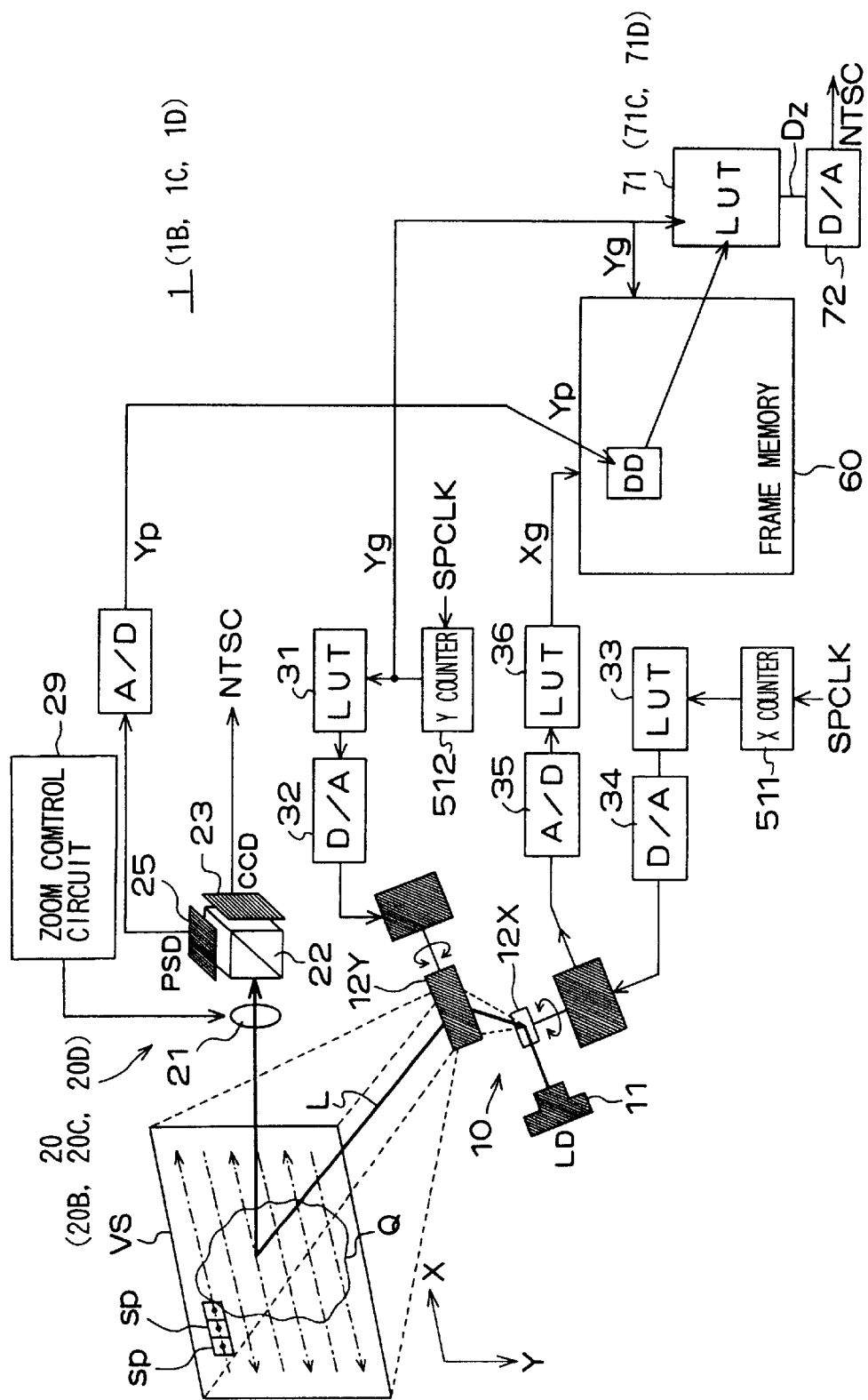
FIG. 1 is a diagram schematically showing a 3D measuring apparatus according to a first embodiment.

FIG. 1 is a diagram schematically showing a 3D measuring apparatus according to a first embodiment of the invention.

The 3D measuring apparatus 1 comprises a projection system 10 for projecting a light beam L in such a manner as to raster scan toward a virtual surface VS, a photo-detection system 20 for detecting the light beam L reflected from an object Q of measurement, and a frame memory 60 for storing specific data DD corresponding to the measurement.

The projection system 10 includes a semiconductor laser (LD) 11 making up a light source, a galvanometer mirror 12X constituting main scanning means, and a galvanometer mirror 12Y constituting subsidiary scanning means. The galvanometer mirrors 12X, 12Y each include a mirror for reflecting the light beam L and an electromagnetic mechanism for rotating the mirror. The electromagnetic mechanism is supplied with a drive voltage representing the count of the clock SPCLK corrected according to a look-up table and D/A converted. The look-up table has stored therein conversion data for changing the rotational speed of the mirror, for example, in such a manner that the scanning rate on the virtual surface VS is kept constant. The main scanning is by reciprocating with the direction of beam deflection reversed for each line. The subsidiary scanning is carried out intermittently for each line of main scanning. In the main scanning, the beam deflection rate is higher than the subsidiary scanning rate, and therefore an error is prone to occur between the control target value indicated by the drive voltage and the actual rotational angular position. In view of this, the galvanometer mirror 12X includes a rotational angle sensor for accurately grasping the position of the light spot on the virtual surface VS. In the description that follows, the direction of main scanning (X direction) is sometimes regarded as the horizontal direction and the direction of the subsidiary scanning (Y direction) as the vertical direction.

The photo-detection system 20 includes an image-forming lens 21, a prism 22 for separating the visible light and the light beam L from each other, a CCD image pickup device 23 for outputting a color pickup image for the monitor, and a photo-electric conversion device (photo-detection device) 25 for detecting the angle of incidence of the light beam L. The image-forming lens 21 is an image-forming lens unit capable of zooming, and the scanning range can be rendered variable by controlling the image-forming lens 21 by a zoom control circuit 29. The operation for controlling the scanning range by the zoom control circuit 29 will be explained later with reference to a third embodiment, and the scanning range is not controlled by the zoom control circuit 29 in the first embodiment.

The photo-electric conversion device 25 is a position sensing-type detector (PSD) for outputting an analog signal corresponding to the spot position of the light entering the photo-detection surface. The use of the PSD eliminates the need of the charge accumulation unlike in the case using a CCD image pickup device and can increase the scanning rate correspondingly. The photo-detection system 20 and the projection system 10 described above are arranged in predetermined spaced relation with each other along Y direction, and their relative positions are known. Once the angle of incidence in Y direction of the light beam L entering the prism 22 is determined, therefore, the distance between the point on the object Q irradiated by the light beam L and a reference position in the apparatus can be determined by use of the well-known trigonometrical survey. The angle of incidence of the light beam L in Y direction corresponds to the distance between the center of the photo-detection surface of the photo-electric conversion device 25 and the photo-detection spot. In the case where the output of the photo-electric conversion device 25 is periodically sampled during the scanning period, the depth of the object Q (the position in the direction at right angles to the virtual surface VS) can be measured for each sampling period (basically, a spot) sp constituting one of the subdivisions of the virtual surface VS in X and Y directions. Specifically, a distance image with the sampling period sp as a pixel can be obtained.

According to this embodiment, the detection data Yp which is a quantized output of the photo-electric conversion device 25 is written in the frame memory 60 as a specific data DD. That is important is to use the position data Xg, Yg in X and Y directions, respectively, of each sampling period sp for address designation of the frame memory 60. As a result, instead of writing the detection data Yp simply in the order of generation, the pixel arrangement on the virtual screen providing an address space of the frame memory 60 coincides with the pixel arrangement of the virtual surface VS. Consequently, the data can be read out without any problem by designating an address from the frame memory in such a manner as to raster scan in unidirectional main scanning fashion. In the simple write operation, the direction of pixel arrangement is changed for each line and therefore it is necessary to rearrange the pixels before reading or a complicated address designation is required at the time of reading.

The detection data Yp written in the frame memory 60 is read for displaying the distance image, and output on the display not shown as a video signal of NTSC scheme through a look-up table (LUT) 71 and a D/A converter 72. The LUT 71 has stored therein the conversion data equivalent to the result of the trigonometric calculation for determining the distance image, corrected by calibration. The calibration is based on the measurement of a plane, for example. The data is read from the frame memory 60 at intervals of the frame period of video image display. The distance image based on the detection data Yp is the 3D information of the object Q as viewed from the projection system 10.

Figure 5:
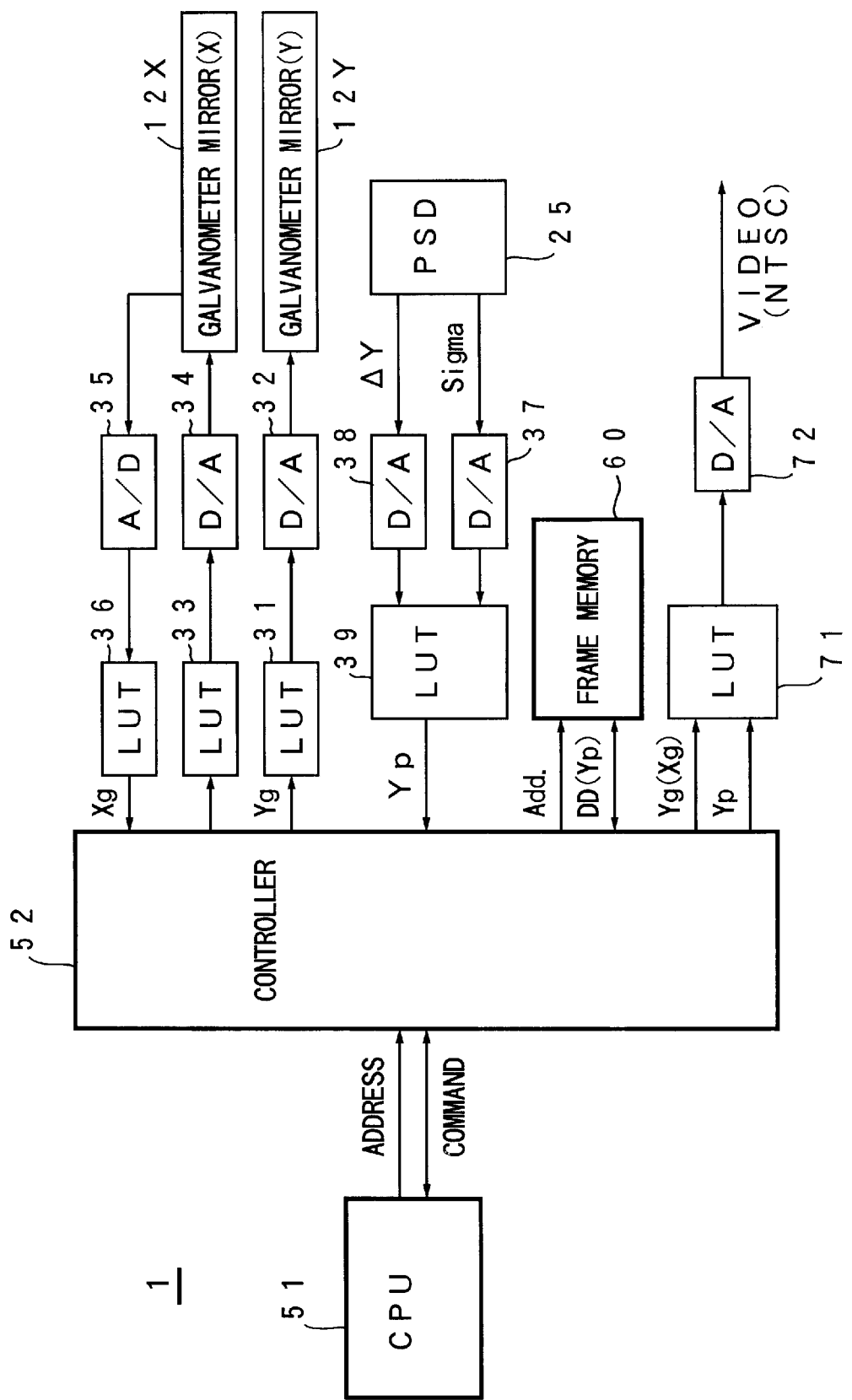
FIG. 5 is a block diagram showing the essential parts of a control system.

FIG. 5 is a block diagram showing the essential parts of the control system.

The 3D measuring apparatus 1 comprises a CPU 51 having a microprocessor and a controller 52 for controlling the scanning and the data input/output. The controller 52 is a semiconductor device (a gate array, for example) with a plurality of circuit modules integrated. The LUT 33 and the D/A converter 34 take part in the control of the galvanometer mirror 12X by the controller 52, and the LUT 31 and the D/A converter 32 take part in the control of the galvanometer mirror 12Y by the controller 52. The rotational angle sensor signal (0 to 5 volts) of the galvanometer mirror 12X is converted into 12-bit data in the A/D converter 35 and input to the controller 52 as a position data Xg through the LUT 36.

Also, the controller 52 is supplied with the detection data Yp from the LUT 39. The input to the LUT 39 is comprised of two types of detection signals Sigma, ΔY output from the PSD 25, quantized by the D/A converters 37, 38, respectively.

The values of detection signals Sigma, ΔY are expressed as

Sigma=X1+X2+Y1+Y2

ΔY=(X2+Y2)−(X1+Y1)

where X1 is an output signal (optical current) of a first electrode in X direction, X2 is an output signal of a second electrode in X direction, Y1 is an output signal of the first electrode in Y direction, and Y2 is an output signal of the second electrode in Y direction.

Figure 2:
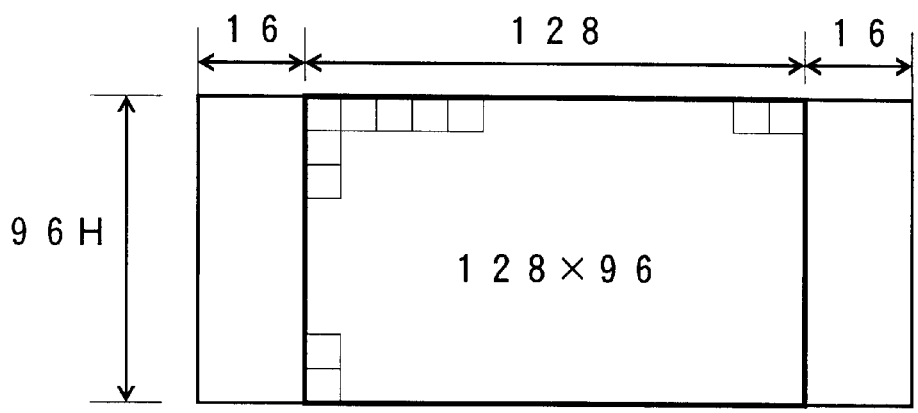
FIG. 2 is a diagram showing an output image size.

FIG. 2 is a diagram showing the output image size.

The number of horizontal pixels of the image is 128. Taking the time required for the reversal of the driving direction of the galvanometer mirror 12X for the main scanning into consideration, each of the image ends has a margin equivalent to 16 pixels. Also, in order to prevent the image drop-off described later, each pixel is sampled twice. Thus, the one line scanning time H is equivalent to 320 periods (320=(128+16>×2)×2)) of the sampling clock SPCLK. In controlling the main scanning, the sampling clock SPCLK is counted thereby to generate a drive signal. Because of the reciprocal system, the counter is reset for each 640 periods of the sampling clock SPCLK.

The number of vertical pixels is 96. Assume that the flyback period (mirror restoration time) in Y direction is 4H. The scanning time V per screen is thus 100 H. In the subsidiary scanning, like in the main scanning, the sampling clock SPCLK is counted thereby to generate a drive signal.

Figure 3:
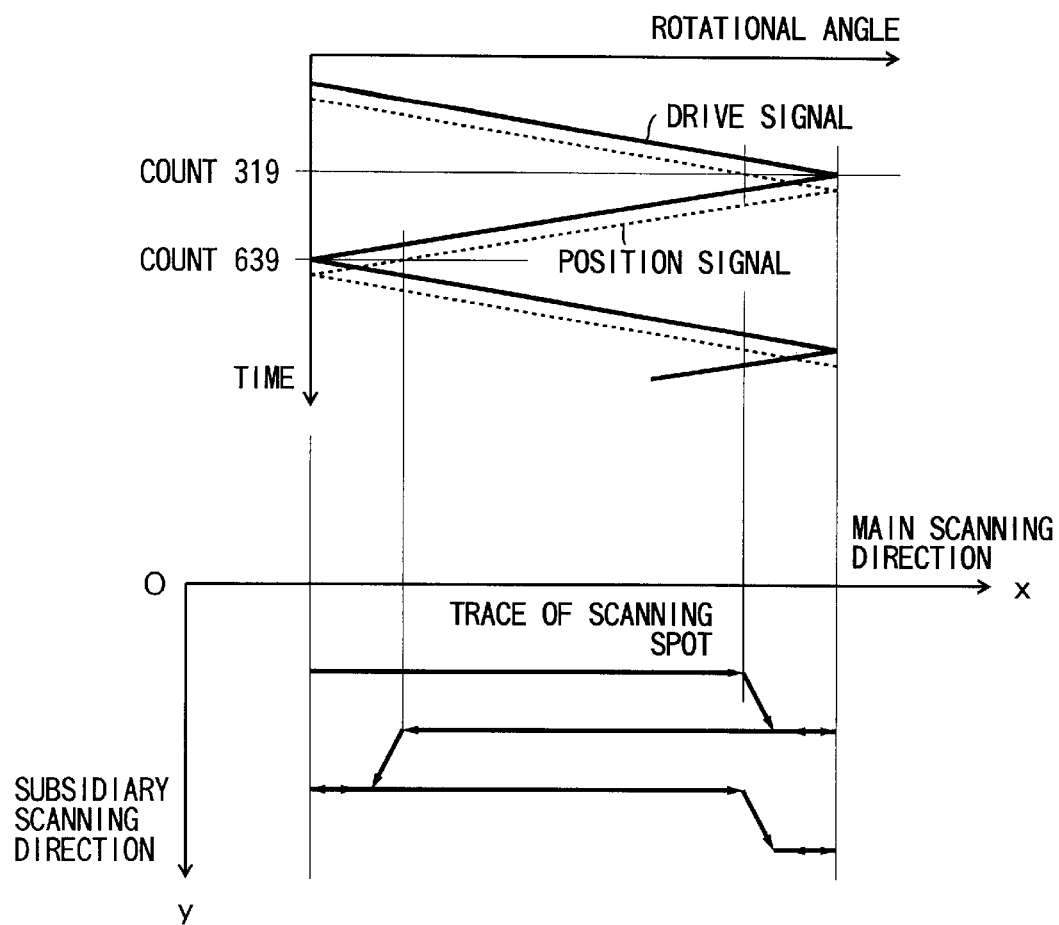
FIG. 3 is a diagram for explaining the timing adjustment for subsidiary scanning.

FIG. 3 is a diagram for explaining the timing adjustment of the subsidiary scanning.

As shown in the upper part of FIG. 3, a phase difference of about 30 clock periods occurs between the drive signal for the galvanometer mirror 12X (solid line) and the detection signal (dashed line) indicating the actual rotational angle. In other words, the mirror operation is delayed behind a drive request. As a result, if the subsidiary scanning is conducted at the time point (count is 319) when the count of the main scanning per line ends, the scanning spot plots a trace shifting to the next line before reaching the end of each line as shown in the lower part of FIG. 3, thus making proper scanning impossible. In view of this, the controller 52 includes an exclusive register (YCUE register). When the count of the main scanning comes to coincide with the value on the register, the counter for subsidiary scanning is activated thereby to adjust the timing of the subsidiary scanning. With this configuration, the scanning condition can be easily optimized in accordance with the scanning range and the scanning rate changeable by the zooming or the like.

FIG. 4 is a diagram showing a method for preventing the pixel drop-off.

As described above, the position data Xg constituting the monitor information of the galvanometer mirror 12X is used for address designation of the frame memory 60. In the case where as many samplings (once for each pixel) as a predetermined number (128 in this case) of data are conducted to obtain the same number of data per line, the pixel drop-off is prone to occur in which data fails be written at the address of a given pixel position. What are considered the causes of this inconvenience are irregular rotation and noises of the galvanometer mirror 12X. FIG. 4 shows an example in which two or more pixels are scanned during a sampling period due to irregular rotation. Specifically, the main scanning proceeds from the pixel position 68 to the pixel position 70 during the period of time point t2 to time point t3, which is a coverage twice as long as the ordinary one. Under this condition, the pixel position 69 drops off in the scheme involving one sampling per pixel. According to this embodiment, however, the number of samplings per pixel is 2, and therefore the sampling is conducted without pixel drop-off even at the time point t2' of the pixel position 69. In the case where the pixel position is the same for a plurality of samplings, the data are overwritten at the same address, and therefore the last written data constitutes effective measurement information. Alternatively, three or more samplings can be conducted per pixel to further reduce the chance of pixel drop-off.

Figure 6:
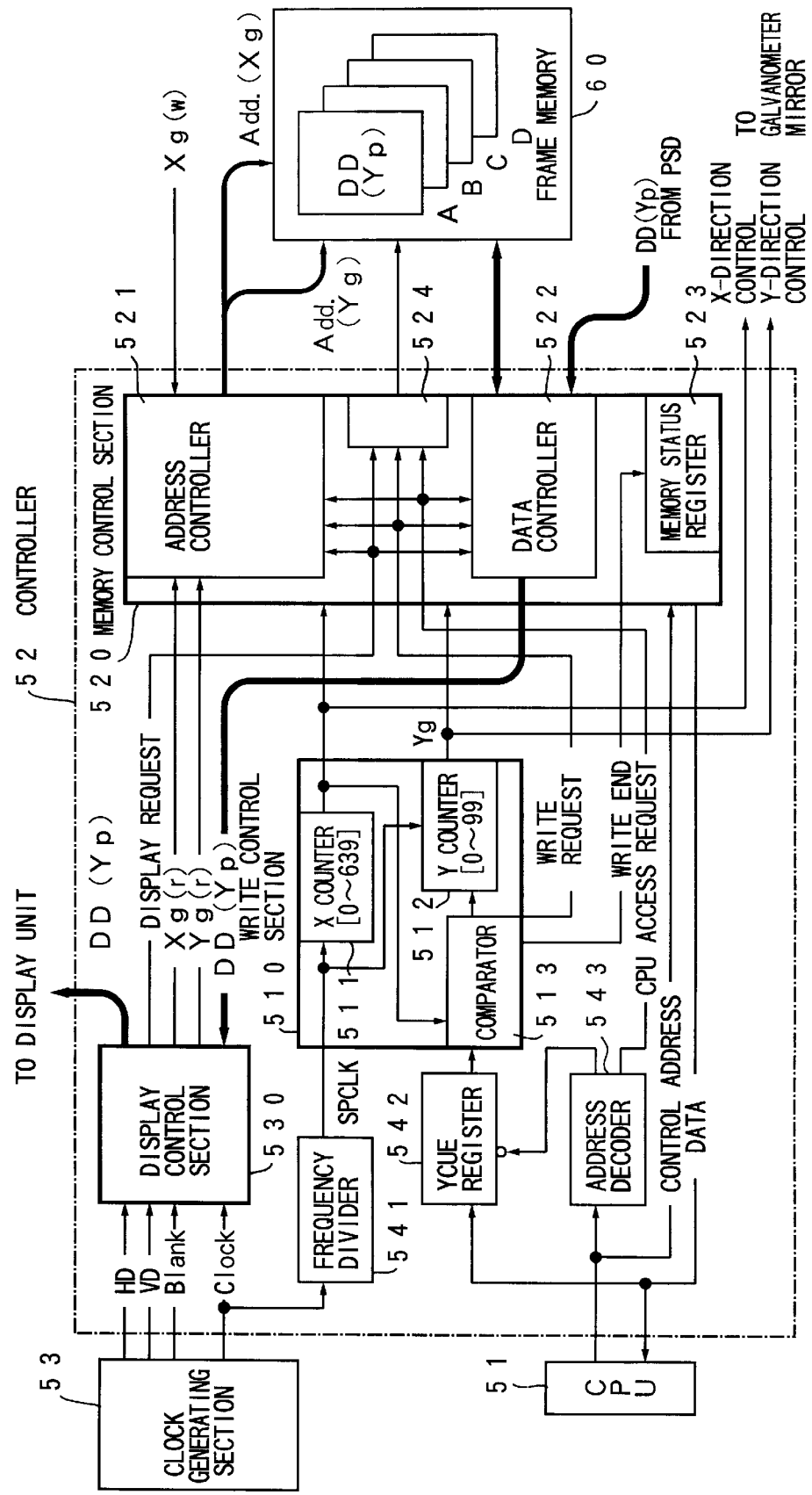
FIG. 6 is a block diagram showing the functional configuration of a controller.

FIG. 6 is a block diagram showing a functional configuration of the controller 52.

The controller 52 includes a write control section 510, a memory control section 520 and a display control section 530. The write control section 510 includes an X counter 511, a Y counter 512 and a comparator 513. The memory control section 520 includes an address controller 521, a data controller 522, a memory status register 523 and a control signal generating circuit 524.

The X counter 511 and the Y counter 512 are supplied with a sampling clock SPCLK from a frequency divider 541. The count (0 to 639) of the X counter 511 is used for controlling the drive of the main scanning. The count (0 to 99) for the Y counter 512, on the other hand, is used for drive control and address designation for the subsidiary scanning. The comparator 513 and the YCUE register 542 are provided for the purpose of adjusting the subsidiary scanning timing taking into consideration the operation delay of the galvanometer mirror 12X with respect to the drive signal for main scanning. An optimum value corresponding to the measurement conditions is set in the YCUE register 542 by the CPU 51. An address decoder 543 is for switching between the mode of accessing the frame memory 60 directly by designating an address from the CPU 51 and the mode of designating an address from the write control section 510 for access. The data designated by a control address from the CPU 51 and read out of the frame memory 60 are transferred to the CPU 51 through the memory control section 520.

In writing data into the frame memory 60, the address controller 521 designates an address by the position data Yg from the Y counter 512 and the position data Xg from the galvanometer mirror 12X. In FIG. 6, (w) indicates the write operation. In read operation, on the other hand, the address controller 521 designates an address by the position data Xg, Yg from the display control section 530. In FIG. 6, (r) indicates the read operation. Assume, for example, that the position data Xg, Yg are 7 bits, and the frame memory 60 has 16 bits of addresses (Add.) $A_0$ to $A_{15}$. The addresses $A_0$ to $A_6$ are assigned to Xg, and the addresses $A_7$ to $A_{13}$ are assigned to the position data Yg, while the remaining addresses $A_{14}$, $A_{15}$ are assigned to bank designation.

The data controller 522 is in charge of writing and reading the detection data Yp as specific data DD. The memory status register 523, on the other hand, has stored therein the status of four banks A, B, C, D in the frame memory 60.

The display control section 530 generates a read address (Xg, Yg) based on various sync signals from the clock generating section 53 and applies it to the address controller 520. Also, the detection data Yp from the data controller 522 are output to the display not shown, together with a predetermined sync signal.

Figure 7:
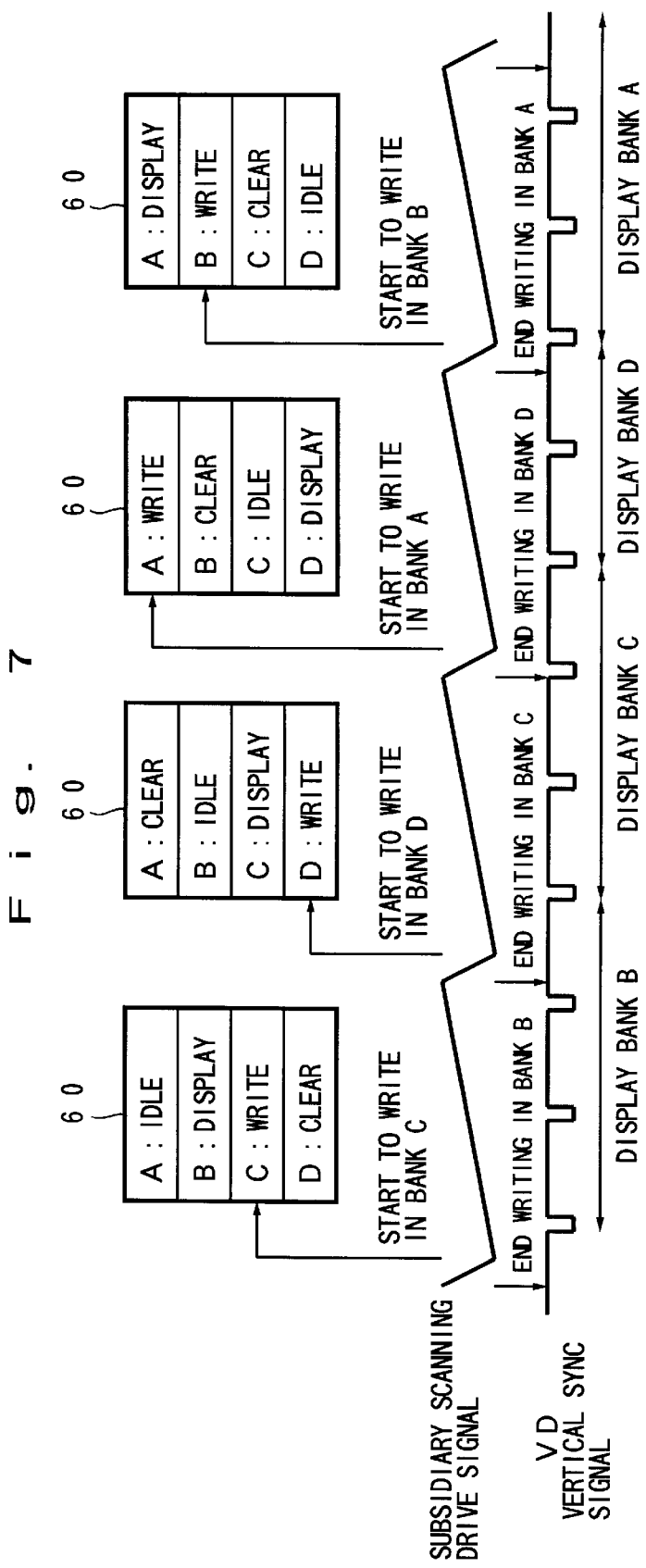
FIG. 7 is a diagram showing an example of selective use of the banks of a frame memory.

FIG. 7 is a diagram showing an example of selectively using the banks of the frame memory 60 as appropriately as occasion demands.

In the 3D measuring apparatus 1, the frame memory 60 is segmented into four banks A, B, C, D, which are used for write, display (read), wait (idle) and clear operations in that order on rotation basis. When the write operation into the bank C is going on, for example, the read operation is performed from the bank B into which the preceding measurement data has been written, while at the same time erasing the data in the bank D. In the process, the bank A is not accessed at all. In the next measurement session, the present data is written in the bank D, and the preceding data are read from the bank C. This memory control makes possible a concurrent processing operation in which the data obtained by each measurement session is sequentially output while repeating the measurements periodically. In this way, the position change of a moving object can be displayed. According to this embodiment, however, the data write operation (i.e. scanning of one screen) is not synchronized with the read operation for display. The frame period for display is shorter than the scanning time per screen. Until the latest data of one screen (frame) is completely written, therefore, the preceding frame is read and displayed repeatedly. In the case where the scanning of one screen is completed in one frame period (for example, 1/30 seconds), the read and write operations can be synchronized and the display can be updated at intervals of frame period.

FIGS. 8 to 15 are diagrams showing modified applications of the frame memory 60.

Figure 8:
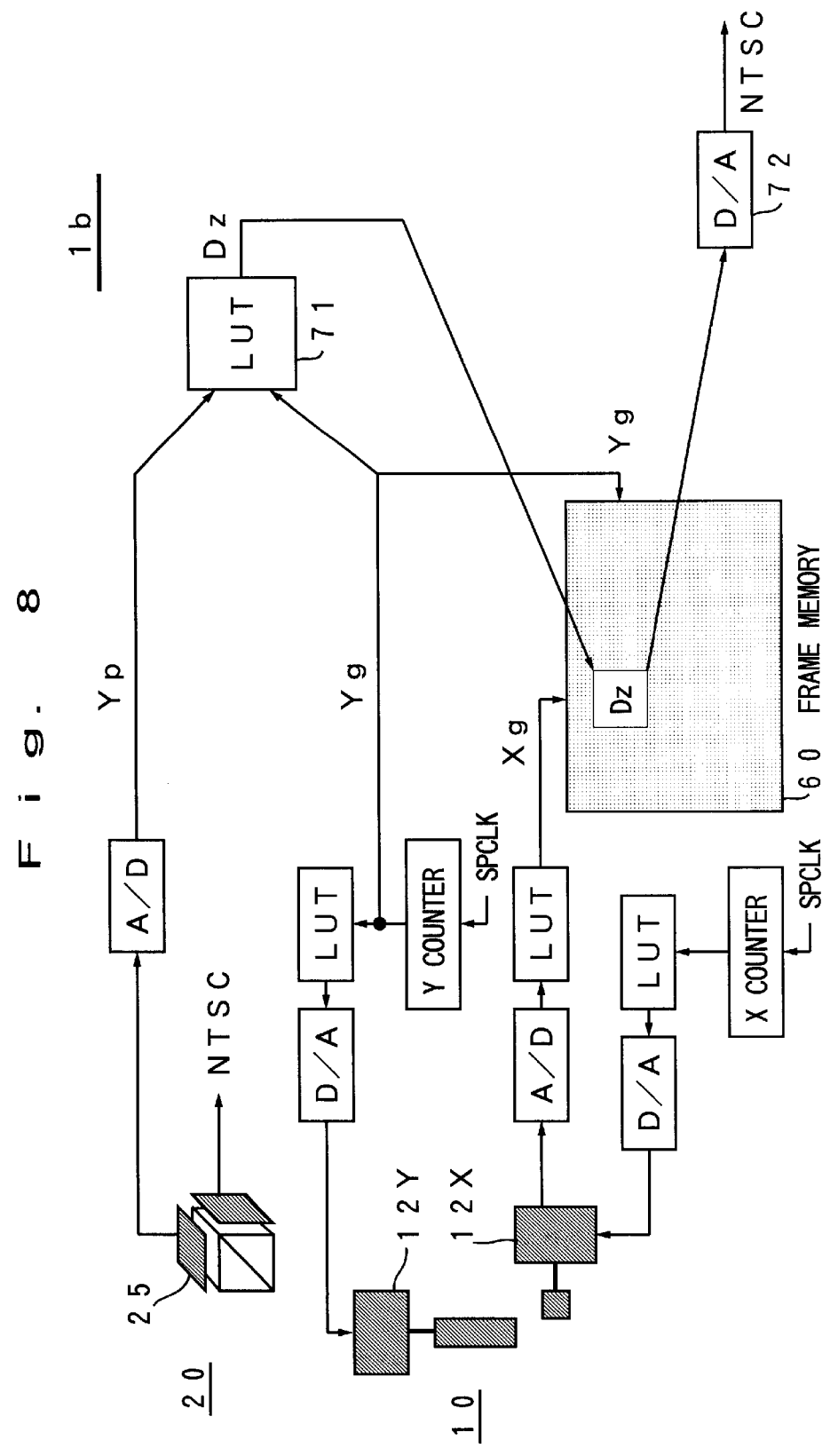

In the example of FIG. 8, the detection data Yp are not stored but input to the look-up table 71 and converted into the distance data Dz. This distance data Dz are written in the frame memory 60. For address designation, like in the example of FIG. 1, the position data Xg, Yg are used. In outputting the data to the display, the distance data Dz read from the frame memory 60 are directly applied to the D/A converter 72 and converted into a video signal.

Figure 9:
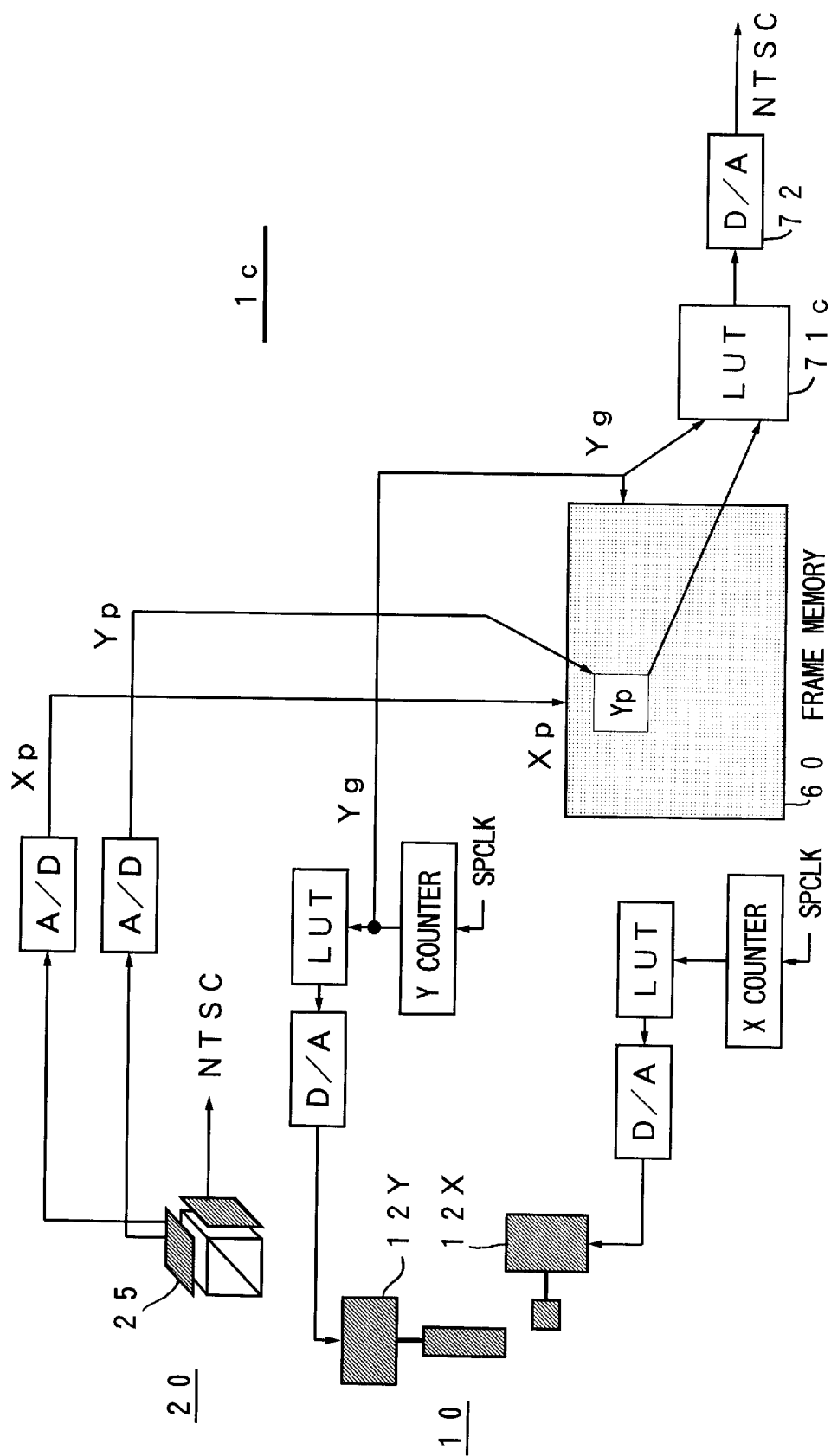
FIG. 9 is a diagram showing a modification for application of a frame memory.

The example shown in FIG. 9 is such that the detection signal in X direction from the PSD 25 is A/D converted into the position data Xp which is used for address designation in X direction. The other parts of the configuration are identical to those of FIG. 1.

Figure 10:
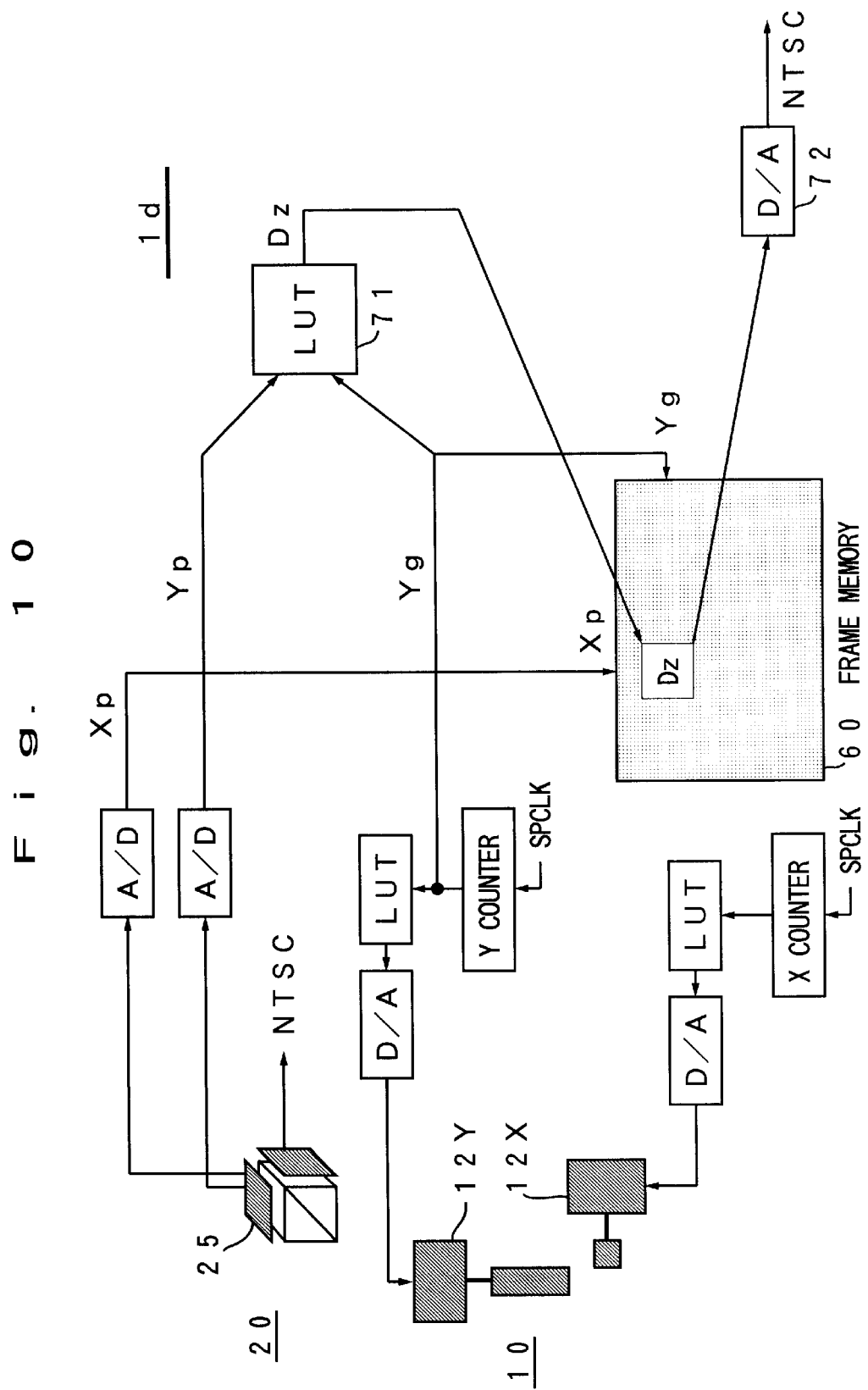
FIG. 10 is a diagram showing a modification for application of a frame memory.

In the example of FIG. 10, like in the example of FIG. 8, the distance data Dz is written in the frame memory 60, and as in the example of FIG. 9, the position data Xp is used for address designation in X direction.

Figure 11:
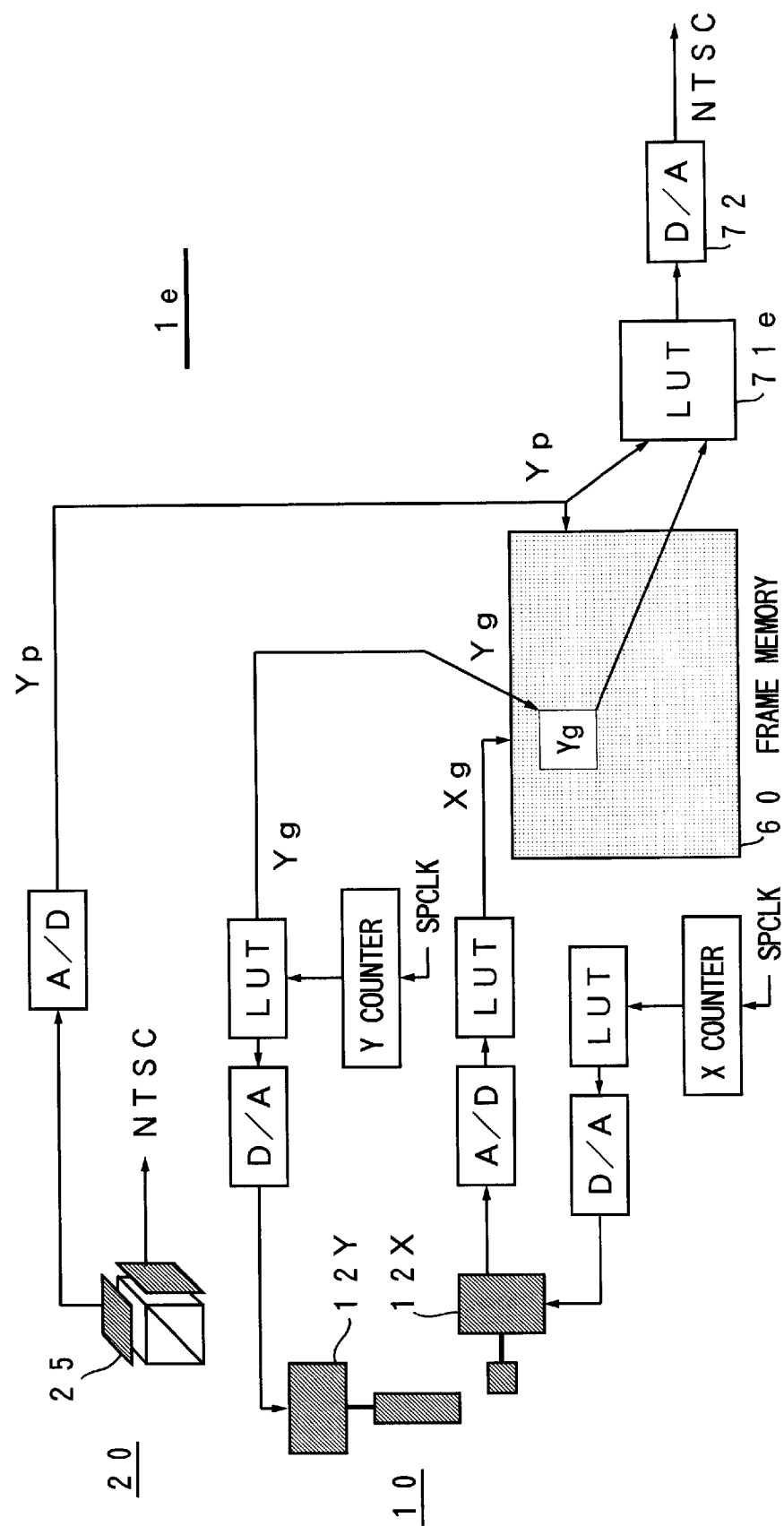
FIG. 11 is a diagram showing a modification for application of a frame memory.

The example of FIG. 11 uses the detection data Yp for address designation in Y direction, and the position data Yg is written in the frame memory 60. In other words, the depth of the object Q as viewed from the photo-detection system 20 is stored. This configuration is preferable for some applications. However, in the case where a valid detection data Yp fails to be obtained due to the shortage of the incidence light amount or noises mixed in, the pixel drop-off may occur.

Figure 12:
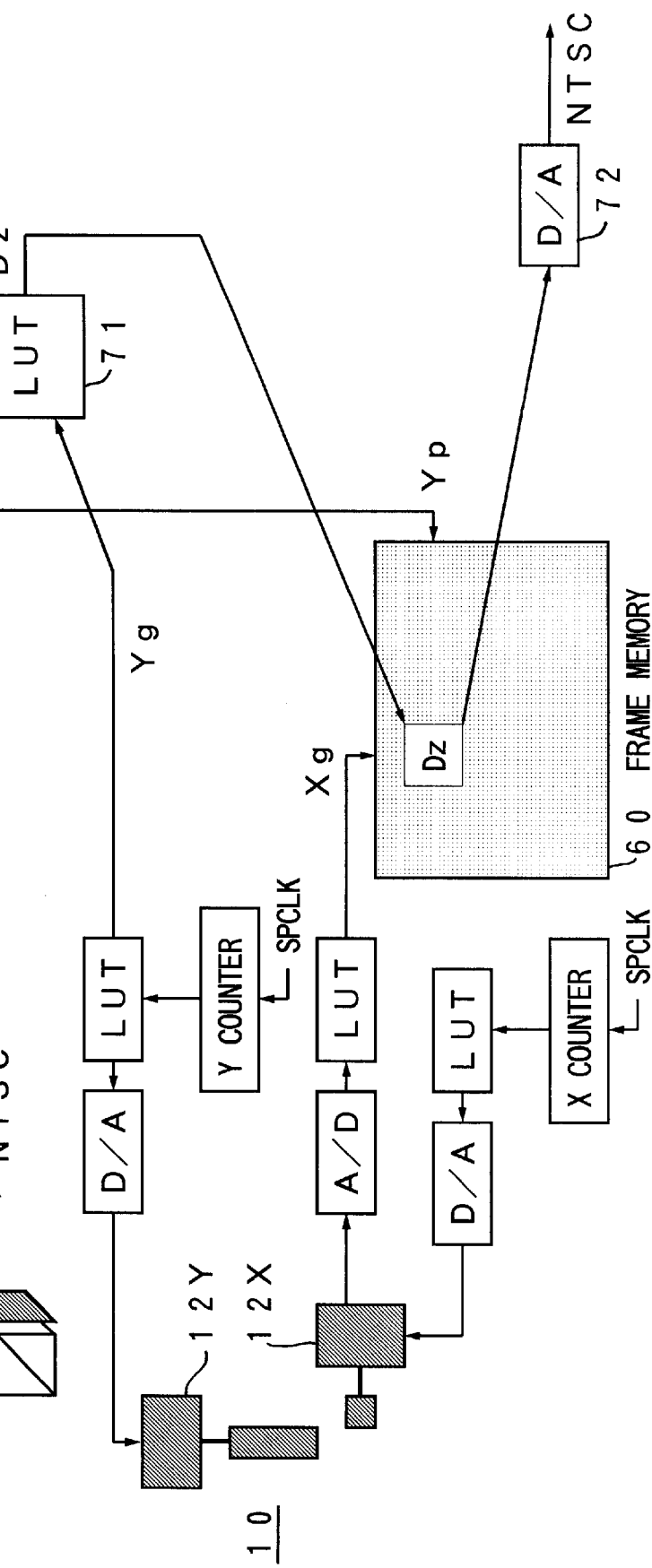
FIG. 12 is a diagram showing a modification for application of a frame memory.

In the example of FIG. 12, like in the examples of FIGS. 8 and 10, the distance data Dz is written in the frame memory 60, and at the same time, like in the example of FIG. 11, the detection data Yp is used for address designation in Y direction.

Figure 13:
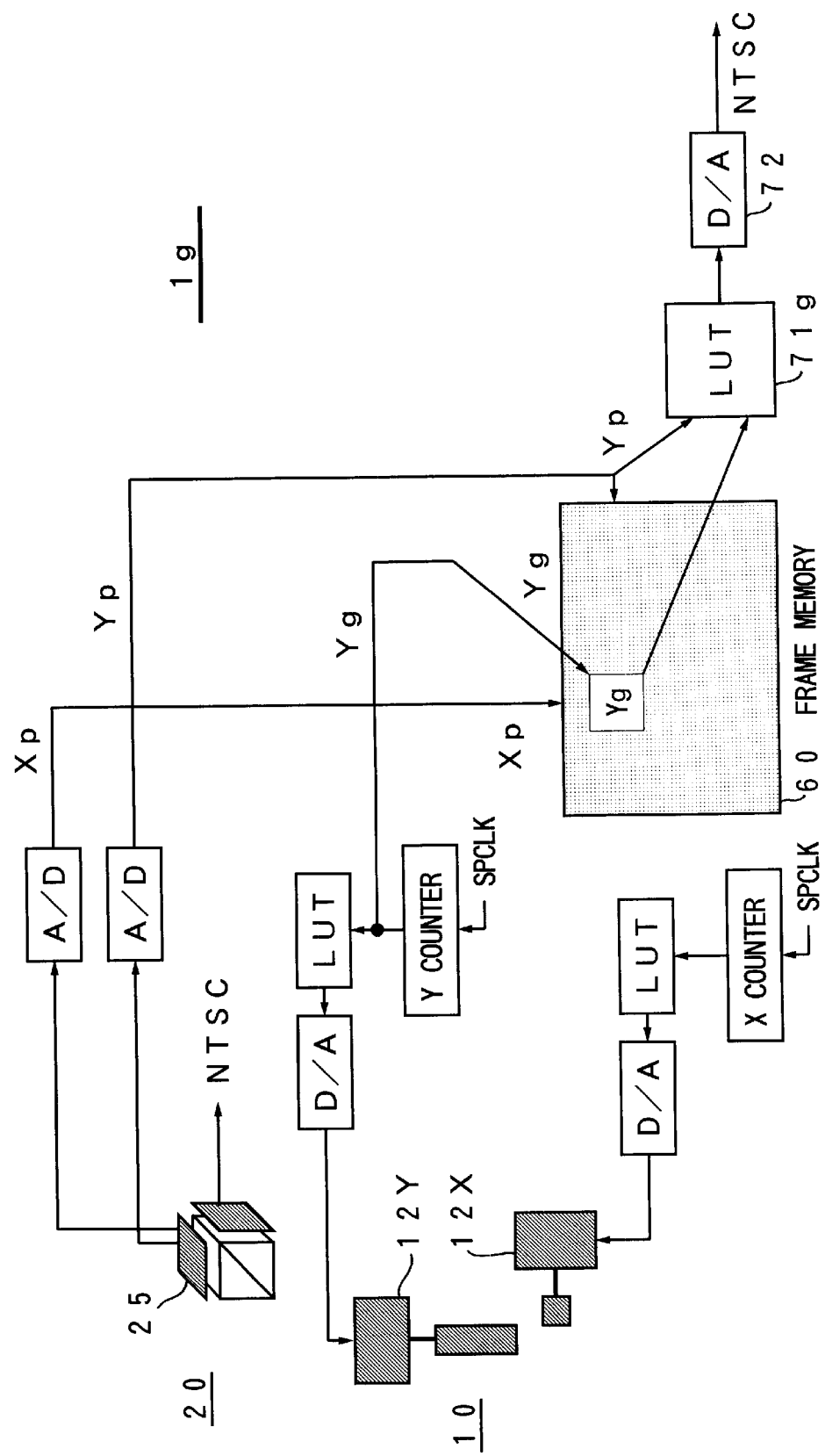
FIG. 13 is a diagram showing a modification for application of a frame memory.

The example of FIG. 13, on the other hand, uses the detection data Yp for address designation in Y direction, and like in the example of FIG. 9, the position data Xp is used for address designation in X direction. The configuration of the other parts is similar to that of the example shown in FIG. 11.

Figure 14:
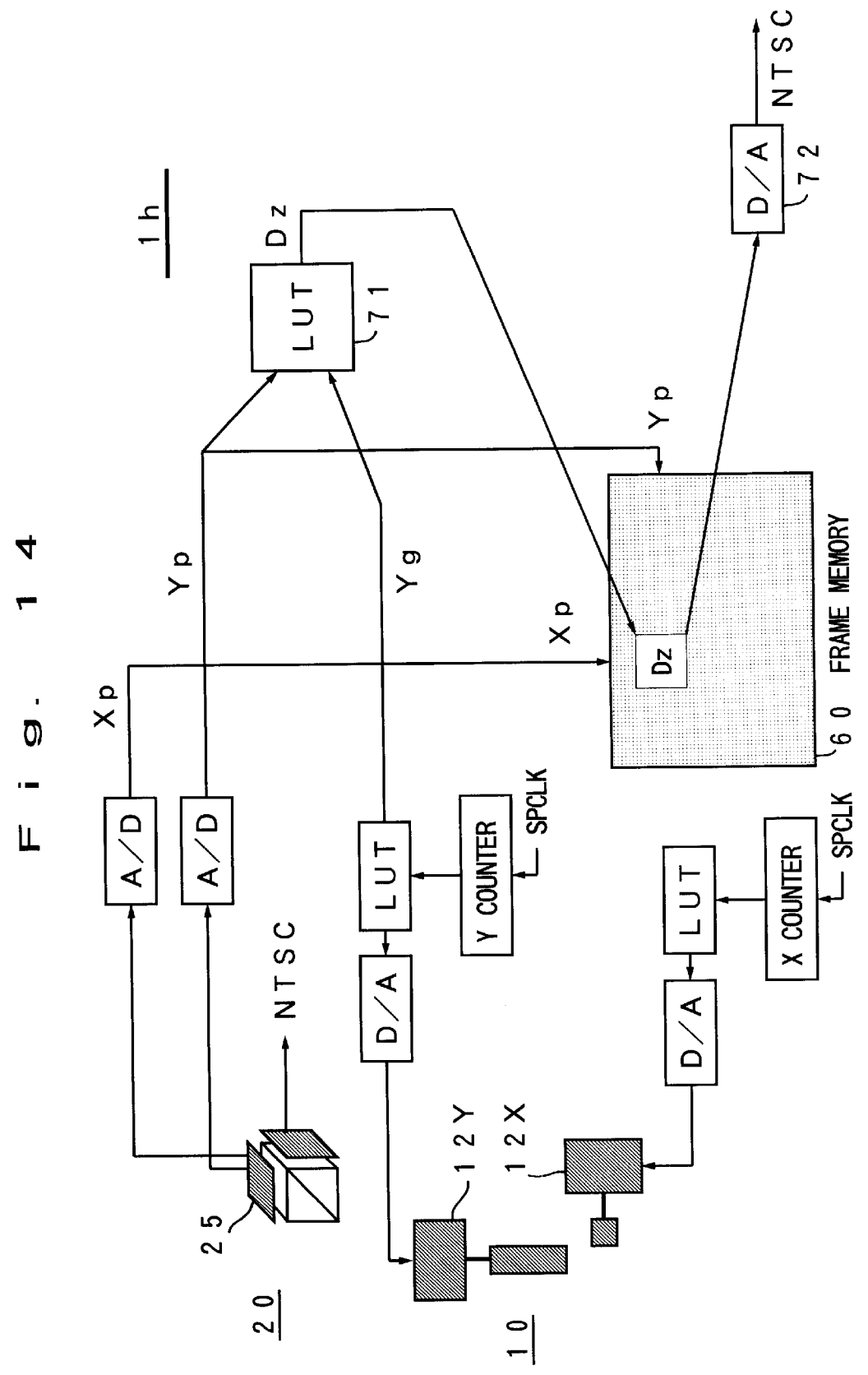

In the example of FIG. 14, like the example of FIG. 12, the distance data Dz is written in the frame memory 60, the position data Xp is used for address designation in X direction and the detection data Yp is used for address designation in Y direction.

Figure 15:
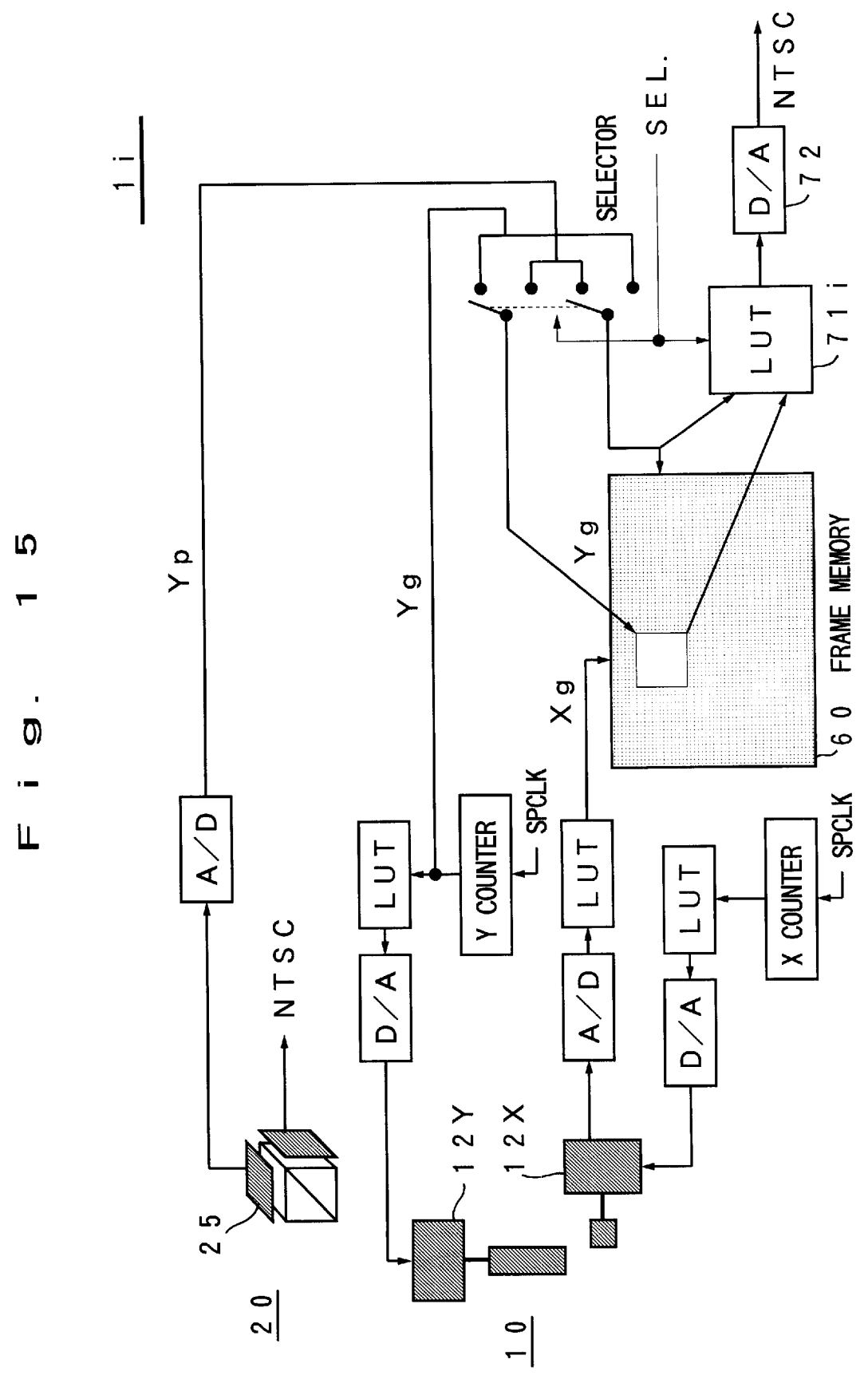

In the example of FIG. 15, one of the position data Yg and the detection data Yp is written in the frame memory 60, and the other of the two is used for address designation in Y direction. As a result, the contents stored and the addresses can be replaced with each other. Therefore, the position data Xg is used for address designation in X direction. In outputting data to the display, one of the two types of conversion data stored in the look-up table 71$i$ is selectively used in accordance with the type of data written in the frame memory 60.

According to the first embodiment described above, data are stored in such a manner that the position in the measurement field of view and the position in the memory space for a virtual screen correspond to each other thereby to simplify the control of the memory for data storage.

[Second embodiment]

Figure 16:
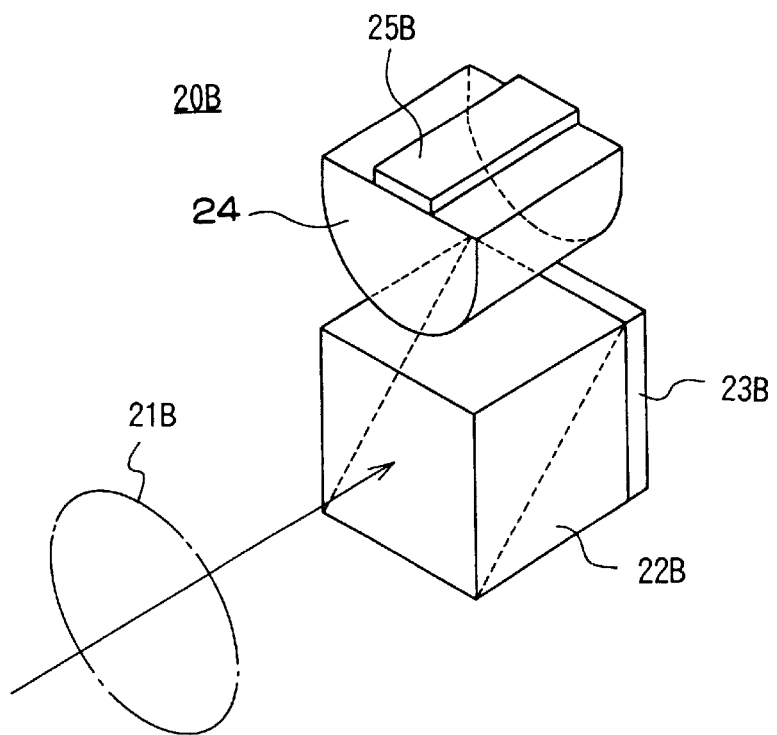
FIG. 16(A) and FIG. 16(B) are diagrams showing a configuration of a photo-detection system according to a second embodiment.
Figure 16:
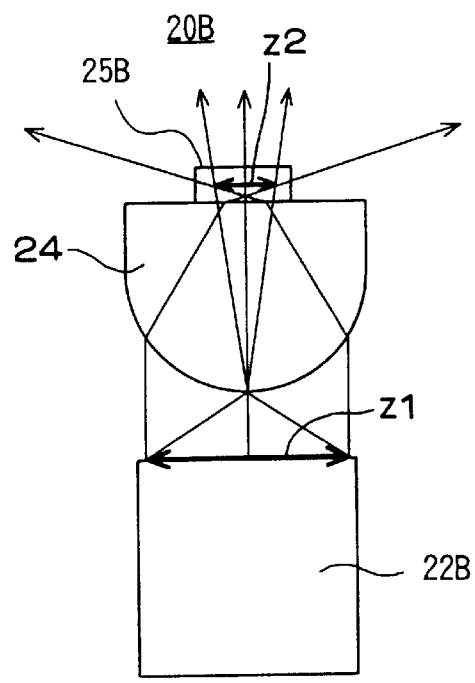

FIGS. 16A and 16B are diagrams showing a configuration of a photo-detection system of 20B according to a second embodiment.

In a 3D measuring apparatus 1B of the second embodiment, the configuration of the photo-detection system 20B is different from that of the photo-detection system 20 of the first embodiment. Also, in FIG. 5 showing the first embodiment, the photo-electric conversion device (PSD) 25B of the second embodiment outputs two types of detection signals Y1, Y2. The configuration of the remaining parts is similar to that of the first embodiment, and FIGS. 1 to 15 showing the first embodiment are applicable to the second embodiment with equal effect.

Specifically, according to the second embodiment, the optical image of an object of measurement is focused on the photo-detection surface of the photo-electric conversion device 25B using an optical member 24 having a unidirectional focusing characteristic represented by a cylindrical lens.

In the measurement with light beam projection, the two scanning positions of main and subsidiary scanning can be specified at an arbitrary time point during scanning. The spot position therefore is detected only for the direction (normally set as the subsidiary scanning direction) where an azimuth difference occurs. Therefore, the measurement is not adversely affected when the optical image (basically, an image at only one point of all the scanning positions is bright) of the object is compressed in the direction causing no azimuth difference (in the direction of main scanning, for example). The photo-electric conversion device 25B having a band-shaped photo-detection surface on which a compressed image (one-dimensional image as a model) can be projected meets the requirement. Therefore, the 2D photo-detection surface corresponding to the scanning range is not required.

In FIGS. 16A and 16B, the photo-detection system 20B includes an image-forming lens 21B, a prism 22B for separating the visible light and the light beam L, a CCD image pickup device 23B for outputting a color pickup image for the monitor, a cylindrical lens 24 and a photo-electric conversion device 25B for detecting the angle of incidence of the light beam L.

The photo-electric conversion device 25B is a one-dimensional position sensing-type detector (PSD) arranged in such a manner as to detect the spot position in Y direction. According to this embodiment, a one-dimensional device is used as the photo-electric conversion device 25B. Therefore, the photo-detection surface is smaller than that of the 2D device, and the S/N ratio is superior. The cylindrical lens 24 compresses in X direction the optical image z1 projected at the end surface of the prism 22b by the image-forming lens 21B and causes the image to be formed again on the photo-detection surface of the photo-electric conversion device 25B. The photo-detection system 20B and the projection system 10 are arranged at a predetermined distance from each other in Y direction, and the relative positions thereof are known. Once the angle of incidence in Y direction of the light beam L entering the prism 22B is determined, therefore, the distance between the point of the object Q irradiated by the light beam L and a reference position in the apparatus can be determined by use of the well-known trigonometrical survey. The angle of incidence of the light beam L in Y direction corresponds to the distance between the center of the photo-detection surface of the photo-electric conversion device 25B and the photo-detection spot. If the output of the photo-electric conversion device 25B is periodically sampled during the scanning period, the depth of the object Q can be measured for each sampling period sp of the subdivisions of the virtual surface VS in X and Y directions. In other words, a distance image can be obtained with the sampling period sp as a pixel.

The controller 52 shown in FIG. 5 is supplied with the detection data Yp from the LUT 39. The input to the LUT 39 represents two types of the detection signals Y1, Y2 output from PSD25B quantized by the D/A converters 37, 38, respectively. The value of the detection data Yp is expressed by the following equation.

$$Yp=(Y1-Y2)/(Y1+Y2)$$

where Y1 is the output signal (optical current) of a first electrode in Y direction, and Y2 is the output signal of a second electrode in Y direction.

According to the second embodiment, the photo-detection area for photo-electric conversion is reduced to a minimum capable of securing the required resolution, and the S/N ratio of the photo-electric conversion signal thereby to realize a high-accuracy measurement.

[Third embodiment]

In a 3D measuring apparatus IC according to the third embodiment, the zooming is carried out by the image-forming lens unit 21 under the control of a zoom control circuit 29 included in the photo-detection system 20 shown in FIG. 1. As a result, the measurement conditions such as the scanning range and the scanning rate are changed. The contents of the register for storing coefficients of the calculation formulae or the LUT are not fixed but rewritten in accordance with the change of the measurement conditions. The configuration of the remaining parts is similar to that shown in FIGS. 1 to 4 and FIGS. 7 to 15 of the first embodiment, and these diagrams are applicable also to the third embodiment.

In FIG. 1, the image-forming lens unit 21 includes a movable mechanism for zooming and focusing. The image-forming lens unit 21 is supplied with a control signal corresponding to a remote control signal from an external source or an operation output from the zoom control circuit 29. In the case where the measurement conditions (operation setting conditions) such as the focal length of the image-forming lens unit 21 or the position of the virtual surface VS are changed, the coefficients for distance calculation are required to be changed correspondingly. The virtual surface VS is set as a reference plane for measurement.

As explained with reference to the first embodiment, the depth of the object Q can be measured for each sampling period sp constituting one of the subdivisions of the virtual surface VS in X and Y directions by sampling the output of the photo-electric conversion device 25 periodically during the scanning period. In other words, the distance image with the sampling period sp as a pixel can be produced.

If the distance image is to be displayed using a multi-purpose display unit, for example, the data for specifying the angle of incidence of the light beam for each sampling period, i.e. the photo-electric conversion data obtained in the photo-electric conversion device 25 or the distance data calculated based on the photo-electric conversion data is required to be temporarily stored. Thus, the output of the photo-electric conversion device 25 quantized into the detection data Yp is written in the frame memory 60 as data DD.

The detection data Yp written in the frame memory 60 is read out for display of the distance image, converted into the distance data Dz by the look-up table 71C (or the distance calculation circuit 75 described later), and further output to the display not shown as a video signal of NTSC scheme through the D/A converter 72.

The look-up table (hereinafter referred to as the LUT) 71C is stored in a rewritable memory. The look-up table is a collection of conversion data equivalent to the result of trigonometric calculation for determining the distance image, as corrected by calibration. The contents of the LUT 71C are rewritten as required in accordance with the change in the measurement conditions.

Figure 17:
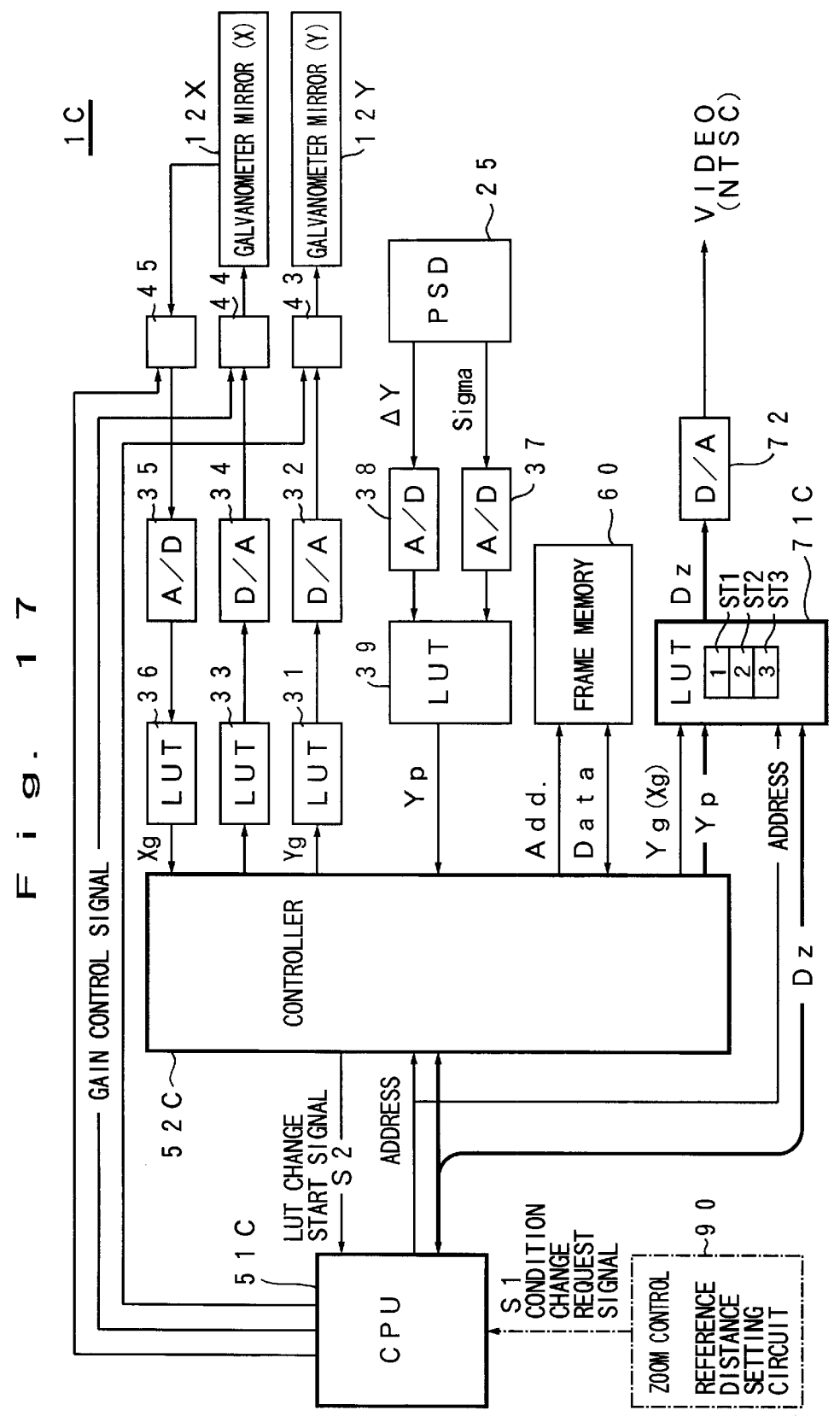

FIG. 17 is a block diagram showing the essential parts of the control system according to the third embodiment.

The 3D measuring apparatus 1C comprises a CPU 51C having a microprocessor and a controller 52C taking charge of the scanning control and the data input/output control. The controller 52C is a semiconductor device (a gate array, for example) including a plurality of circuit modules integrated. The galvanometer mirror 12X is driven by a LUT 33, a D/A converter 34 and a gain setting circuit 44 under the control of the controller 52C, while the galvanometer mirror 12Y is controlled by a LUT 31, a D/A converter 32 and a gain offset setting circuit 43 under the control of the controller 52C. The rotational angle sensor signal (0 to 5 volts) of the galvanometer mirror 12X is input to the A/D converter 35 through the gain setting circuit 45 and further, through the LUT 36, input to the controller 52C as a 12-bit position data Xg. The gain setting circuits 44, 45 and the gain offset setting circuit 43 are controlled by the CPU 5iC.

The controller 52C is supplied with the detection data Yp from the LUT 39. The input to the LUT 39 is the two types of detection signals Sigma, ΔY output from the PSD 25, as quantized by the A/D converters 37, 38, respectively. The values of the detection signals Sigma, ΔY are expressed by the same equation as shown in the first embodiment.

The detection data Yp input during the scanning period are written sequentially by the controller 52C into a predetermined bank of the frame memory 60. Concurrently with this, the detection data Yp written previously are read from other banks and transferred to the LUT 71C. The CPU 51 can change the contents of the LUT 71C. The CPU 51C is supplied with a condition change request signal S1 from a zoom control circuit 29 and measurement condition changing means 90 including a reference distance setting circuit for accepting the angle-of-visibility adjustment. In response to this, the CPU 51C generates table data (a collection of the distance data Dz) corresponding to the measurement conditions after change and writes it into the LUT 71C. The 3D measuring apparatus 1C, in order to permit a moving object to be monitored or analyzed, repeats the measurement periodically and outputs the latest measurement from time to time. For this purpose, the LUT 71C is configured of a plurality of subtables (memory areas) ST1 to ST3. Concurrently with the data conversion of the detection data Yp into the distance data Dz based on one subtable, the table data corresponding to the latest measurement conditions are written into other subtables. Specifically, while the distance data Dz for one frame of given measurement conditions are being output, preparation is made for data conversion for the latest measurement conditions changed. The subtables ST1 to ST3 are switched. between the data output to outside and the change of the table contents, thus allowing the measurement conditions to be changed by frame.

Figure 18:
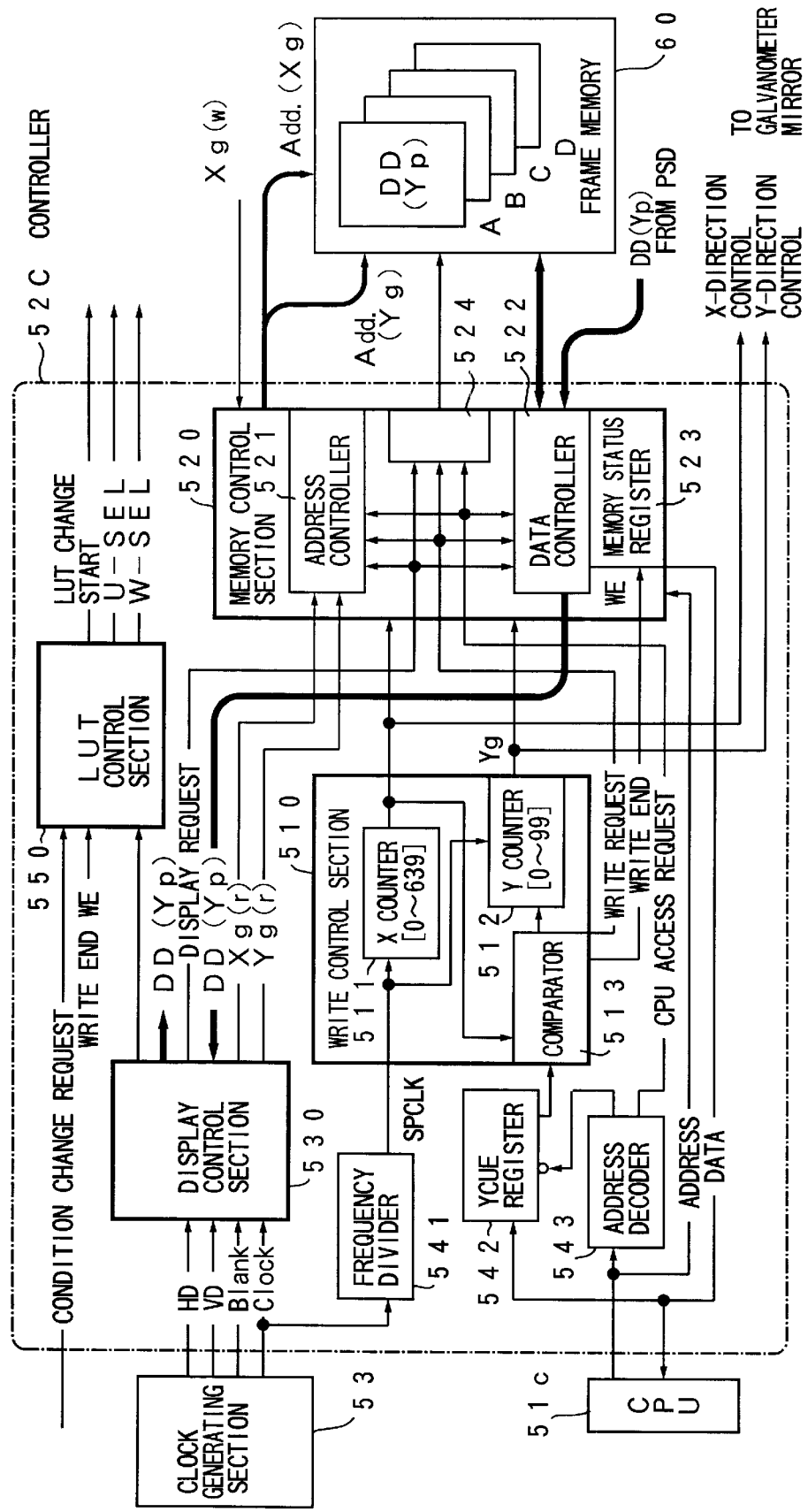
FIG. 18 is a block diagram showing a functional configuration of the controller of FIG. 17.

FIG. 18 is a block diagram showing a functional configuration of the controller 52C of FIG. 17.

The controller 52C includes a write control section 510, a memory control section 520, a display control section 530 and a LUT control section 550 which is the feature of the third embodiment. The write control section 510 includes an X counter 511, a Y counter 512 and a comparator 513. The memory control section 520 includes an address controller 512, a data controller 522, a memory status register 523 and a control signal generating circuit 524.

The X counter 511 and the Y counter 512 are supplied with the sampling clock SPCLK from a frequency divider 541. The count (0 to 639) of the X counter 511 is used for controlling the drive of the main scanning. The count (0 to 99) of the Y counter 512, on the other hand, is used for controlling the drive of the subsidiary scanning and address designation. The comparator 513 and the YCUE register 542 are provided for timing adjustment of the subsidiary scanning described above. The optimum value corresponding to the measurement conditions is set by the CPU 51C in the YCUE register 542. An address decoder 543 is a circuit for switching between the mode of accessing the frame memory 60 with an address directly designated by the CPU 51C and the mode of accessing the frame memory 60 by address designation through the write control section 510. The data read from the frame memory 60 as designated by a control address supplied from the CPU 51C is transferred to the CPU 51C through the memory control section 520.

In the write operation of the frame memory 60, the address controller 521 designates an address based on the position data Yg supplied from the Y counter 512 and the position data Xg supplied from the galvanometer mirror 12X. In FIG. 18, (w) indicates the write operation. In the read operation, on the other hand, the address controller 521 designates an address based on the position data Xg, Yg supplied from the display control section 530. In FIG. 18, (r) indicates the read operation. In the case where the position data Xg, Yg are 7 bits and a device having 16-bit addresses (Add.) $A_0$ to $A_{15}$, for example, is used as the frame memory 60, $A_0$ to $A_6$ are assigned to the position data Xg, $A_7$ to $A_{13}$ are assigned to the position data Yg, and the remaining $A_{14}$ and $A_{15}$ are assigned to the bank designation.

The data controller 522 takes charge of writing and reading the detection data Yp as the data DD. The memory status register 523 stores the status of four banks A, B, C, D in the frame memory 60.

The display control section 530 generates a read address (Xg, Yg) based on various sync signals supplied from the clock generating section 53 and applies it to the address controller 521. Also, the detection data Yp from the data controller 522, together with a predetermined sync signal, are output to the display not shown.

FIG. 7 shows an example use of the banks of the frame memory 60 according to the third embodiment.

In the 3D measuring apparatus 1C, like in the 3D measuring apparatus 1 according to the first embodiment, the frame memory 60 is segmented into four banks A, B, C, D which are used on rotation for write, display (read), wait (idle) and clear operations in that order. In the case where the data write operation (i.e. the scanning for one frame) and the read operation for display are asynchronous with each other and the frame period for display is shorter than a predetermined measurement (image pickup) unit time, then, the immediately preceding frame is repeatedly read and displayed until the frame is written into completely. In the case where a session of measurement can be completed in the frame period (1/30 secs., for example), the display can be updated in frame period by synchronizing the write and read operations with each other.

Figure 19:
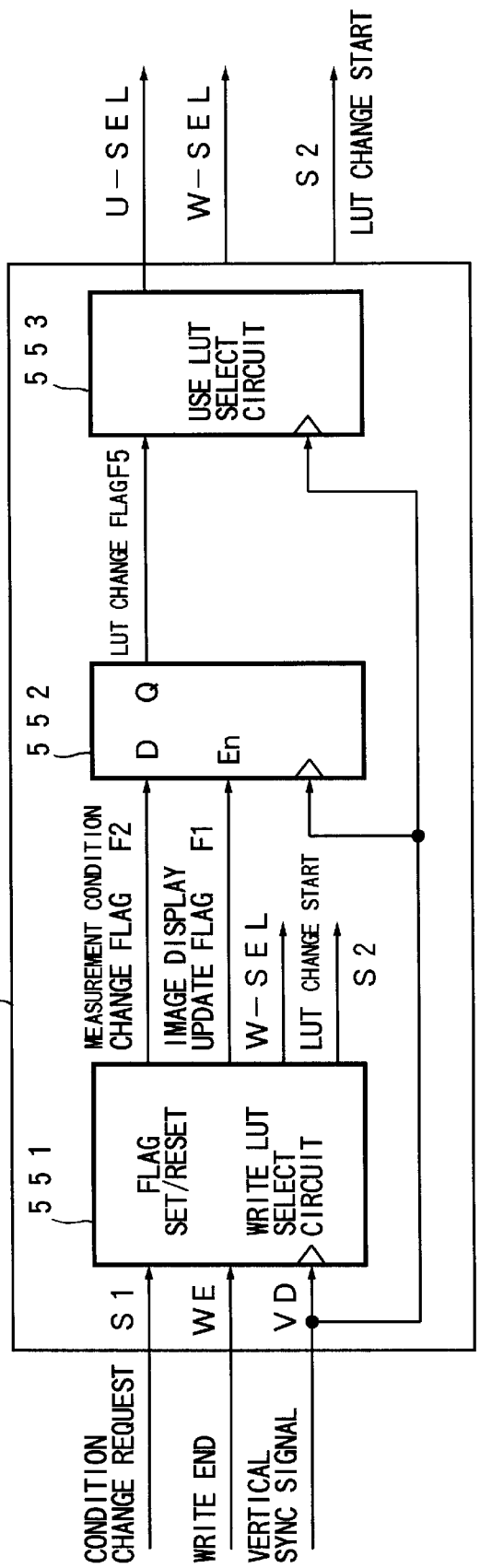
FIG. 19 is a diagram showing a configuration of the LUT controller of FIG. 18.

FIG. 19 is a diagram showing a configuration of the LUT control section 550 of FIG. 18.

The LUT control section 550 includes a write LUT select circuit 551 for outputting a subtable designation signal W-SEL for writing the table data, a D flip-flop 552 and an active LUT select circuit 553 for outputting a designation signal U-SEL of the subtable used for data conversion. These component elements are accompanied by a vertical sync signal VD for display as an operation clock. The write LUT select circuit 551 is supplied with a condition change request signal S1 and a write end signal WE from the write control section 511. The write LUT select circuit 551 outputs a measurement condition change flag F2, an image display update flag F1 and a LUT change start signal S2 in addition to the designation signal W-SEL. The measurement condition change flag F2 is delayed by the D flip-flop 552 and input to the active LUT select circuit 553 as a LUT change flag F5. The image display update flag F1 constitutes an enable signal for the D flip-flop 552. The LUT change start signal S2 is sent to the CPU 51C.

Figure 20:
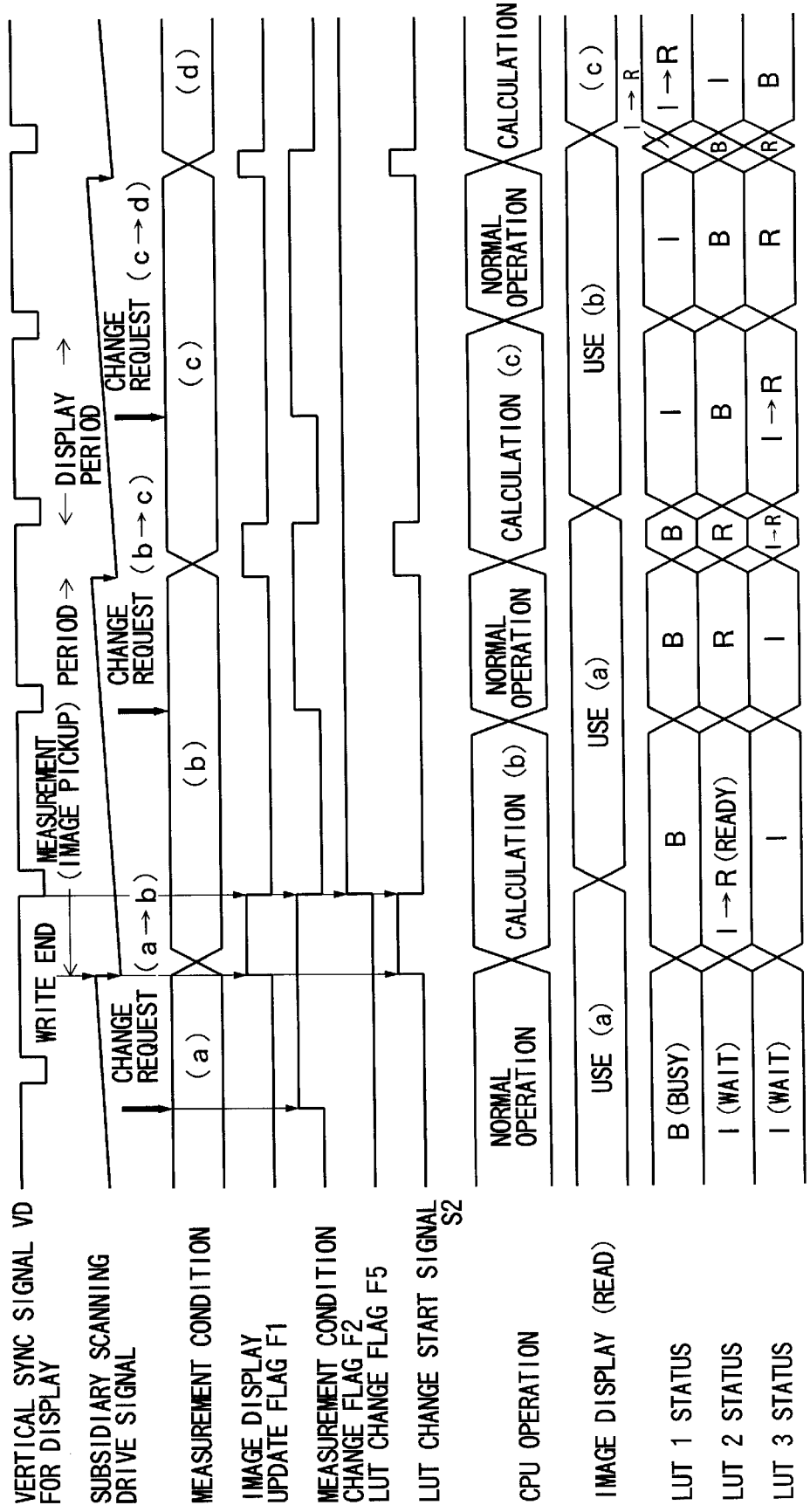
FIG. 20 is a time chart for a first example of the data output operation.

FIG. 20 is a time chart for a first example of the data output operation.

According to this example, the measurement (the write operation into the frame memory 60) and the display (the read operation from the frame memory 60) are asynchronous with each other. Therefore, the LUT 71C is composed of three subtables (hereinafter referred to as LUTs 1, 2, 3, for convenience' sake). By selectively using these LUT 1, 2, 3 properly, the new conditions can be applied to the measurement following the measurement at which the condition change request is generated.

At the time point when each measurement session ends, the image display update flag F1 is set, and cleared at the on-edge of the first subsequent vertical signal signal VD. The "on edge" referred here means a "rise section" defined as "a major transition period from pulse base to pulse top" (JIS C5620). The vertical sync signal VD is a negative logic signal, and therefore the downward transition of the signal potential constitutes what is called the rise. In the description that follows, the section or period of inverse transition of the signal level from pulse top to pulse base is called the "off edge".

Upon generation of a measurement condition change request, the measurement condition change flag F2 is set, and cleared at the on-edge of the first vertical sync signal VD after complete write operation. In the case where the measurement condition change flag F2 is in set state at the time of complete write operation, the LUT change start signal S2 is turned on and turned off at the on-edge of the first subsequent vertical sync signal VD. In the case where the image display update flag F1 is in set state at the on-edge of the vertical sync signal VD, the LUT change flag F5 latches the measurement condition change flag F2.

The CPU 51C, upon receipt of the on-edge of the LUT change start signal S2, calculates the table data corresponding to the new measurement conditions (a to d) and starts to write them in any one of the LUT 1, 2 and 3 (according to W-SEL). Also, the active LUT select circuit 553, if the LUT change flag F5 is set at the on-edge of the vertical sync signal VD, updates the designation signal U-SEL and switches the application of the LUTs 1, 2, 3. The LUTs 1, 2, 3 are used on rotation basis for B (Busy), I (idle) and R (ready) in that order.

Figure 21:
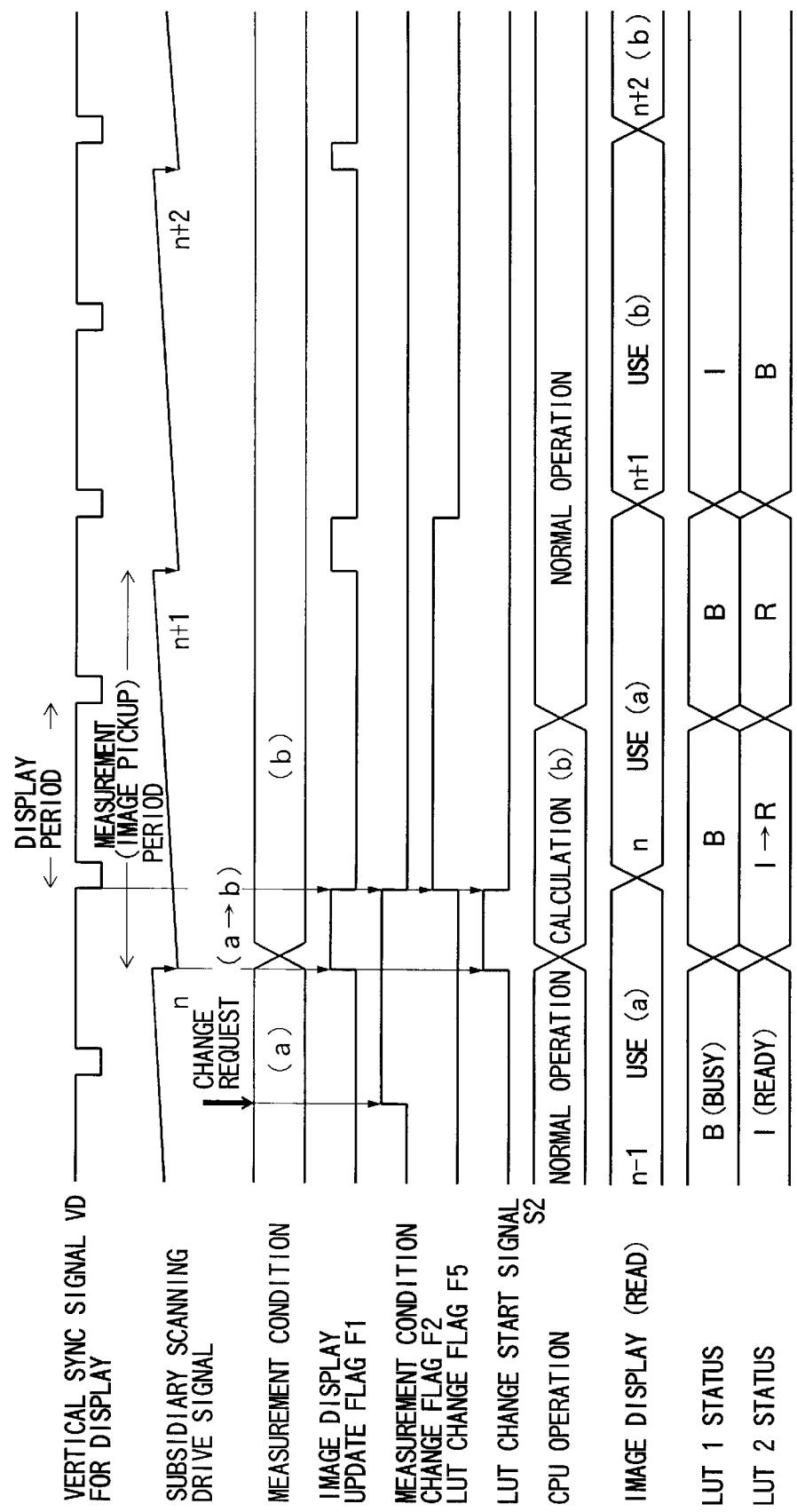
FIG. 21 is a time chart for a second example of the data output operation.

FIG. 21 is a time chart for a second example of the data output operation.

In the case where the change of the measurement conditions is not continuous, i.e. in the case where the measurement conditions are changed at the nth measurement session and the measurement conditions for the next (n+1)th measurement session are not changed at least, then, a proper distance data Dz can be output by using the two LUTs 1, 2 alternately.

Figure 22:
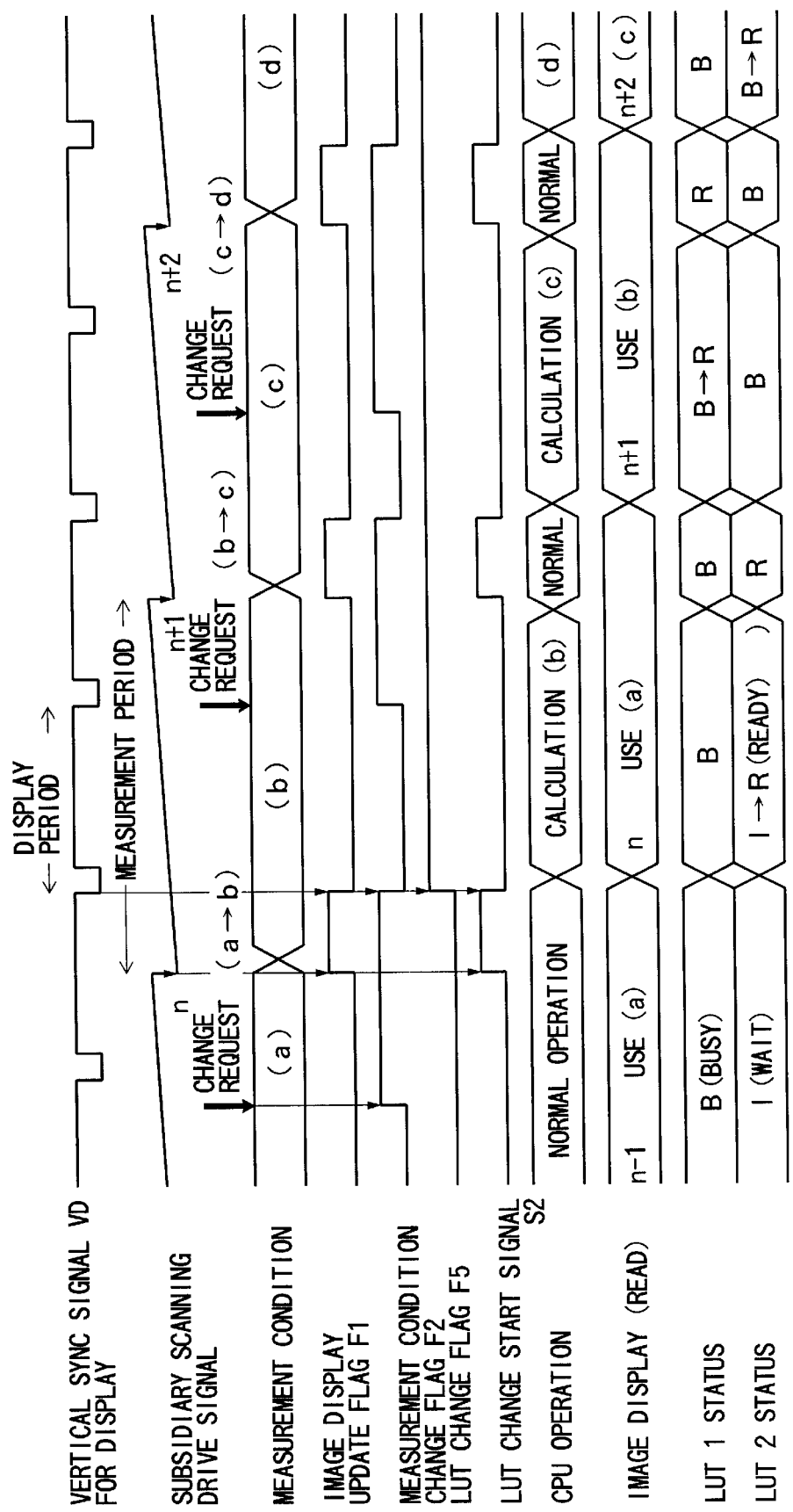
FIG. 22 is a time chart for a third example of the data output operation.

FIG. 22 is a time chart for a third example of the data output operation.

Also when the measurement and display are synchronized with each other, the two LUTs 1, 2 are selectively used alternately to output a proper distance data Dz.

The measurement period is an integer multiple of the display period and set to a length at which sufficient time can be secured for calculation of the table data for the period after setting the LUT change flag F5 and latching the measurement condition change flag F2. The CPU 51C accepts the on-edge of the LUT change start signal S2 and makes calculations and writes in the table.

Figure 23:
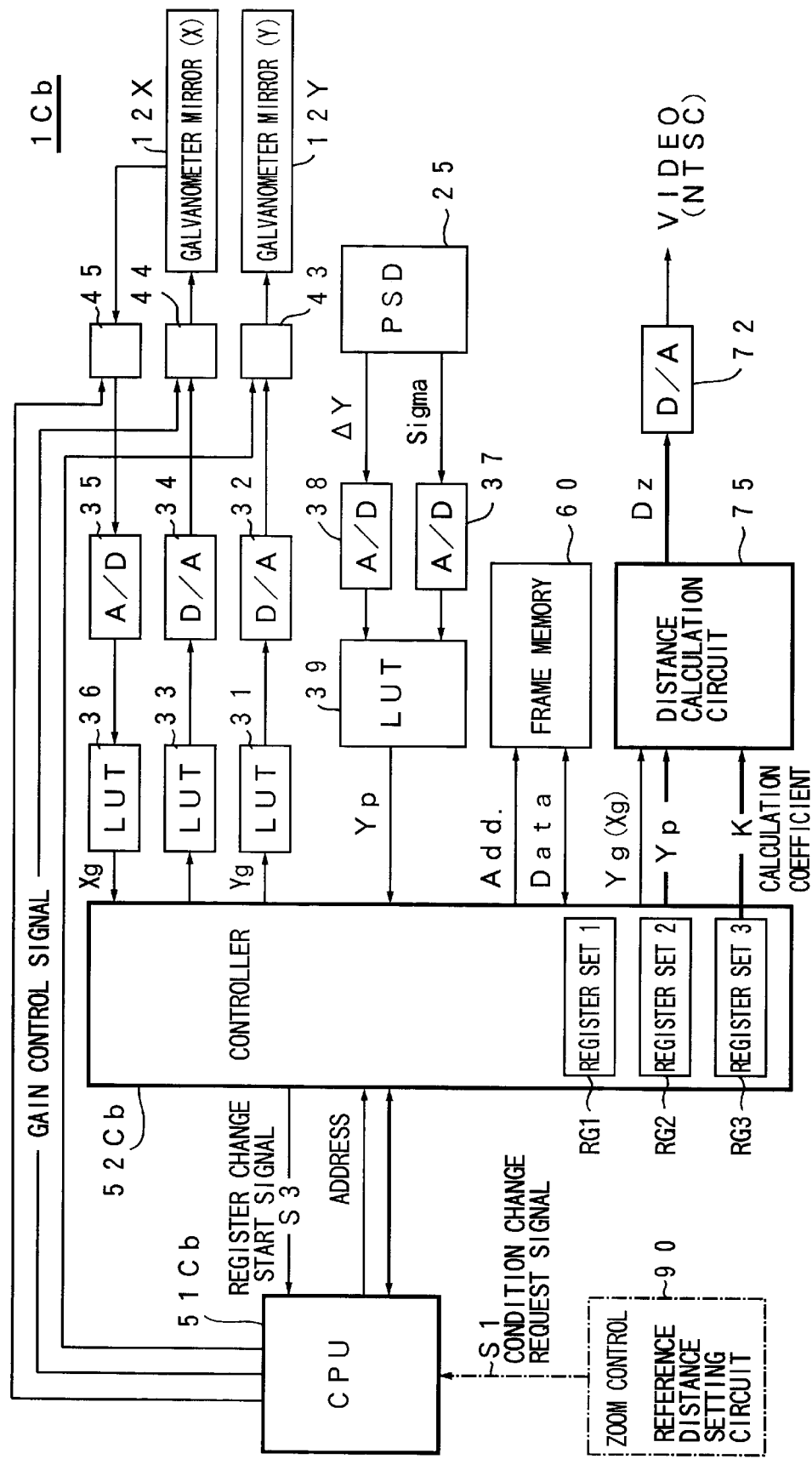
FIG. 23 is a block diagram showing the essential parts of a 3D measuring apparatus according to another modification of the third embodiment.

FIG. 23 is a block diagram showing the essential parts of the control system of a 3D measuring apparatus 1Cb according to another modification of the third embodiment. In FIG. 23, the component elements having the same function as the corresponding component elements in FIG. 17 are designated by the same reference numerals, respectively, and will not be described or only briefly described.

The feature of the configuration of the 3D measuring apparatus 1Cb is that the distance data Dz corresponding to the detection data Yp is calculated in hardware fashion using the distance calculation circuit 75 instead of referring to the look-up table. The controller 52Cb includes three register sets RG1 to RG3 for switching the contents of the distance calculation in accordance with the measurement conditions. The distance calculation circuit 75 acquires a calculation coefficient K and makes a predetermined calculation with reference to the third register set RG3, for example. The other register sets RG1 and RG2 are used for temporarily storing the calculation coefficient K calculated by the CPU 51Cb in response to the change in the measurement conditions, and the stored contents are duplicated in the register set RG3 appropriately.

Figure 24:
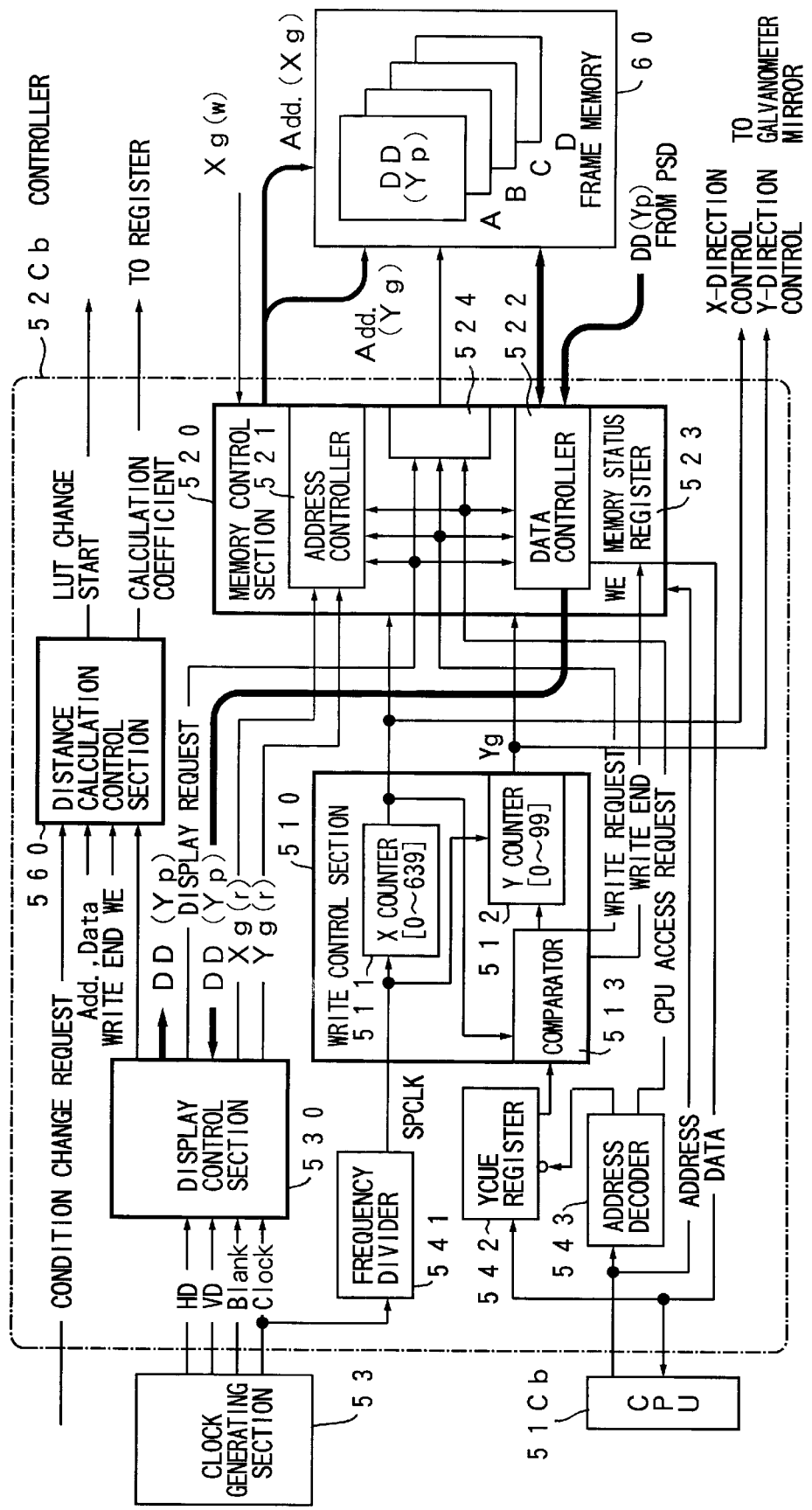
FIG. 24 is a block showing a functional configuration of the controller of FIG. 23.
Figure 25:
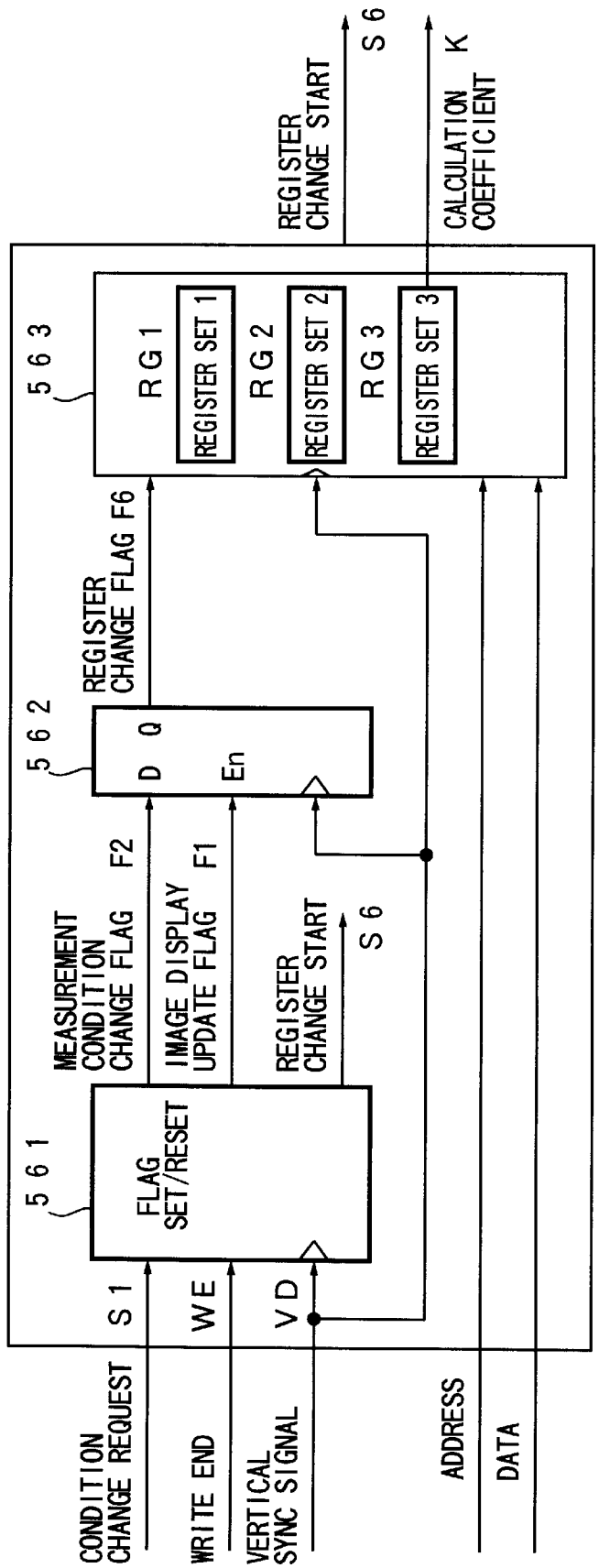
FIG. 25 is a diagram showing a configuration of the distance calculation control section of FIG. 24.

FIG. 24 is a block diagram showing a functional configuration of the controller 52Cb of FIG. 23, and FIG. 25 is a diagram showing a configuration of the distance calculation control section 560 of FIG. 24.

The controller 52Cb includes a write control section 510, a memory control section 520, a display control section 530 and a distance calculation control section 560. The distance calculation control section 560 includes a flag control circuit 561, a D flip-flop 562 and a memory circuit 563 having register sets RG1 to RG3. These component elements are supplied with a vertical sync signal VD for display as an operation clock. The flag control circuit 561 is supplied with a condition change request signal S1 and a write end signal WE from the write control section 511. The flag control circuit 561 outputs the measurement condition change flag F2, the image display update flag F1 and the register change start signal S6. The measurement condition change flag F2 is delayed by the D flip-flop 552 and supplied to the memory circuit 53 as a register change flag F6. The image display update flag F1 constitutes an enable signal for the D flip-flop 562. The register change start signal S6 is sent to the CPU 51Cb.

Figure 26:
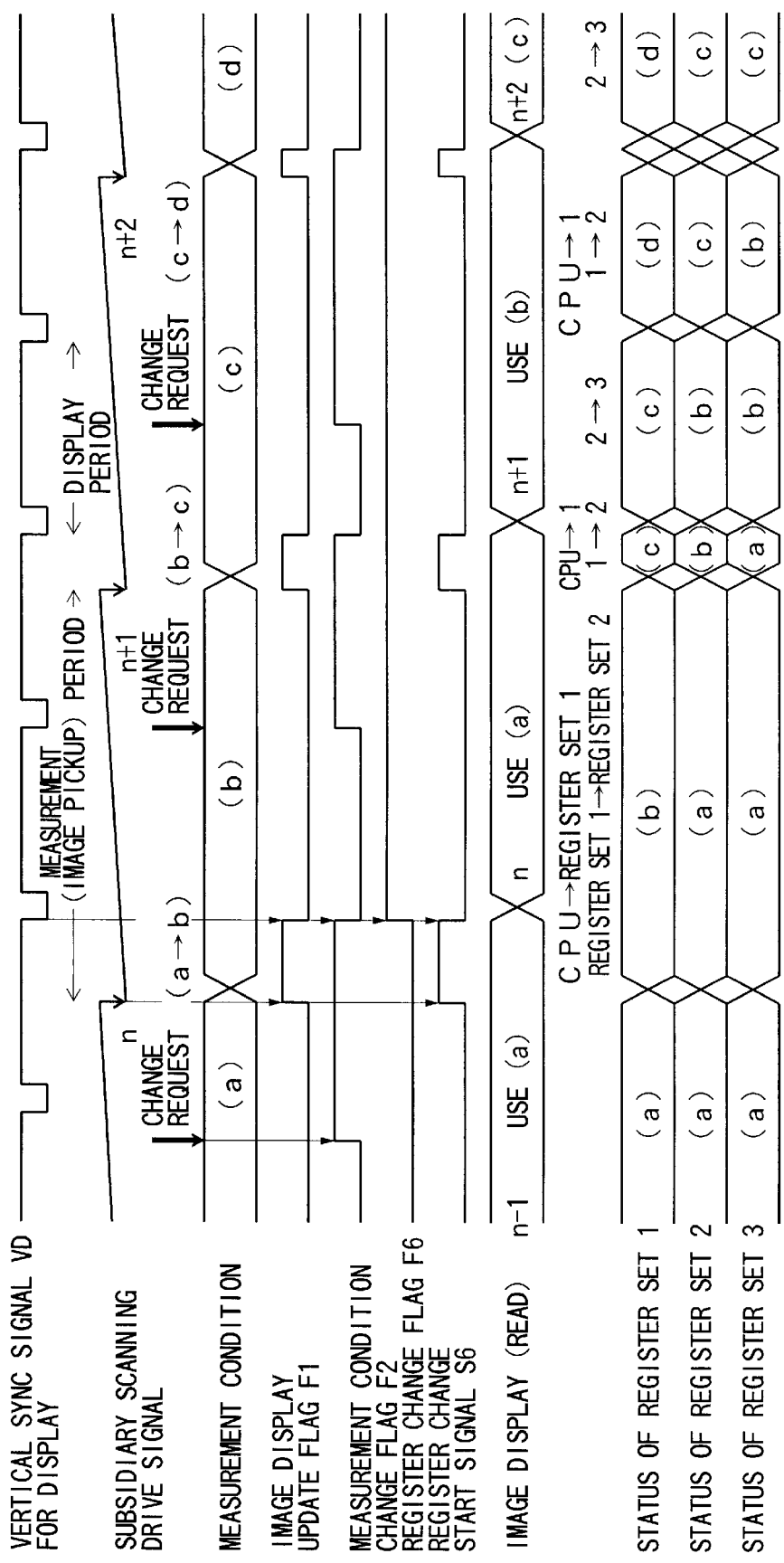
FIG. 26 is a time chart for a fourth example of the data output operation.

FIG. 26 is a time chart for a fourth example of the data output operation.

In this example, like in the case of FIG. 20, the measurement and the display are asynchronous with each other, and therefore three register sets RG1 to RG3 (designated as register sets 1, 2, 3 by way of convenience in FIG. 20) are used. By using these register sets RG1 to RG3 selectively, new conditions can be applied from the measurement following the measurement in which the condition change request is issued.

At the time point when each measurement session ends, the image display update flag F1 is set, and cleared at the on-edge of the first subsequent vertical sync signal VD. Upon occurrence of a measurement condition change request, the measurement condition change flag F2 is set, and cleared at the on-edge of the first vertical sync signal V after the end of the write operation. If the measurement condition change flag F2 is set after the end of the write operation, the register change start signal S6 is turned on and turned off at the on-edge of the first subsequent vertical sync signal VD. The register change flag F6 latches the measurement condition change flag F2 if the image display update flag F1 is set at the on-edge of the vertical sync signal VD.

The CPU 51Cb, upon receipt of the on-edge of the register change start signal S6, calculates the calculation coefficient K corresponding to the new measurement conditions (a to d) and starts writing them into the first register set RG1. In the process, the contents of the register set RG1 previously written are copied to the second register set RG2. Also, if the register change flag F6 is set at the on-edge of the vertical sync signal VD, the contents of the register set RG2 are copied to the third register set RG3.

Figure 27:
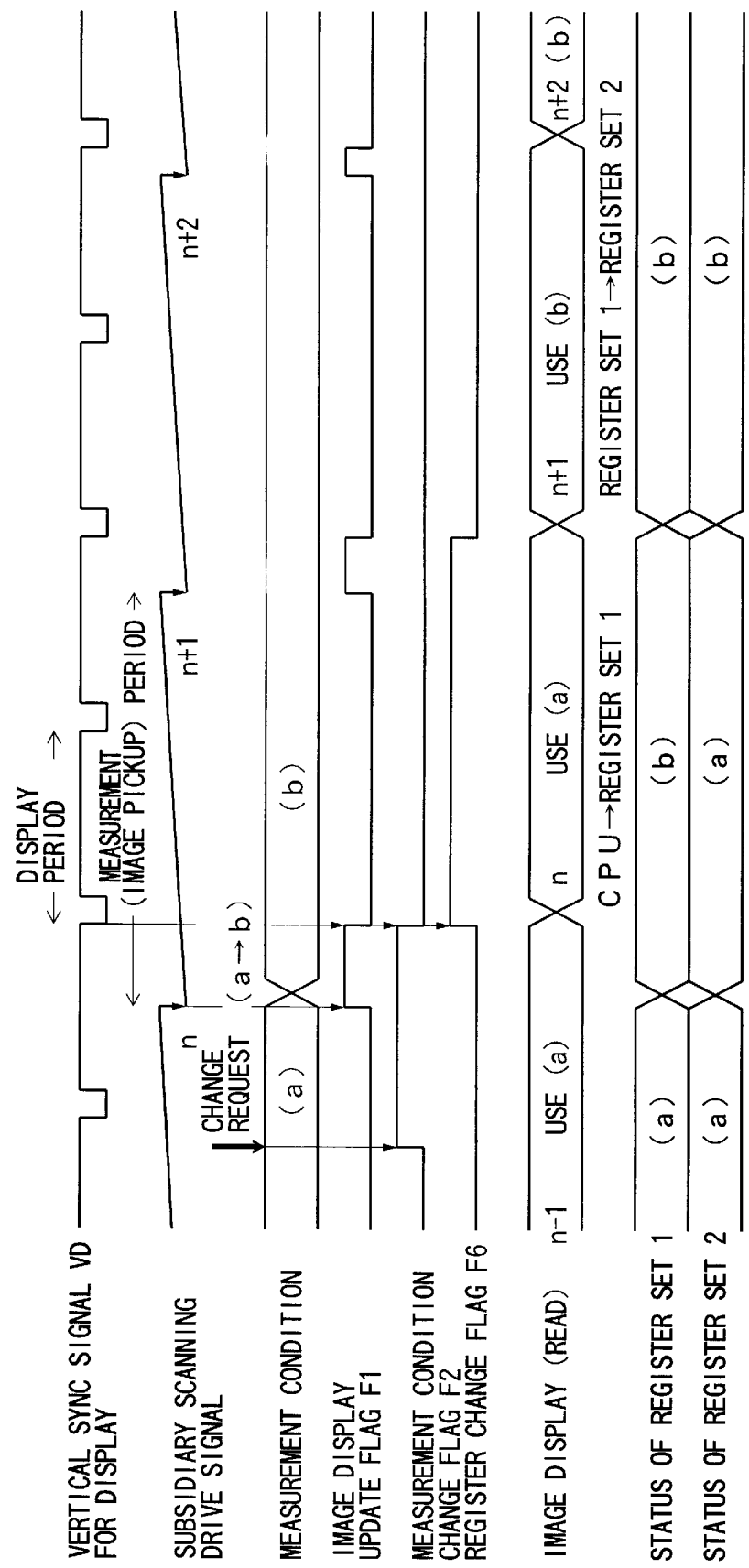
FIG. 27 is a time chart for a fifth example of the data output operation.

FIG. 27 is a time chart for a fifth example of the data output operation.

Like in the example of FIG. 21, in the case where the change of the measurement conditions is not continuous, the two register sets RG1, RG2 are selectively used thereby to output the proper distance data Dz.

The CPU 51Cb, upon receipt of the on-edge of the register change start signal S6, calculates the calculation coefficient K corresponding to the new measurement conditions (a to d) and starts writing into the first register set RG1. If the register change flag F6 is set at the on-edge of the vertical sync signal VD, the contents of the register set RG1 are copied to the register set RG2. In this example, the distance calculation circuit 75 acquires the calculation coefficient K with reference to the second register set RG2.

Figure 28:
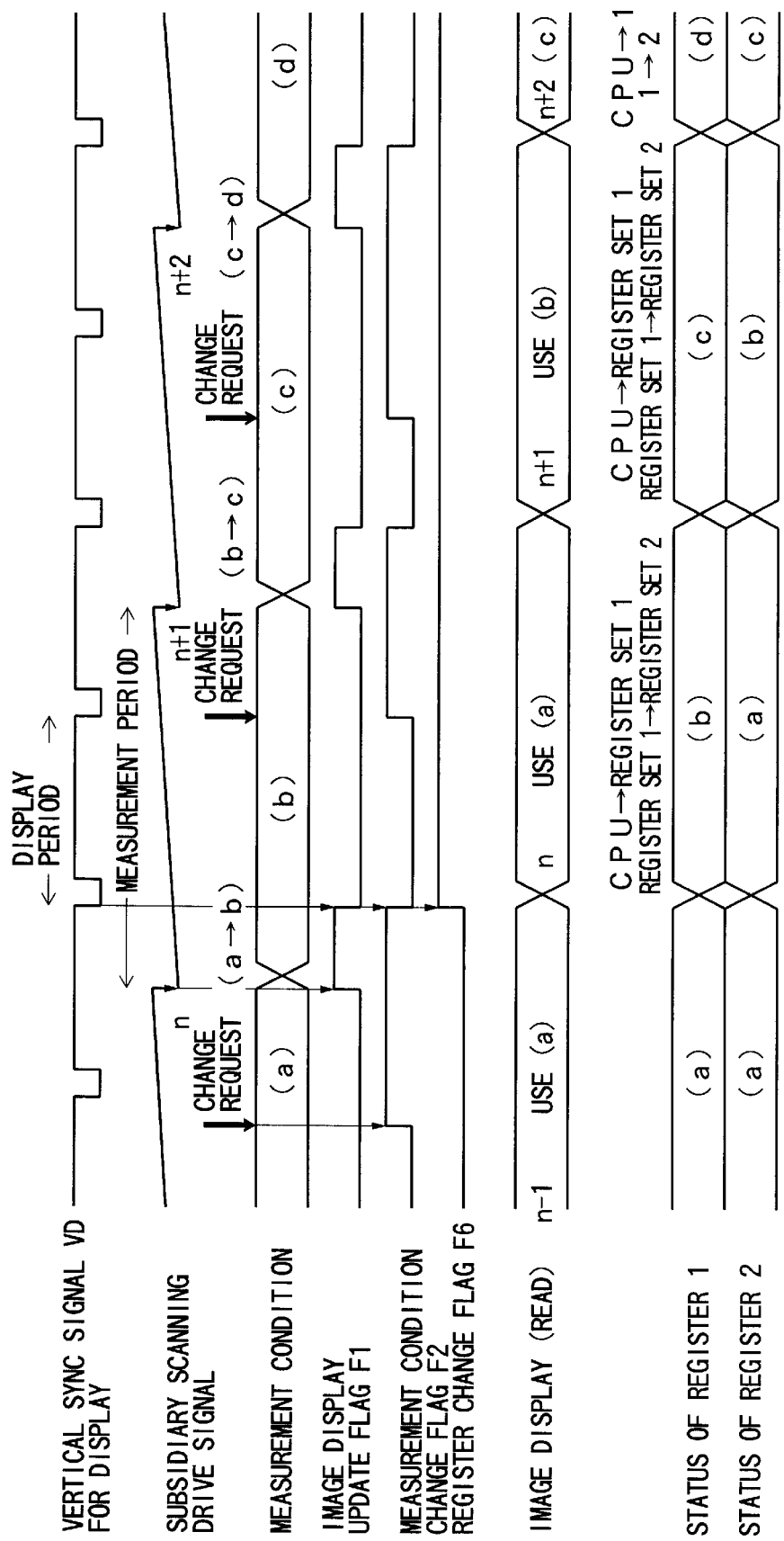
FIG. 28 is a time chart for a sixth example of the data output operation.

FIG. 28 is a time chart for the sixth example of the data output operation.

Also in the case where the measurement and the display are synchronized with each other, the two register sets RG1 and RG2 are selectively used whereby the proper distance data Dz can be output.

The period of measurement is set to an integer multiple of the display period, and after setting the LUT change flag F6 and latching the measurement condition change flag F2, the register set RG1 is written into.

In the third embodiment, the 3D measuring apparatus 1C can be configured as shown in the first embodiment of FIG. 8. Specifically, as shown in FIG. 8, the detection data Yp is not stored but input to the LUT 71 and converted into the distance data Dz. This distance data Dz is written into the frame memory 60. The position data Xg, Yg are used for address designation as in the case of FIG. 17. In outputting data to the display, the distance data Dz read from the frame memory 60 is directly input to the D/A converter 72 and converted into a video signal. The configuration of the projection system 10 and the photo-detection system 20C is the same as that of the 3D measuring apparatus 1C shown in FIG. 17.

In the configuration of this example, the detection data Yp is obtained under the original measurement conditions also at the time of the (n+1)th measurement following the nth measurement session in which the measurement condition change request is generated. During this measurement period, the table data meeting the new measurement conditions is calculated thereby and the contents of the LUT 71 are rewritten. From the (n+2)th measurement session, the new measurement conditions are used for scanning, and the distance data Dz is obtained by use of the new table data.

In the case where the distance data Dz is determined in hardware fashion by the distance calculation circuit in place of the LUTs 71, 71C and written into the frame memory 60, on the other hand, one set of registers is sufficient as means for storing the calculation coefficients.

According to the third embodiment, the memory capacity required for outputting the distance data under various conditions can be reduced. Also, while reducing the memory capacity, the measurement conditions can be changed during the continuous measurement operation repeating the measurements periodically.

[Fourth embodiment]

In the 3D measuring apparatus 1D according to the fourth embodiment, the optimum projection range is set in accordance with the angle of visibility thereby to reduce the waste of projecting outside the field of view for photo detection. As a result, the scanning efficiency is improved when the angle of visibility is changed for a reduced measurement time. The configuration of the remaining parts is basically the same as that of the third embodiment, and FIGS. 1 to 4, FIGS. 7 to 15 are applicable to the fourth embodiment with equal effect.

In the photo-detection system 20D of FIG. 1, the image-forming lens unit 21 includes a sensor (an encoder, for example) for detecting the position of a movable lens and outputs a detection signal (focal length signal) Sf sequentially at the time of zooming. This focal length signal Sf is used for controlling the scanning and the sampling period unique to the fourth embodiment. The photo-electric conversion device 25 is a 2D position sensing-type detector (PSD). The photo-detection system 20D and the projection system 10 are arranged in predetermined spaced relation from each other along Y direction, and the relative positions thereof are known. The angle of incidence of the light beam L in Y direction corresponds to the distance between the center of the photo-detection surface of the photo-electric conversion device 25 and the photo-detection spot. Depending on the zooming condition, however, the relation between the angle of incidence and the position of the object is variable. Specifically, when the focal length of the image-forming lens unit 21 is changed, the coefficient value for the distance calculation is required to be changed accordingly.

A look-up table (hereinafter referred to as LUT) 71D has as many subtables as the number n (3 stages, for example) of zooming stages. Each subtable is a collection of the conversion data equivalent to the result of the trigonometric calculation carried out for determining the distance image for measurement with a predetermined focal length, as corrected by calibration. Any one of the subtables is used in accordance with the zooming condition. In order to reduce the table memory capacity, the table contents can be rewritten in accordance with the zooming condition without being fixed.

The 3D measuring apparatus 1D changes the scanning range in main and subsidiary directions (i.e. the deflection angle range of the light beam L) in accordance with the angle of visibility changed by zooming. Therefore, the table data of the LUTs 31, 33, 36 are switched in driving the galvanometer mirrors 12X, 12Y.

Figure 29:
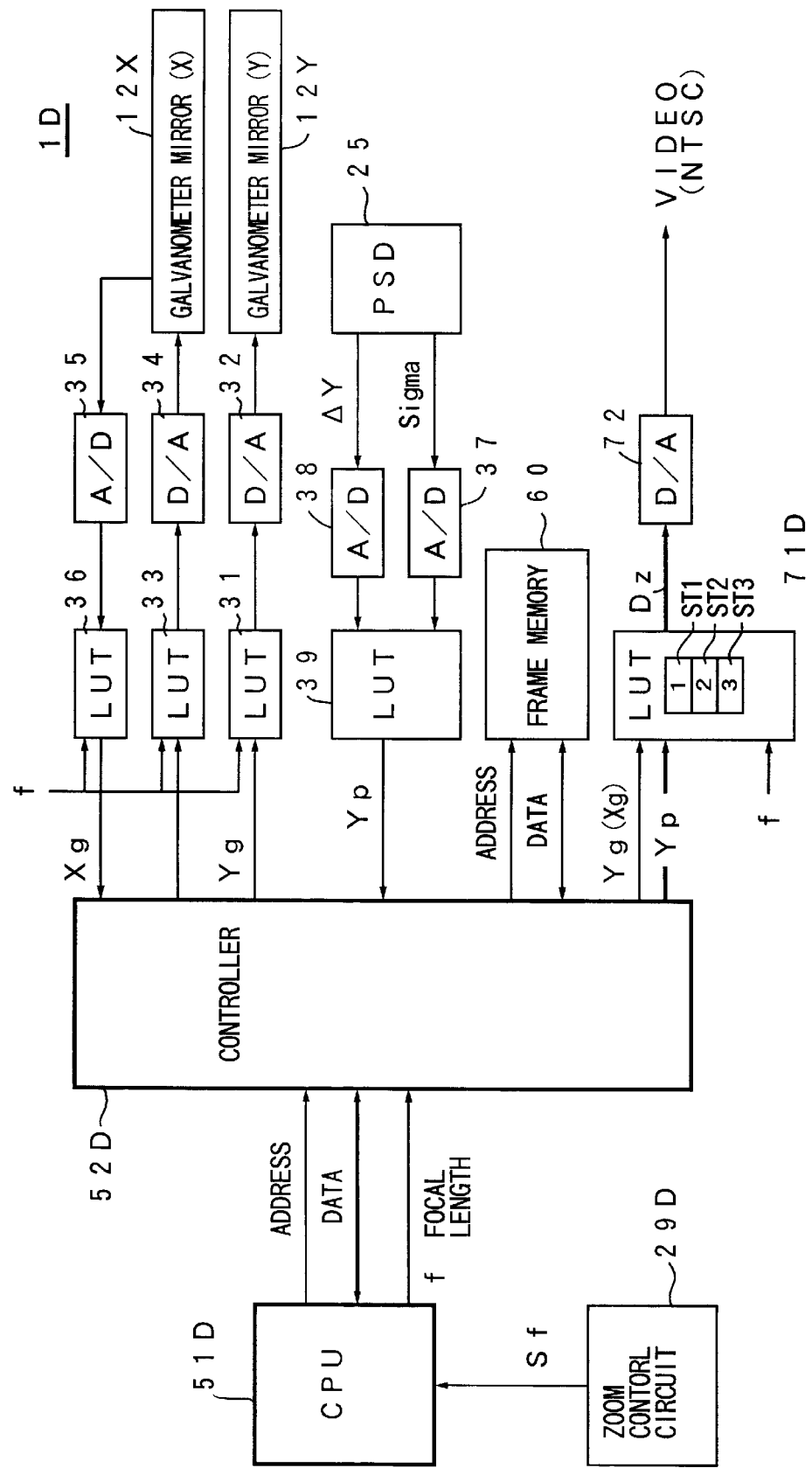
FIG. 29 is a block diagram showing the essential parts of the control system.

FIG. 29 is a block diagram showing the essential parts of the control system.

The 3D measuring apparatus 1D includes a CPU 51D having a microprocessor and a controller 52D for controlling the scanning and the data input and output. The controller 52D is a semiconductor device (a gate array, for example) including a plurality of integrated circuit modules. The galvanometer mirror 12X is driven in collaboration with the LUT 33 and the gain D/A converter 34, and the galvanometer mirror 12Y is driven in collaboration with the LUT 31 and the D/A converter 32, both under the control of the controller 52D. The LUTs 33, 31 output an angular control value (i.e. the direction of projection of the spot light) of the galvanometer mirrors 12X, 12T with respect to the count of the counters (the X counter 511 and the Y counter 512 described later) in the controller 52D. The scanning range is determined by the angular control value for the count (0 for the main scanning) at the start of scanning and the angular control value for the count (319 for the main scanning) at the end of scanning. By switching a plurality of subtables configuring the LUTs 33, 31, the output angle can be switched for the counts at the start and end of the scanning. Thus, the scanning range can be changed in accordance with the zooming as described later.

The rotational angle sensor signal (0 to 5 volts) of the galvanometer mirror 12X is converted into 12-bit data by the A/D converter 35, and input as the position data Xg to the controller 52D through the LUT 36. The LUTs 31, 33, 36 are supplied with the focal length data f corresponding to the focal length signal Sf as a signal for switching the table data.

The controller 52D is supplied with a detection data Yp from the LUT 39. The input to the LUT 39 includes two types of detection signals Sigma, ΔY output from the PSD 25, as quantized by the D/A converters 37, 38, respectively. The values of the detection signals Sigma, ΔY are expressed by the same equation as in the first embodiment.

As described with reference to the second embodiment, the position detection in X direction is not required. As long as the characteristic of the peripheral portion of the photo-detection surface of the PSD 25 is satisfactory, therefore, the detection data Yp can be calculated in simplified fashion based on the signals Y1, Y2 in Y direction. In such a case, the value of the detection data Yp is expressed as Yp=(Y1−Y2)/(Y1+Y2)

The controller 52D writes the detection data Yp input during the scanning period into a predetermined bank of the frame memory 60 sequentially, and concurrently with this, reads from other banks the detection data Yp written previously and transfer them to the LUT 71D. In the LUT 71D, a subtable designated in the focal length data f among n (3 in the shown case) subtables ST1 to ST3 is used for calculating the distance data Dz. The CPU 51D receives the focal length signal Sf from the zoom control circuit 29D and generates the focal length data f, which is supplied to the object of control.

Figure 30:
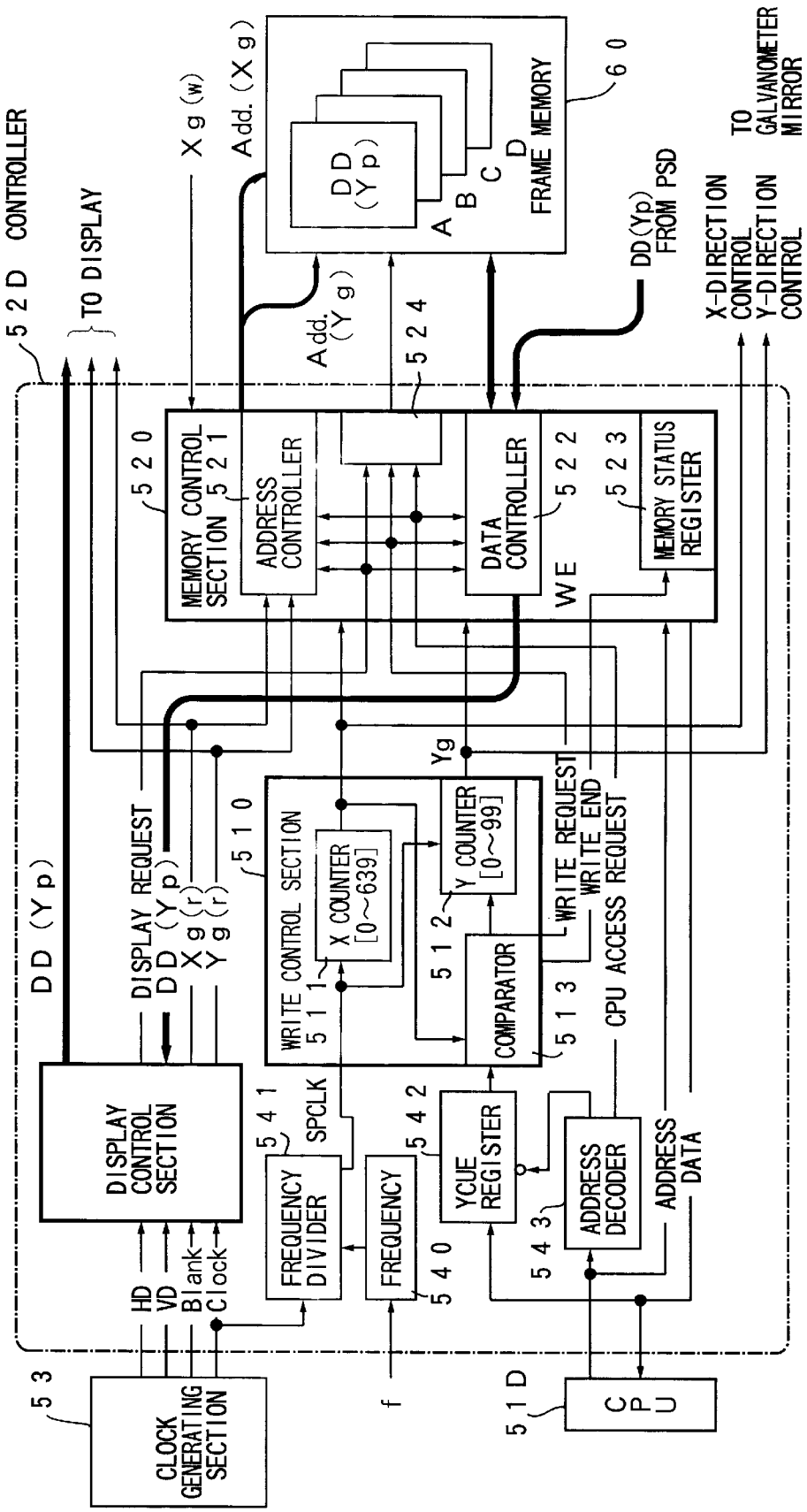
FIG. 30 is block diagram showing a functional configuration of the controller of FIG. 29.

FIG. 30 is a block diagram showing a functional configuration of the controller 52D of FIG. 29.

The basic configuration of the controller 52D is similar to that of the controller 52 included in the first embodiment.

The scanning range is determined by the LUTs 33, 31. The scanning rate is changed by switching the subtables of the LUTs 33, 31. When the mode is set to TELE, the distance coverage of the spot light is small as compared with the count-up of the count value, and therefore the scanning rate is decreased. The scanning time per screen remains the same under this condition. In TELE mode, therefore, the sampling period is shortened to increase the scanning rate. A shortened sampling period (sampling clock SPCLK) increases the counting rate of the counter and thus increases the scanning rate. The sampling period is set in such a manner that the scanning rate in the main scanning direction assumes a value in the neighborhood of the upper limit of the performance of the galvanometer mirror 12X. The sampling clock SPCLK is used also as a write timing signal for the memory.

The X counter 511 and the Y counter 512 are supplied with the sampling clock SPCLK from the frequency divider 541. The period of the sampling clock SPCLK is changed in accordance with the zooming. Specifically, the frequency divider 541 divides the frequency of the original clock in accordance with the output of the sampling setting circuit 540 such as a LUT for designating the frequency division rate corresponding to the focal length data f. The count (0 to 639) of the X counter 511 is used for controlling the drive of main scanning. The count (0 to 99) of the Y counter 512, on the other hand, is used for controlling the drive of the subsidiary scanning and address designation. The comparator 513 and the YCUE register 542 are provided for adjusting the timing of the subsidiary scanning described above. The optimum value corresponding to the measurement conditions is set by the CPU 51D in the YCUE register 542. The address decoder 543 switches between the mode of the CPU 51D designating an address directly for accessing the frame memory 60 and the mode of the write control section 510 designating an address for accessing. The data read from the frame memory 60 with the address designated by the CPU 51D are transferred through the memory control section 520 to the CPU 51D.

Figure 31:
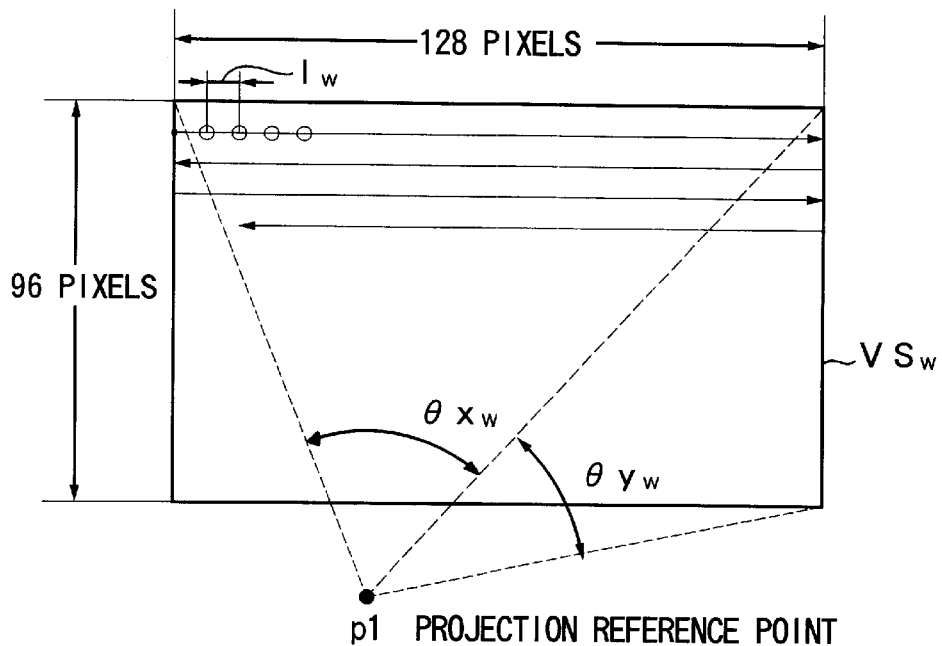
FIG. 31(A) and FIG. 31(B) are diagrams showing the relation between the zooming condition and the effective scanning range.
Figure 31:
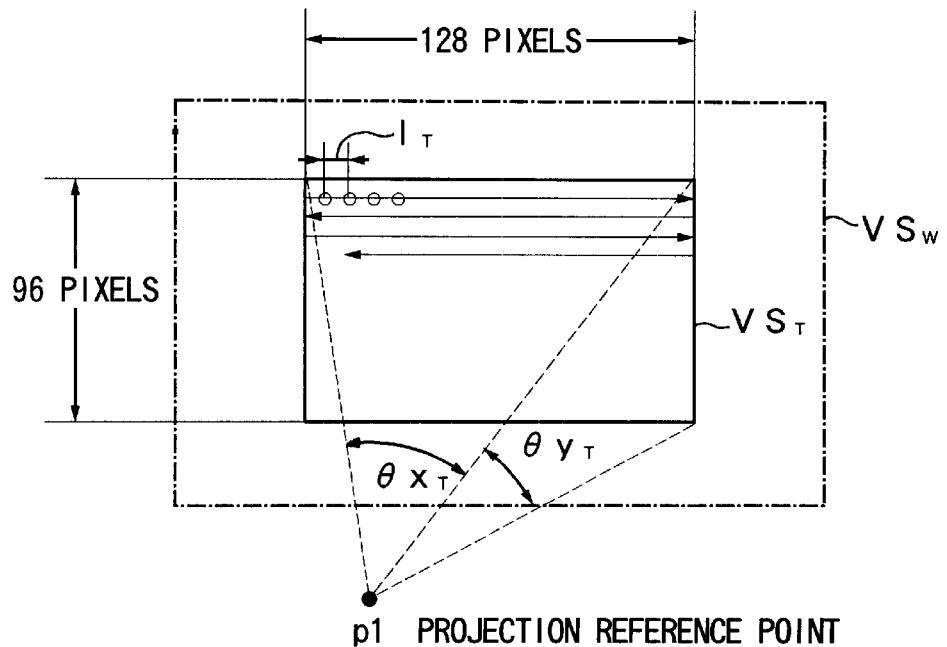
Figure 32:
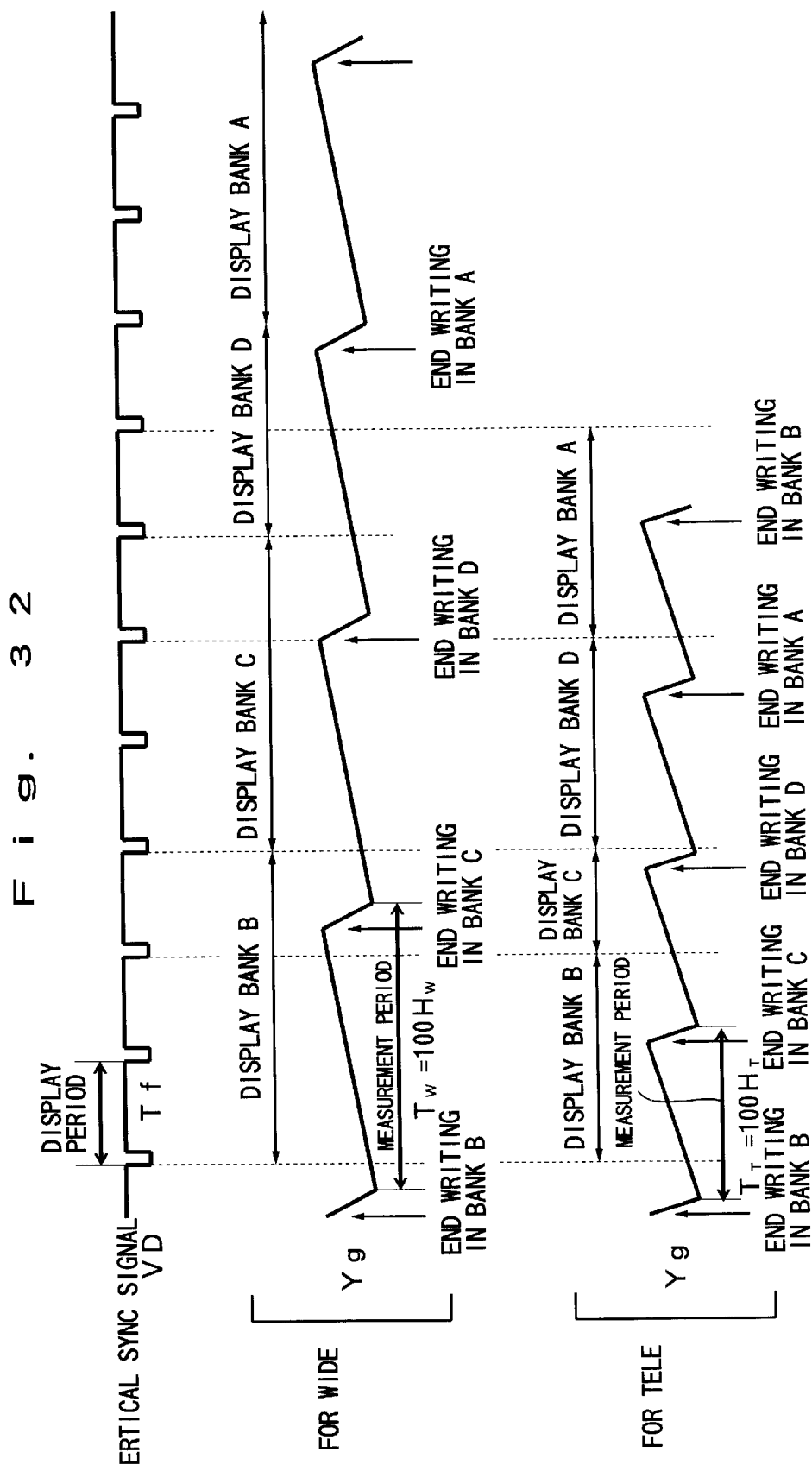
FIG. 32 is a diagram showing the relation between the zooming condition and the measurement period.

FIGS. 31A and 31B are diagrams showing the relation between the zooming condition and the effective scanning range, and FIG. 32 is a diagram showing the relation between the zooming condition and the measurement period. The present case cites the zooming conditions including the WIDE mode having the largest angle of visibility and the TELE mode having the smallest angle of visibility. Actually, however, the angle of visibility is intermediate between the two.

In the case where the distance between the 3D measuring apparatus 1D and the object of measurement (strictly, the position of the virtual surface VS along the depth) remains the same, the virtual surface VS becomes smaller with the decrease of the angle of visibility in zooming. Specifically, as shown in FIG. 31B, the virtual surface $VS_T$ in TELE mode is smaller than the virtual surface $VS_W$ in WIDE mode. If the light beam is deflected in TELE mode in the same manner as in WIDE mode ignoring this difference, the excessive scanning outside of the virtual surface $VS_T$ would result in a wasteful excess of scanning time. In view of this, according to this embodiment, the deflection angle of the light beam is changed in accordance with the angle of visibility so as to scan the area including the virtual surface VS and the appropriate surrounding marginal area in the directions of main and subsidiary scanning. The deflection angles $\theta x_T$, $\theta y_T$ in the directions of main and subsidiary scanning, respectively, in TELE mode are smaller than the deflection angles $\theta x_W$, $\theta y_W$ in WIDE mode ($\theta x_W > \theta x_T$, $\theta y_W > \theta y_T$). The upward and downward change of the deflection angles $\theta x_W$, $\theta y_W$ are accomplished by switching the table data according to the focal length data f in the LUTs 33, 31 described above (FIG. 29) for driving the galvanometer mirrors 12X, 12Y.

As described above, the scanning rate (galvanometer mirror 12X) is controlled to a substantially constant value in the neighborhood of the upper limit of performance. In the case where the scanning range is changed to coincide with the virtual surfaces $VS_W$, $VS_T$, therefore, the scanning time in TELE mode becomes shorter than the scanning time in WIDE mode as shown in FIG. 32. In TELE mode, as seen from FIG. 32, the measurements are repeated at a period $T_T$ shorter than the period $T_W$ for the WIDE mode, thereby realizing the display of the distance image almost like the full motion.

Also, in accordance with the scanning time changed by the zooming condition, the sampling period is changed for producing the detection data Yp from the output of the photo-detection device 25. As a result, the resolution of 128×96 pixels can be measured regardless of the zooming condition. The pixel pitch $1_T$ in the main scanning direction on the virtual surface $VS_W$ in WIDE mode is necessarily smaller than the pixel pitch $1_W$ in the main scanning direction on the virtual surface $VS_W$ in WIDE mode.

In the fourth embodiment described above, the scanning range is changed according to the focal length by use of the look-up table. Nevertheless, a similar object can be achieved by controlling the analog signal. Specifically, the outputs of the D/A converters 32, 34 in the last half stage of the LUTs 31, 33 and the input to the A/D converter 35 in the first half stage of the LUT 36 are adjusted by the analog signal processing means such as a gain setting circuit. In the case where there are only a few number of zooming stages, the look-up table is simple in format. In conducting the zooming in multiple stages, however, the analog processing is more advantageous due to a lower circuit cost.

In accessing the frame memory 60, the count on the X counter 511 for driving can be used as it is as an X-direction address, in place of the position data Xg based on the sensor output from the galvanometer mirror 12X.

The distance data Dz can be used not only for display but for analysis by computer or the like. External devices are not limited to those illustrated above.

The sampling period and the scanning rate are not necessarily operatively correlated to each other. Specifically, the angle of visibility and the pixel size (resolution) can be set independently of each other.

According to the fourth embodiment, the scanning efficiency is improved and the measurement time shortened when changing the angle of visibility. Also, the measurement period can be shortened in the continuous measurement operation in which the measurements are periodically repeated.

[Fifth embodiment]

In a 3D measuring apparatus 1E according to the fifth embodiment, the photo-detection surface corresponding to the field of view for measurement is configured of a plurality of photo-electric conversion devices thereby to reduce the unit photo-detection area per photo-electric conversion device. Also, a light source exclusive to each photo-electric conversion device is provided, so that each photo-electric conversion device is caused to receive the light beam emitted from a corresponding light source and reflected from an object. As an alternative, a photo-electric conversion device is selected appropriately in accordance with the progress of scanning and a signal is produced.

Figure 33:
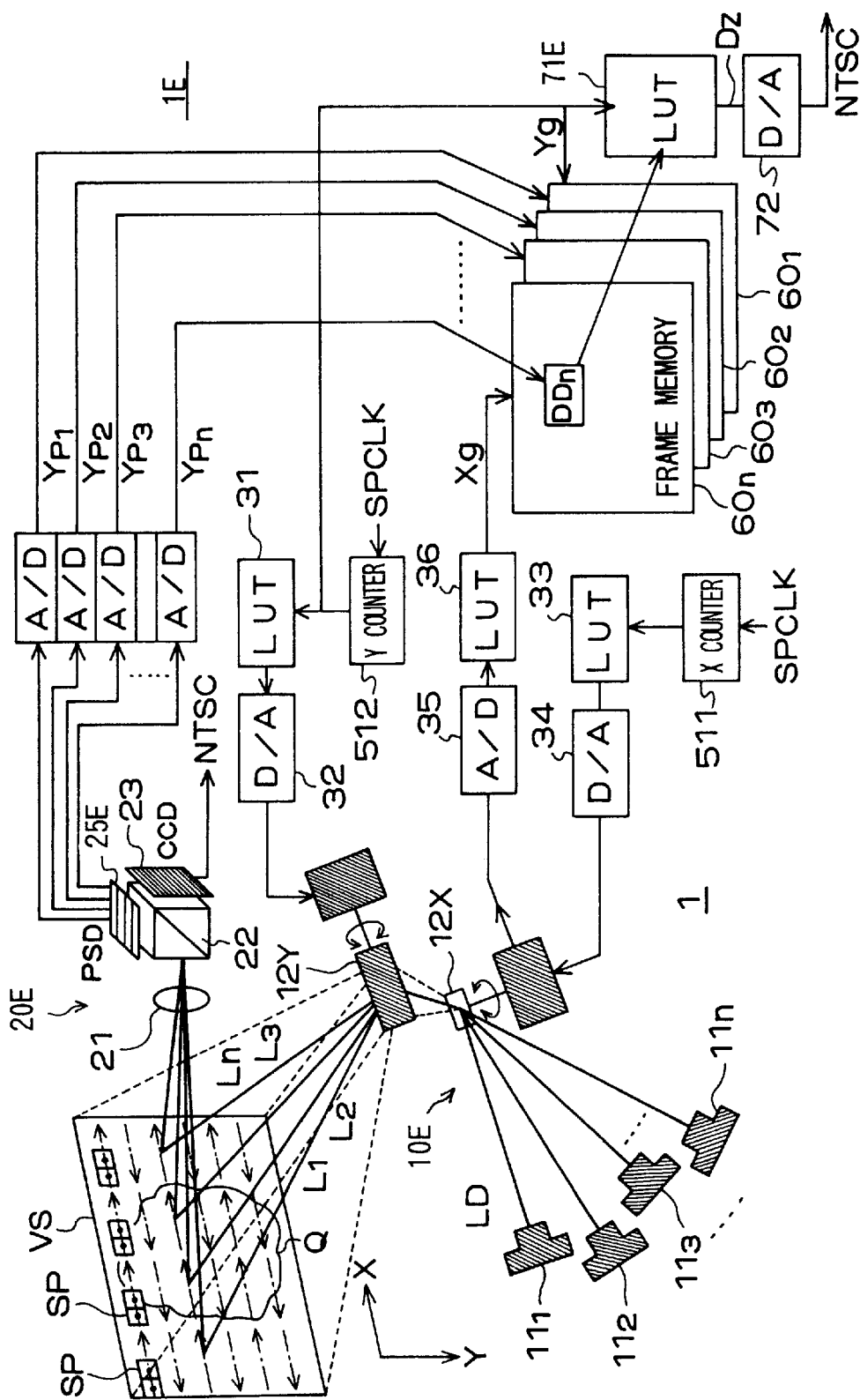
FIG. 33 is a diagram schematically showing a 3D measuring apparatus according to a fifth embodiment.
Figure 34:
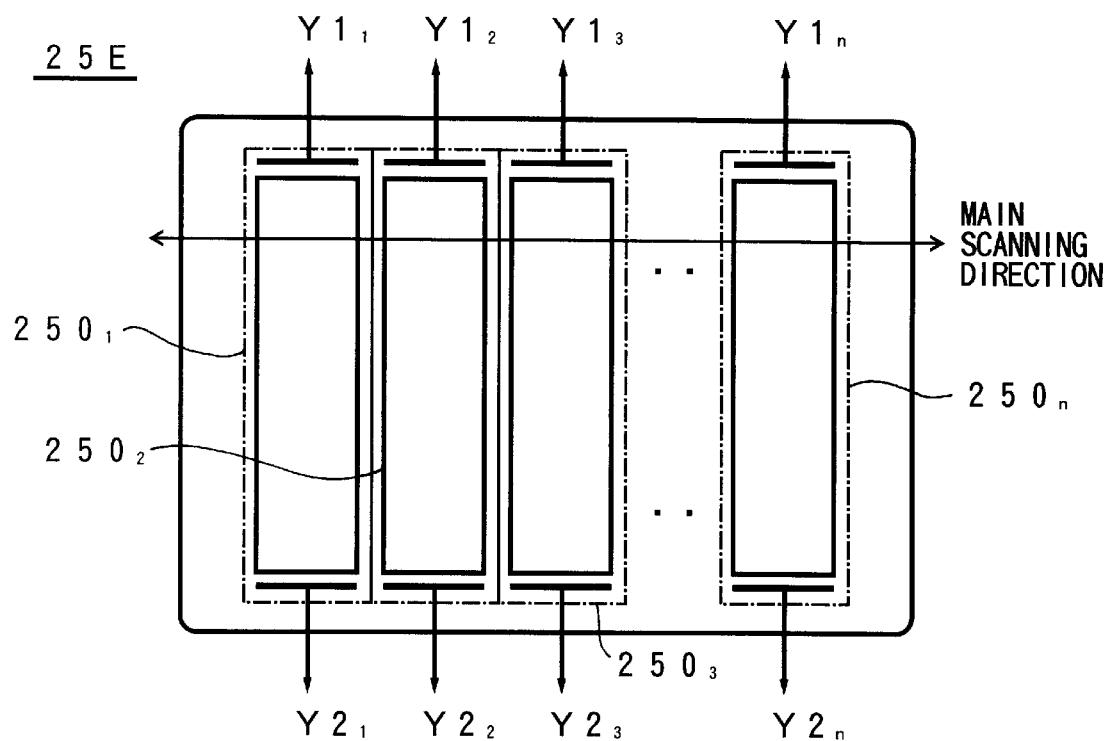
FIG. 34 is a diagram showing a configuration of a photo-detection sensor array.

FIG. 33 is a diagram schematically showing the 3D measuring apparatus 1E according to the fifth embodiment, and FIG. 34 is a diagram showing a configuration of a photo-detection sensor array 25E.

The 3D measuring apparatus 1E comprises a projection system 10E for projecting light beams $L_1$ to $L_n$ in such a manner as to raster scan toward the virtual surface VS, a photo-detection system 20E for receiving the light beams $L_1$ to $L_n$ reflected from the object Q of measurement, and a frame memory 60 for storing the data DD corresponding to measurements.

The projection system 10E includes n semiconductor lasers (LD) $11_1$ to $11_n$ constituting a light source, a galvanometer mirror 12X making up main scanning means, and a galvanometer mirror 12Y making up subsidiary scanning means. The galvanometer mirrors 12X, 12Y each include a mirror for reflecting the light beams and an electromagnetic mechanism for rotating the mirror, by which a total of n beams $L_1$ to $L_n$ are collectively deflected and led to the virtual surface VS. Specifically, the virtual surface VS is divided into n portions which are concurrently scanned. The light beams LD $11_1$ to $11_n$ are each used as a light source dedicated to a single portion so divided. The electromagnetic mechanism of the galvanometer mirrors 12X, 12Y is supplied with a drive voltage as the count of the clock SPCLK corrected by the look-up table and D/A converted. The main scanning is reciprocating in which the direction of the beam deflection is reversed for each line. The subsidiary scanning is intermittently conducted for each main scanning of a line. In the main scanning, the beam deflection rate is larger than in the subsidiary scanning, and therefore the control target value indicated by the drive voltage is prone to deviate from the actual rotational angle position. In view of this, in order to accurately grasp the position of the light beam spot on the virtual surface VS, a rotational angle sensor is provided on the galvanometer mirror 12X.

The photo-detection system 20E, on the other hand, includes an image forming lens 21, a prism 22 for separating the visible light and the light beam L, a CCD image pickup device 23 for outputting a color pickup image for the monitor, and a photo-detection sensor array 25 for detecting the angle of incidence of the light beams $L_1$ to $L_n$.

The photo-detection sensor array 25, as shown in FIG. 34, is a collection of n photo-electric conversion devices $250_1$ to $250_n$. The photo-electric conversion devices $250_1$ to $250_n$ are each a one-dimensional position sensor-type detector (PSD) and arranged in such a position to detect the spot position in Y direction. The width in X direction of the photo-detection surface is several to several tens times larger than the spot diameter. Each of the photo-electric conversion devices $250_1$ to $250_n$ takes charge of receiving the light beams $L_1$ to $L_n$ for scanning each subdivision area of the virtual surface VS.

The use of the PSD can increase the scanning rate as the charge accumulation is not required as compared with the CCD image pickup device. Since each of the photo-electric conversion devices $250_1$ to $250_n$ is a one-dimensional device, the photo-detection surface is smaller and the S/N ratio is higher than those of the 2D device.

The photo-detection system 20E and the projection system 10E described above are arranged in predetermined spaced relation with each other in Y direction, and their relative positions are known. Once the angle of incidence in Y direction of the light beams $L_1$ to $L_n$ incident to the prism 22 is determined, therefore, the the distance between the portion of the object Q irradiated with the light beams $L_1$ to $L_n$ and a reference position can be determined by use of the well-known trigonometric survey. The angle of incidence of the light beams $L_1$ to $L_n$ in Y direction corresponds to the distance between the center of the photo-detection surface of the photo-electric conversion devices $250_1$ to $250_n$ and the photo-detection spot. By sampling the output of the photo-electric conversion devices $250_1$ to $250_n$ periodically during the scanning period, the depth of the object Q can be measured for each subdivision sampling period sp of the virtual surface VS in X and Y directions. In other words, the distance image can be produced with the sampling period sp as a pixel.

According to this embodiment, the detection data $Yp_1$ to $Yp_n$ constituting the quantized outputs of the photo-detection sensor array 25E are written at the same time in n frame memories $60_1$ to $60_n$ as specific data $DD_1$ to $DD_n$. Each of the frame memories $60_1$ to $60_n$ is exclusively associated with a corresponding one of the photo-electric conversion devices $250_1$ to $250_n$. In accessing the frame memories $60_1$ to $60_n$, the position data Xg, Yg in X and Y directions, respectively, of each sampling period are used as an address. As a result, unlike when the detection data Yp are simply written in the order of generation, the pixel arrangement on the virtual screen providing an address space of the frame memories $60_1$ to $60_n$ coincides with the pixel arrangement on the virtual surface VS. Consequently, there is no problem posed when reading the data by designating an address in such a manner as to raster scan in a unidirectional main scanning fashion from the frame memories $60_1$ to $60_n$. In the simple write operation, on the other hand, the direction of pixel arrangement is changed line by line, and therefore pixels required to be rearranged before reading or a complicated address designation is required at the time of read operation.

The detection data $Yp_1$ to $Yp_n$ written in the frame memories $60_1$ to $60_n$ are read for displaying the distance image, and output to the display unit not shown as a video signal of NTSC scheme through the look-up table (LUT) 71E and the D/A converter 72. The LUT 71E has stored therein the conversion data equivalent to the result of trigonometric calculation for determining the distance image, as corrected by calibration. The frame memories $60_1$ to $60_n$ are read for each frame period of video display. The distance image based on the detection data Yp is 3D information of the object Q as viewed from the projection system 10E.

Figure 35:
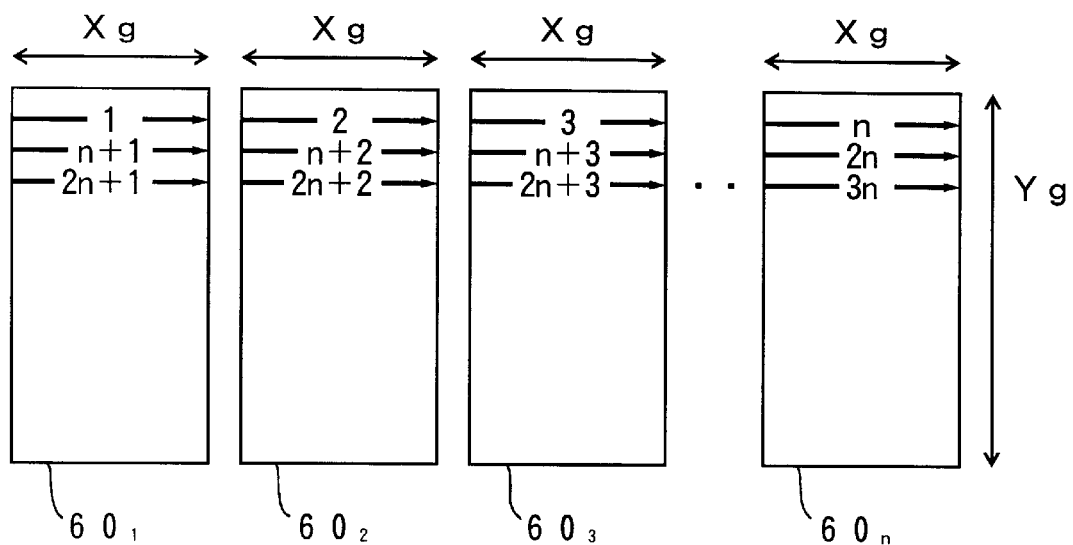
FIG. 35 is a diagram showing the manner in which the frame memory is read out.

FIG. 35 is a diagram showing the manner in which the frame memories are read.

As described above, the write operation is performed for n frame memories $60_1$ to $60_n$ at the same time, while the read operation is performed by repeating the process of reading the n frame memories $60_1$ to $60_n$, line by line in main scanning. In other words, the first frame memories $60_1$ to $60_n$ are accessed sequentially for reading a line of data.

Figure 36:
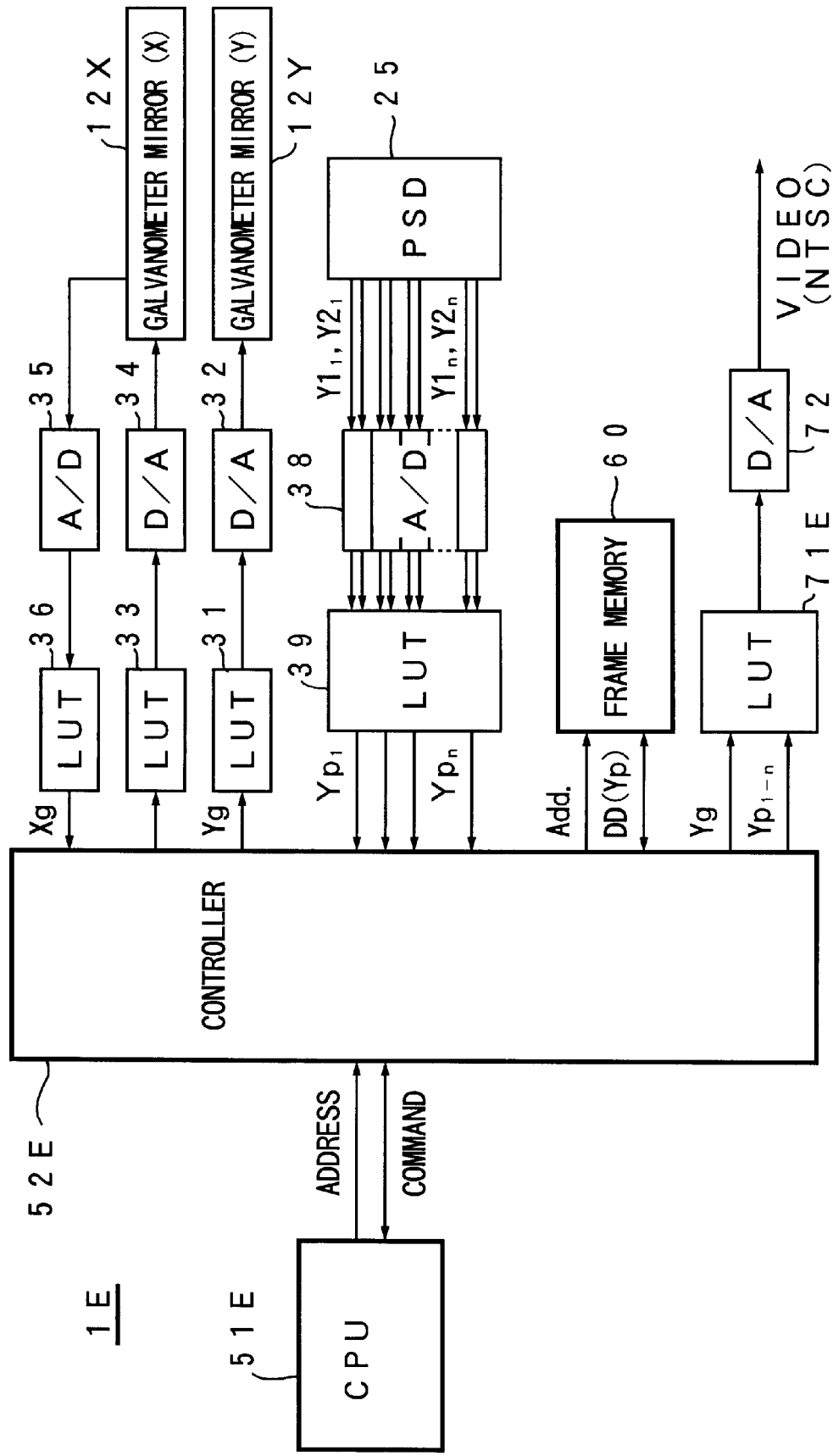
FIG. 36 is a block diagram showing the essential parts of the control system.

FIG. 36 is a block diagram showing the essential parts of the control system.

The 3D measuring apparatus 1E includes a CPU 51E having a microprocessor and a controller 52E taking charge of controlling the scanning and the data input/output. The controller 52E is a semiconductor device (a gate array, for example) including a plurality of integrated circuit modules. The galvanometer mirror 12X is controlled by the controller 52E in collaboration with the LUT 33 and the D/A converter 34, while the galvanometer mirror 12Y is controlled by the controller 52E in collaboration with the LUT 31 and the D/A converter 32. The rotational angle sensor signal (0 to 5 volts) of the galvanometer mirror 12X is converted into 12-bit data by the A/D converter 35 and input to the controller 52E as the position data Xg through the LUT 36.

The controller 52E is also supplied with the detection data Yp from the LUT 39. The input to the LUT 39 is constituted of two types of detection signals Y1, Y2 output from each of the photo-electric conversion devices $250_1$ to $250_n$ as quantized by the A/D converter 38, respectively. The value of the detection data Yp is expressed by the same equation as shown in the second embodiment.

Figure 37:
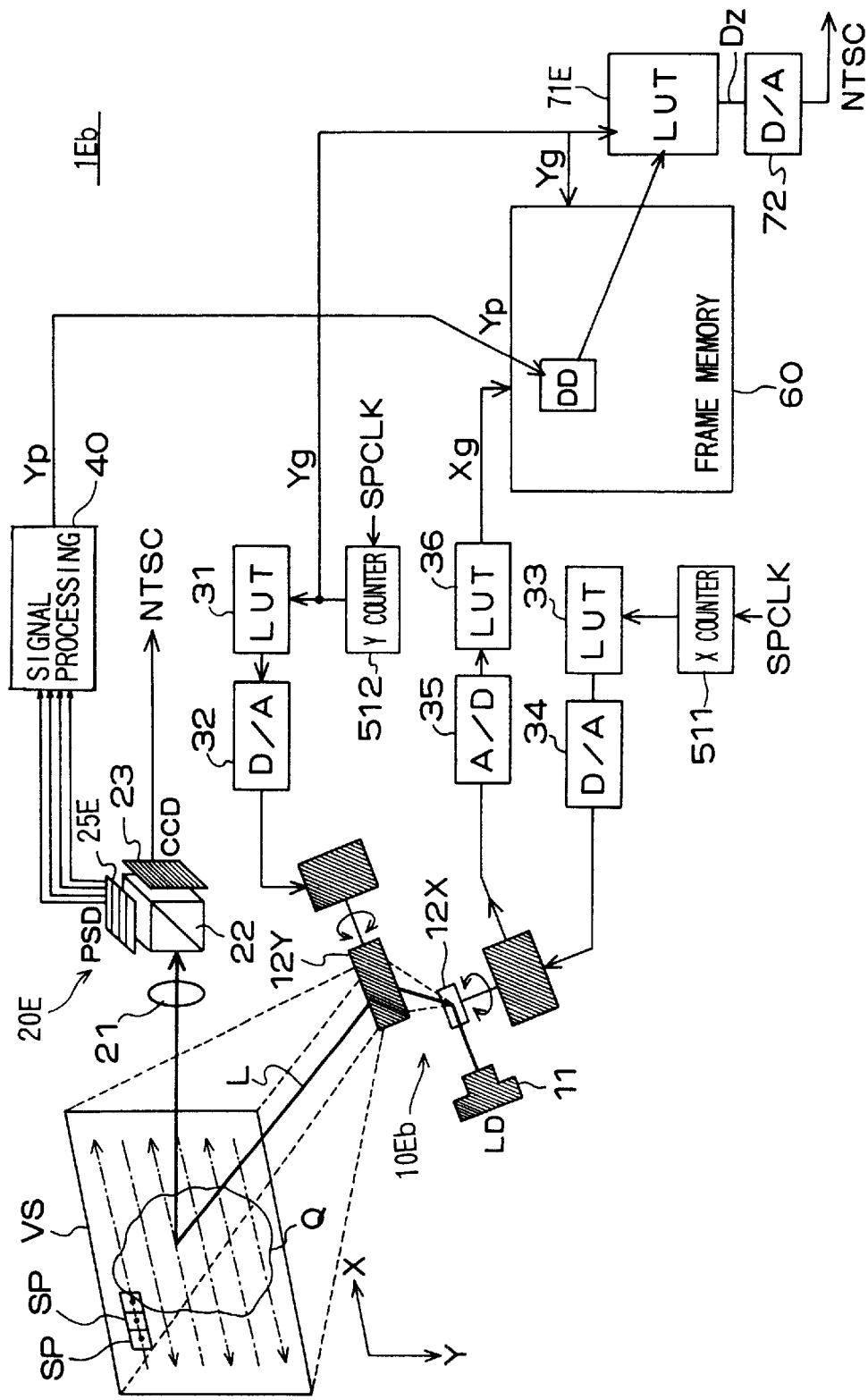
FIG. 37 is a diagram schematically showing a 3D measuring according to another modification of the fifth embodiment.

FIG. 37 is a diagram schematically showing the 3D measuring apparatus 1Eb according to another modification of the fifth embodiment. In FIG. 37, the component elements corresponding to those of FIG. 33 are designated by the same reference numerals as the latter, respectively.

The basic configuration of the 3D measuring apparatus 1Eb is similar to that of FIG. 33. The projection system 10Eb of the 3D measuring apparatus 1Eb includes a single light source (semiconductor laser) 11, a galvanometer mirror 12X constituting main scanning means, and a galvanometer mirror 12Y constituting subsidiary scanning means. In other words, the 3D measuring apparatus 1Eb is adapted to raster scan the whole virtual surface VS with a single light beam L.

The photo-detection system 20E includes, as in the aforementioned embodiments, a photo-detection sensor array 25E having n photo-electric conversion devices $250_1$ to $250_n$ (FIG. 34). The n pairs of signals output from the photo-detection sensor array 25E are applied to a signal processing circuit 40. The signal processing circuit 40 has the function of quantizing the input analog signal, validates the largest one of the n pairs of signals, and outputs the corresponding quantization data as the detection data Yp. The single light beam L used for scanning enters one of the n photo-electric conversion devices $250_1$ to $250_n$. As a result, the output value of the particular one of the photo-electric conversion devices $250_1$ to $250_n$ entered by the light beam L is remarkably larger than those of the remaining ones. Instead of selecting the output of one of the photo-electric conversion devices $250_1$ to $250_n$ by determining the magnitude of the signals as described above, the photo-electric conversion devices $250_1$ to $250_n$ can be sequentially selected at predetermined timings in accordance with the progress of the main scanning thereby to produce the detection data Yp.

The object of this embodiment can be achieved when the number of the photo-electric conversion devices $250_1$ to $250_n$ is 2 or more. In the case where the frame memories $60_1$ to $60_n$ each have a plurality of banks and the write and read operations can be performed concurrently, the data indicating the position change of a moving object can be continuously output.

Applications of the frame memories $60_1$ to $60_n$ have various modifications. For example, the detection data $Yp_1$ to $Yp_n$, instead of being stored, are input to the look-up table 71 and converted into the distance data Dz, which are written in the frame memories $60_1$ to $60_n$. In outputting data to the display, on the other hand, the distance data Dz read from the frame memories $60_1$ to $60_n$ are directly input to the D/A converter 72 for conversion into a video signal. It is also possible to use the detection data $Yp_1$ to $Yp_n$ for Y-direction address designation and to write the position data Yg in the frame memories 60. In short, the depth of the object Q as viewed from the photo-detection system 20 is measured. This configuration is preferable for some applications. The contents stored and the addresses can be replaced with each other so that selected one of the position data Yg and the detection data $Yp_1$ to $Yp_n$ is written in the frame memories $60_1$ to $60_n$, while the other data is used for Y-direction address designation. In outputting data to the display, on the other hand, one of the two types of conversion data stored in advance in the look-up table is selectively used according to the type of data written in the frame memories $60_1$ to $60_n$.

According to the fifth embodiment, the S/N ratio of the photo-electric conversion signal is improved and a high-accuracy measurement can be realized.

[Sixth embodiment]

In a 3D measuring apparatus 1F according to the sixth embodiment, the photo-electric conversion devices are finely displaced with respect to the incidence light or the incidence light is deflected finely with respect to the photo-detection surface, thereby improving the apparent resolution. In the case where a plurality of light detectors are arranged to form a photo-detection surface, for example and intermittently displaced at a pitch equal to 1/m of the pitch of arrangement and the photo-electric conversion signals are sampled at each time point, then the resolution is improved m times. As a result, a 3D measurement can be realized with a resolution higher than that of the photo-electric conversion devices constituting the 2D photo-detection surface.

Figure 38:
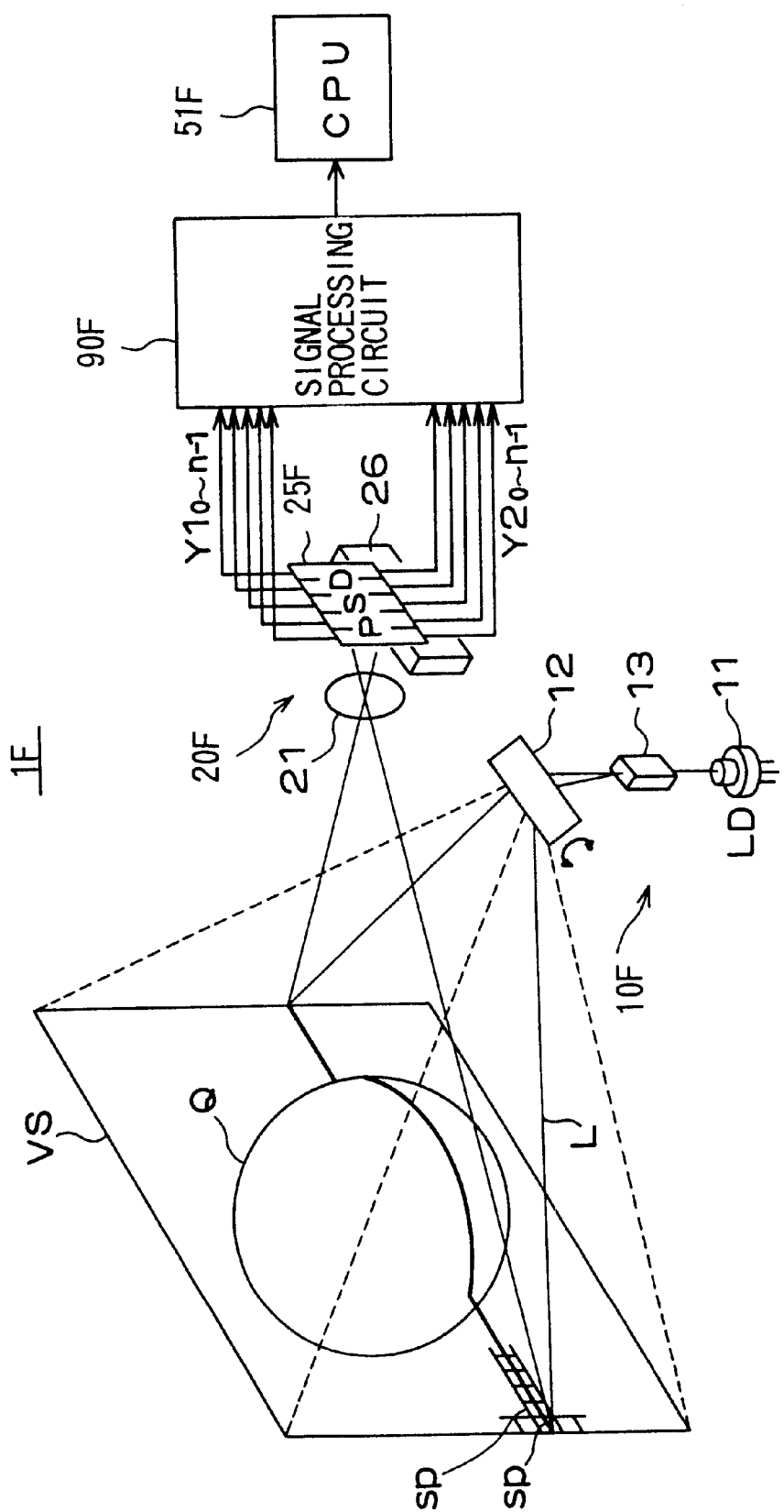
FIG. 38 is a diagram schematically showing a 3D measuring apparatus according to a sixth embodiment.

FIG. 38 is a diagram schematically showing the 3D measuring apparatus 1F according to the sixth embodiment.

The 3D measuring apparatus 1F comprises a projection system 10F for projecting the slit light L in such a manner as to linearly scan toward the virtual surface VS set as a reference plane of measurement, a photo-detection system 20F for receiving the slit light L reflected from the object Q of measurement, a signal processing circuit 90F for quantizing the detected signal, and a CPU 51F constituting control means.

The projection system 10F includes a semiconductor laser (LD) 11 making up a light source, a projection lens 13 for converting a laser beam into a slit light beam L, and a galvanometer mirror 12 constituting subsidiary scanning means. The galvanometer mirror 12 includes a mirror for reflecting the slit light L and an electromagnetic mechanism for rotating the mirror. The electromagnetic mechanism is supplied with a drive signal for changing the rotational angle of the mirror so that the subsidiary scanning rate may be constant on the virtual surface VS. The subsidiary scanning is carried out intermittently for each line of main scanning.

The photo-detection system 20F includes an image-forming lens 21, a photo-electric conversion device 25F for detecting the angle of incidence of the slit light L, and an auxiliary scanning mechanism 26 for finely moving the photo-electric device 25F in the main scanning direction. The auxiliary scanning mechanism 26 includes a piezoelectric element and a drive circuit thereof, for example.

The photo-detection system 20F and the projection system 10F described above are arranged in predetermined spaced relation (base line length) with each other, and their relative positions are known. Once the angle of incidence in Y direction of the slit light L entering the photo-electric conversion device 25F is determined, therefore, the distance between the portion of the object Q irradiated with the slit light L and a reference position in the apparatus can be determined by use of the well-known trigonometric survey. The angle of incidence of the slit light L in Y direction corresponds to the distance between the center of the photo-detection surface of the photo-electric conversion device 25F and the photo-detection spot. The CPU 51F processes the data for trigonometric calculation for determining the distance image and correcting the result thereof by calibration. If the output of the photo-electric conversion device 25F is sampled during the scanning period, the depth of the object Q can be measured for a sampling period sp constituting each of the subdivisions of the virtual surface VS in X and Y directions.

Figure 39:
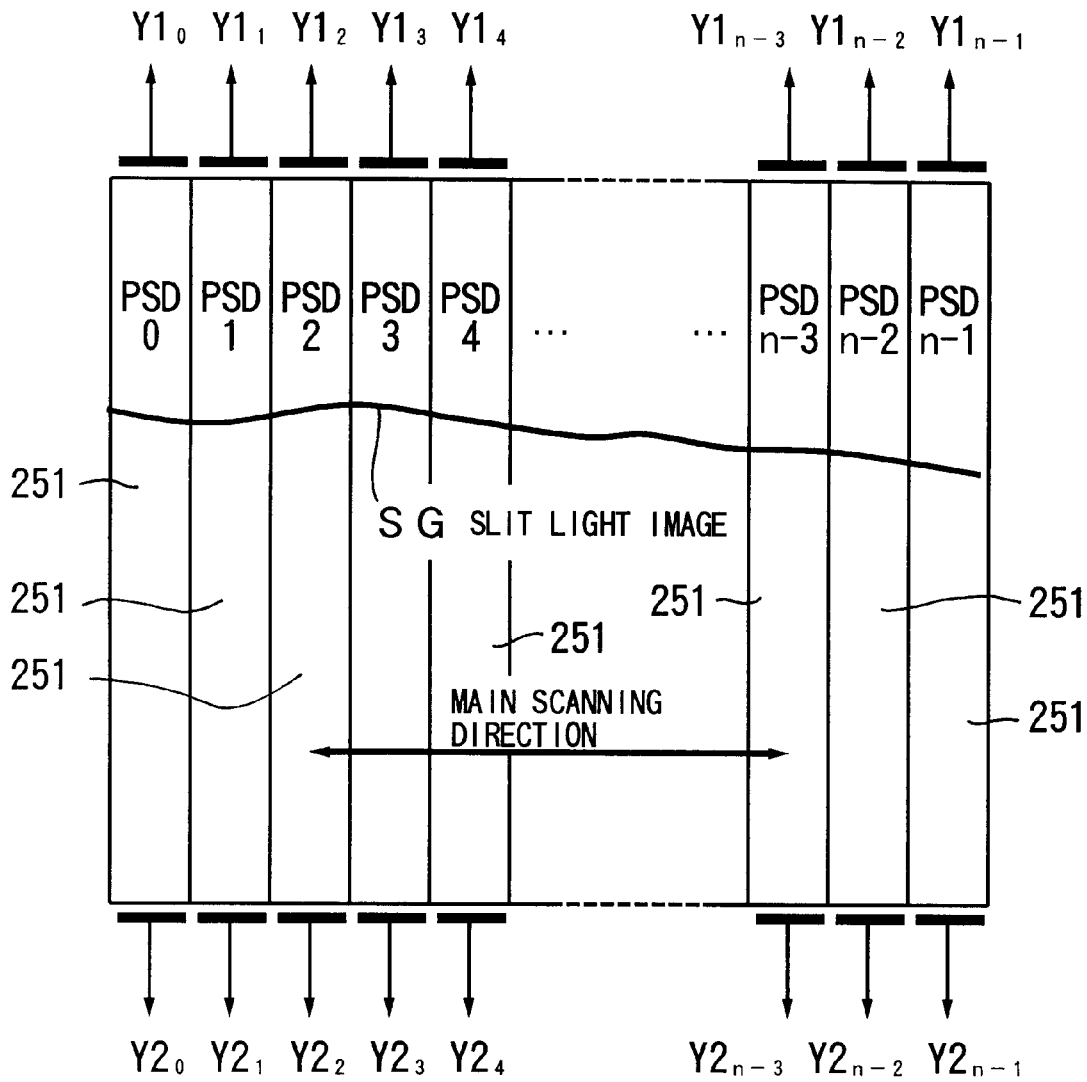
FIG. 39 is a diagram showing a configuration of a PSD array constituting a photo-electric conversion device.

FIG. 39 is a diagram showing a configuration of the PSD array 25F constituting a photo-electric conversion device.

The PSD array 25F includes a total of n (128, for example) PSDs 251 including nth to (n−1)th PSDs, which are arranged in the direction of main scanning. Each PSD 251 is a one-dimensional detector having a band-shaped photo-detection surface and outputs first and second detection signals (optical current) Y1, Y2 representing the spot positions (part of the slit light image SG) in the subsidiary scanning direction. In FIG. 39, the suffixes (0 to n−1) of the reference numerals designate the number in the order of which the PSDs 251 are arranged. All the PSDs 251 are adapted to move at the same time with respect to the slit light image SG by the auxiliary scanning mechanism 26 as described later.

Figure 40:
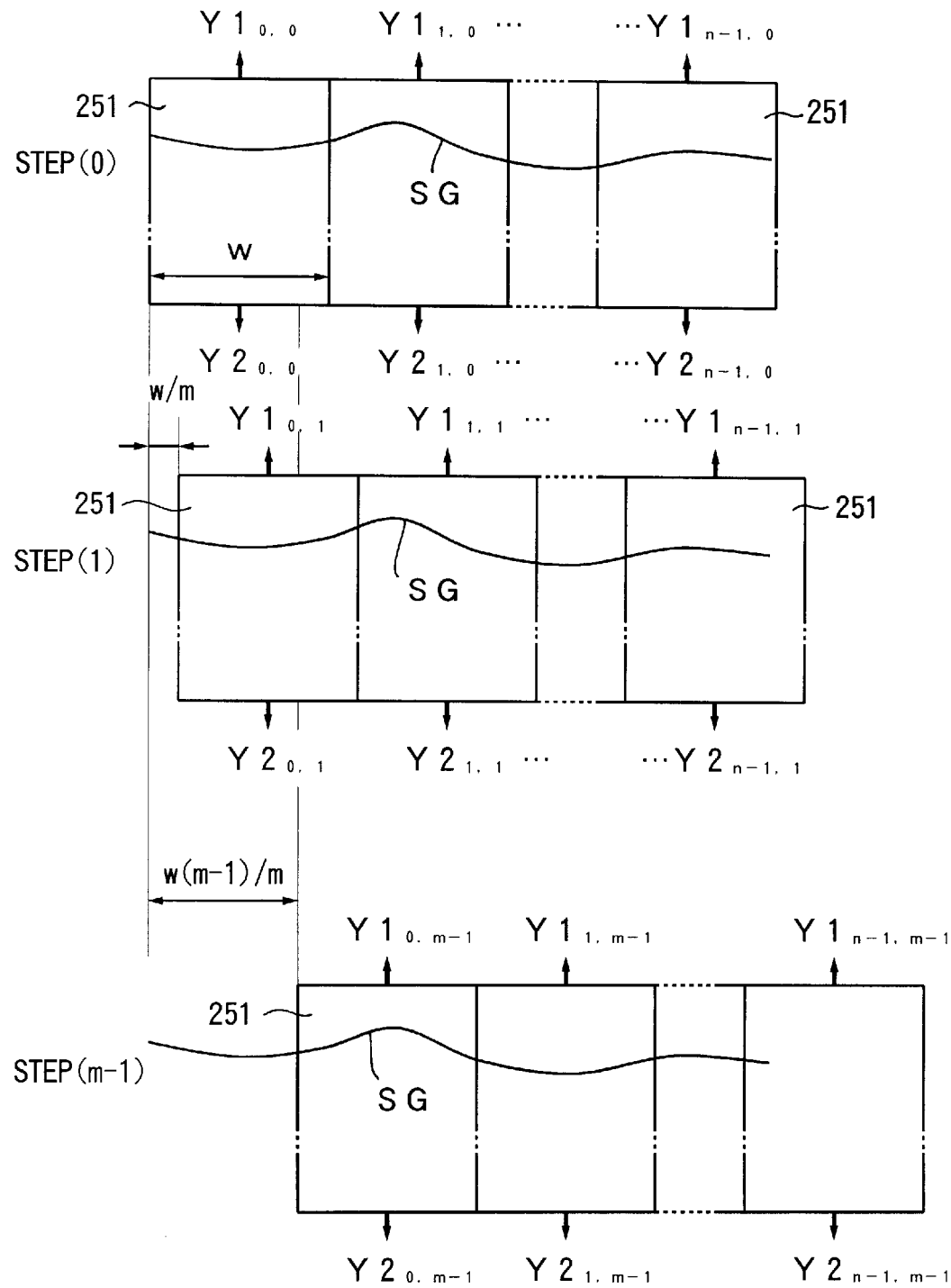
FIG. 40 is a model diagram showing the stepped movement of the PSD array.

FIG. 40 is a model diagram showing a stepped movement of the PSD array 25F.

The PSD array 25F moves stepwise along the direction of main scanning during the scanning period of a line. The moving width is 1/m of the width w of the PSD 251 (m: integer of 2 or more, or 8, for example), and the number of steps per line is m−1. Assume that detection signals $Y1_{j,k}$, $Y2_{j,k}$ (j: 0 to n−1, k: 0 to m−1) are output from the jth PSD 251 at the time point of the kth stepped movement.

Figure 41:
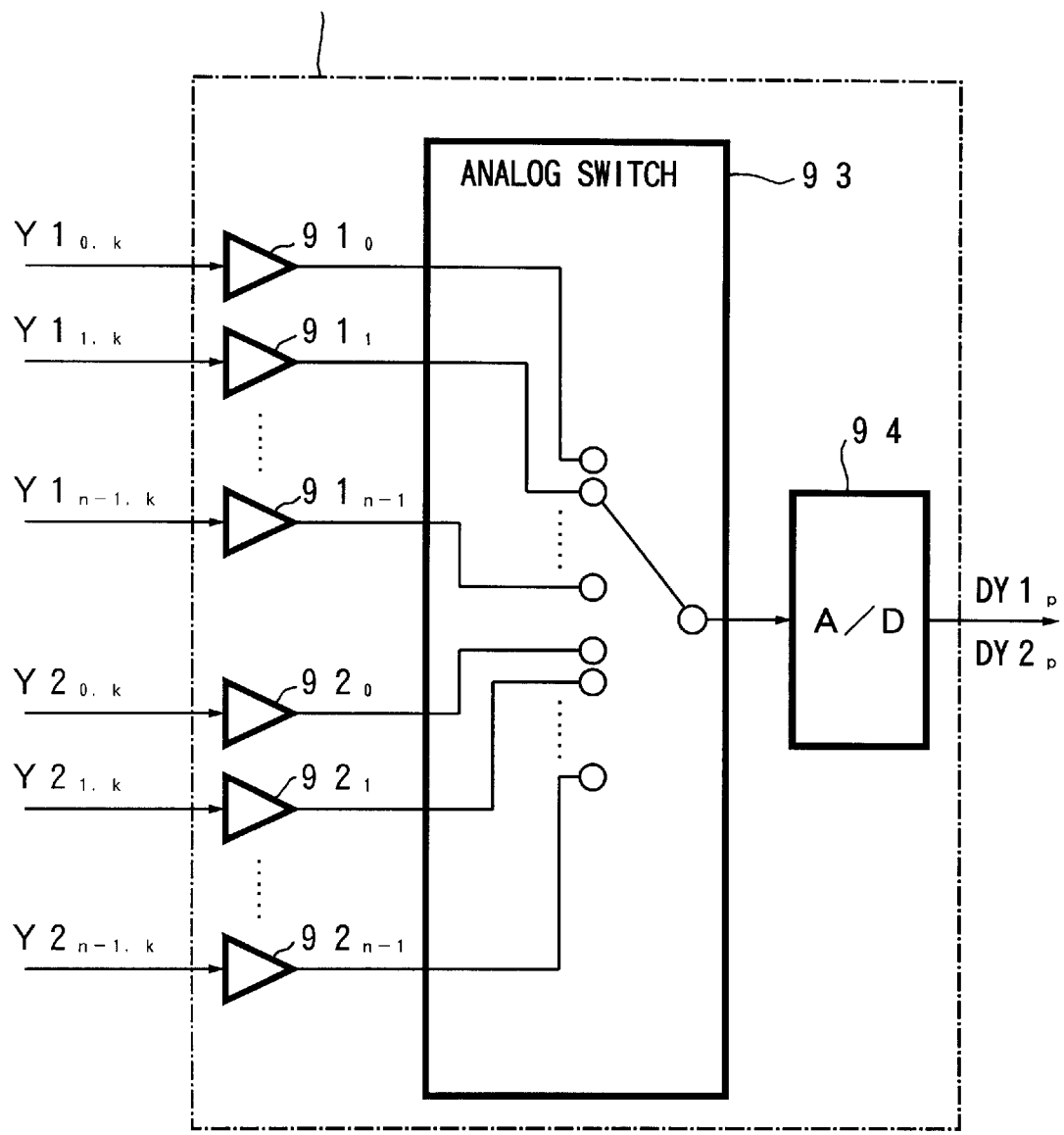
FIG. 41 is a block diagram showing a signal processing circuit.
Figure 42:
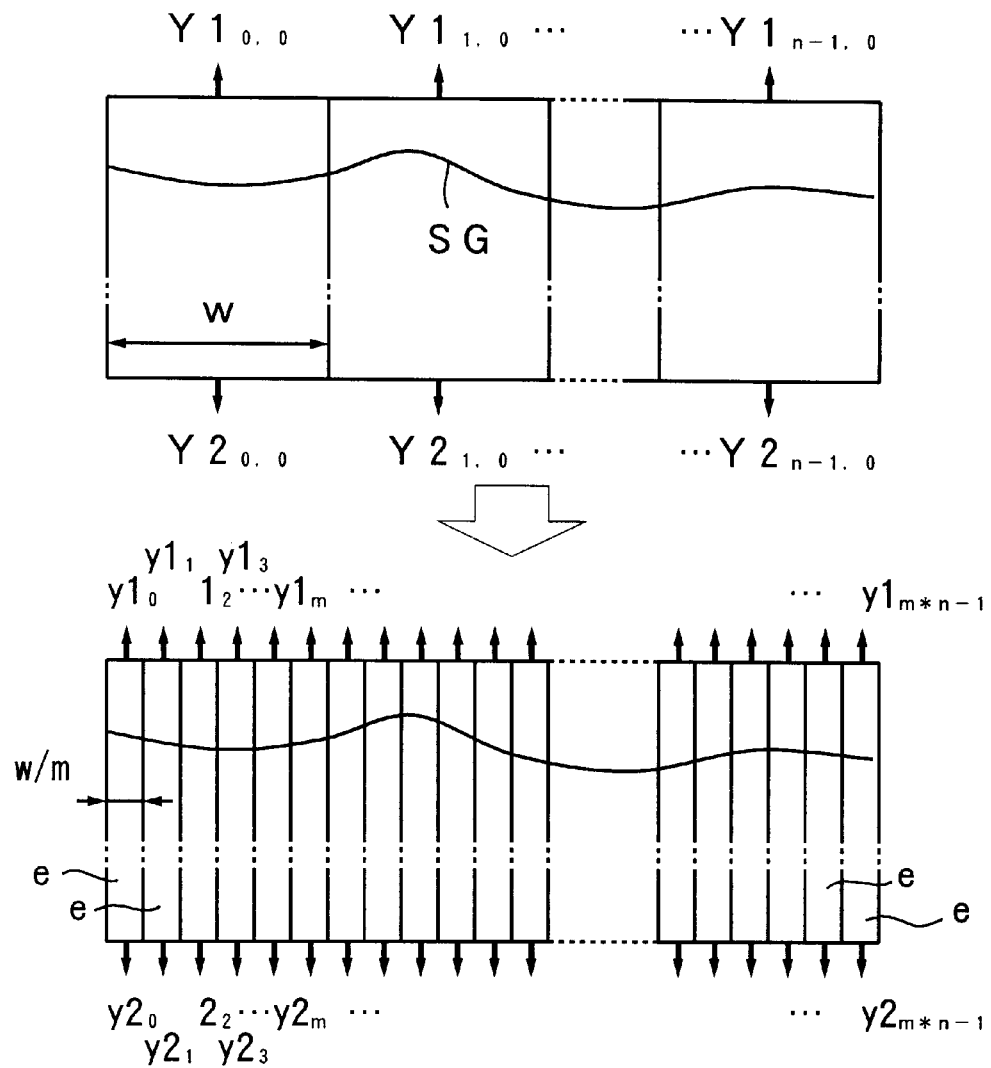
FIG. 42 is a model diagram of an improved-resolution of the photo-detection surface.

FIG. 41 is a block diagram showing a signal processing circuit 90F, and FIG. 42 is a model diagram showing an improved resolution of the photo-detection surface.

The signal processing circuit 90F includes head amplifiers (preamplifiers) 91, 92 for converting the detection signals Y1, Y2 from each PSD 251 into a voltage of predetermined level, an analog switch 93 of selecting a total of 2n outputs of the head amplifiers 91, 92, and an A/D converter 94 for quantizing the detection signals Y1, Y2 selected by the analog switch 93. In each of a total of m stages from the stage (step 0) before the PSD 251 starts moving to the stage (step m−1) at which the PSD 251 makes the (m−1)th movement, the detection signals $Y1_{j,k}$, $Y2_{j,k}$ are input to the signal processing circuit 90 at the same time and sequentially selected by the analog switch 93. The detection signals $Y1_{j,k}$, $Y2_{j,k}$ are then quantized and sent to the CPU 51F sequentially. The CPU 51F stores measurement data for one line including m×n data DY1p (p: 0 to m×n−1) corresponding to the detection signals $Y1_{j,k}$ at step 0 to m−1 and n×m data $DY2_p$ corresponding to the detection signals $Y2_{j,k}$.

In this case, the data $DY1_p$, $DY2_p$ for the area as large as w/m (m: width) constituting one of m subdivisions of the photo-detection surface of the PSD 251 are actually photo-electric conversion information corresponding to the total sum of the detection signals $Y1_{j,k}$, $Y2_{j,k}$ for adjacent m areas. Specifically, as shown in the lower part of FIG. 42, let $y1_p$, $y2_p$ be the detection signals assuming that each area e is an independent photo-detection surface. Then, the detection signal $Y1_{j,k}$ is expressed by the following equation. This is also the case with the detection signal $Y2_{j,k}$.

$$Y1_{j,0} = \sum_{p=j*m}^{(j+1)*m-1} y1_p$$

$$Y1_{j,1} = \sum_{p=j*m-1}^{(j+1)*m} y1_p$$

$$\vdots$$

$$Y1_{j,m-1} = \sum_{p=(j+1)*m-1}^{(j+2)*m-2} y1_p$$

$$(j = 0 \sim n-1)$$

Also, this relation can be expressed by a matrix Y=Ay, where Y is a matrix of (m×n)×1 having $Y1_{j,k}$ as the (m×j+k)th element (j: 0 to n−1, k=0 to m−1), and y is a matrix (m×n)×1 having an element $y_p$ as the pth element(p: 0 to m×n−1). Assume that A is a square matrix (m×n)×(m×n) with $a_{i,j}$ as an element (i, j).

$a_{ij}$=1 (j≤i<j+m)

0 (i<j, i≥j+m)

Assume that the element (i, j) of the left inverse matrix A' of A is $a'_{ij}$.

$a'_{ij}$=1 (i=j+km+1, k: 0 to m−1)

−1 (i=j+km+1, k: 0 to m−1)

0 (other than the above cases)

Using A', the signal component of each area constituting one of m subdivisions of each PSD 251 is determined from y=A'Y and thus the resolution in the main scanning direction can be improved. A' is uniquely predetermined by the number m of steps of movement and the number n of the one-dimensional PSDs 251 arranged. Each time $Y1_{j,k}$, $Y2_{j,k}$ (j: 0 to n−1, k: 0 to m−1) are input at each subsidiary scanning position, the CPU 51F determines $y1_p$, $y2_p$ (p: 0 to m×(n−1)).

For each set of $y1_p$, $y2_p$, $d_p=(y1_p-y2_p)/(y1_p+y2_p)$ is determined, wherein $d_p$ is the displacement between the incidence position of the slit light and the center of the photo-detection surface in the PSD 251. The distance to the object Q is determined from this value of $d_p$ and the control signal of the galvanometer mirror 12 (or the monitor signal for the rotational angle position).

Figure 43:
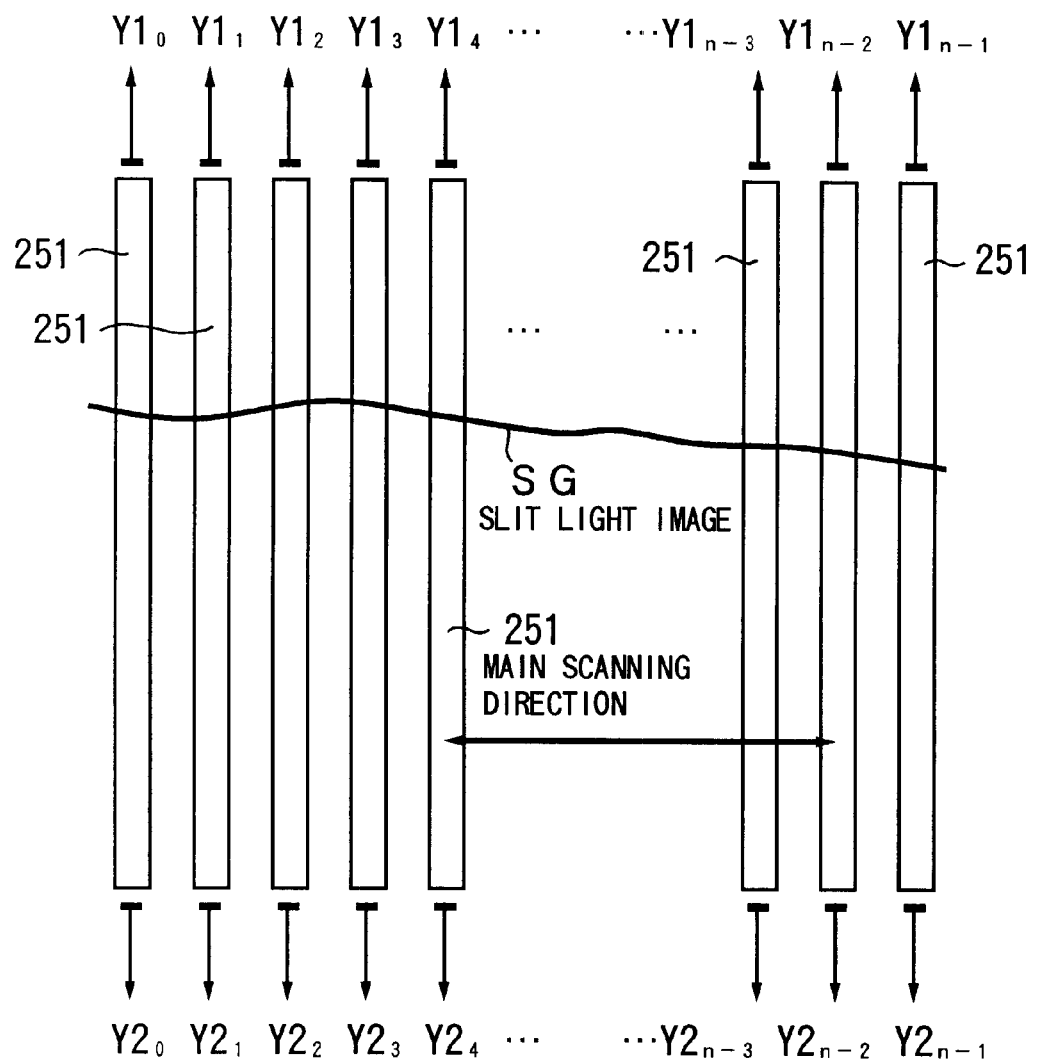
FIG. 43 is a diagram showing a configuration of another example of the PSD array.

FIG. 43 is a diagram showing a configuration of another PSD array 25Fb.

In the example mentioned above, n PSDs 251 are arranged closely at pitches of w. In the PSD array 25Fb of FIG. 43, on the other hand, n PSDs 251 are arranged at predetermined intervals. Also in the configuration of the photo-detection device 25b, the resolution can be improved by stepped movement.

Figure 44:
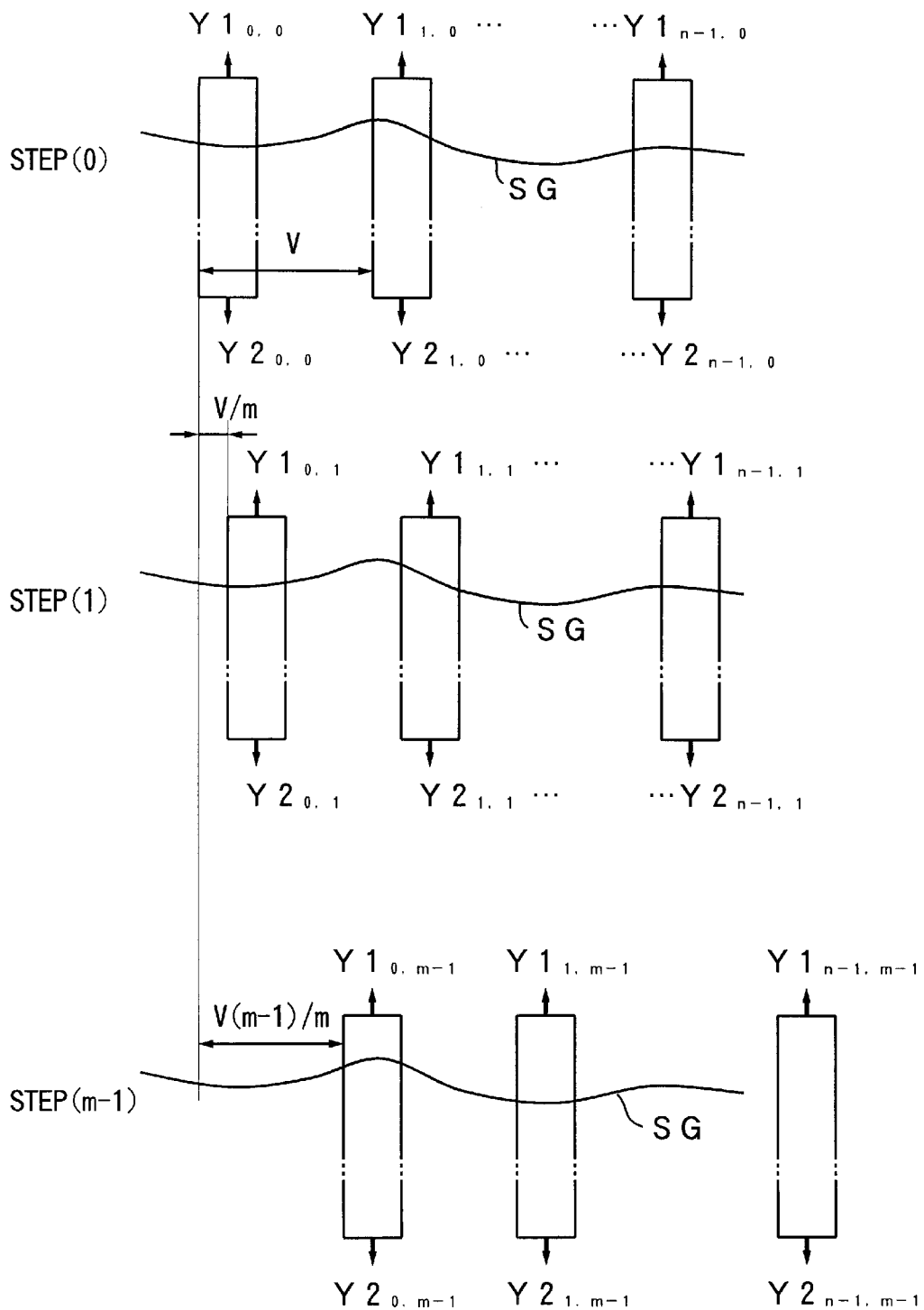
FIG. 44 is a model diagram showing the stepped movement corresponding to the PSD array of FIG. 43.

FIG. 44 is a model diagram showing the stepped movement corresponding to FIG. 43.

The width of the step movement is one-mth of the pitch of arrangement of the PSDs 251, and the number of steps per line is m−1. As in the foregoing case, assume that the detection signals output from the jth PSD 251 at the time point of kth stepped movement are $Y1_{j,k}$, $Y2_{j,k}$ (j: 0 to n−1, k: 0 to m−1).

In the case of this example, $Y1_{j,k}$, $Y2_{j,k}$ represent the position of the slit light image SG in subsidiary scanning direction at each position of the stepped movement. Therefore, the matrix operation is not required unlike in the preceding case.

For each set of $Y1_{j,k}$, $Y2_{j,k}$, $$d_{j,k} = (Y1_{j,k} - Y2_{j,k})/(Y1_{j,k} + Y2_{j,k})$$

is determined. Thus, it is possible to determine the displacement of the slit light image SG from the center of the photo-detection surface at each main scanning position. The distance up to the object Q is determined from this value and the control signal of the galvanometer mirror 12 (or the monitor signal of the rotational angle position).

Figure 45:
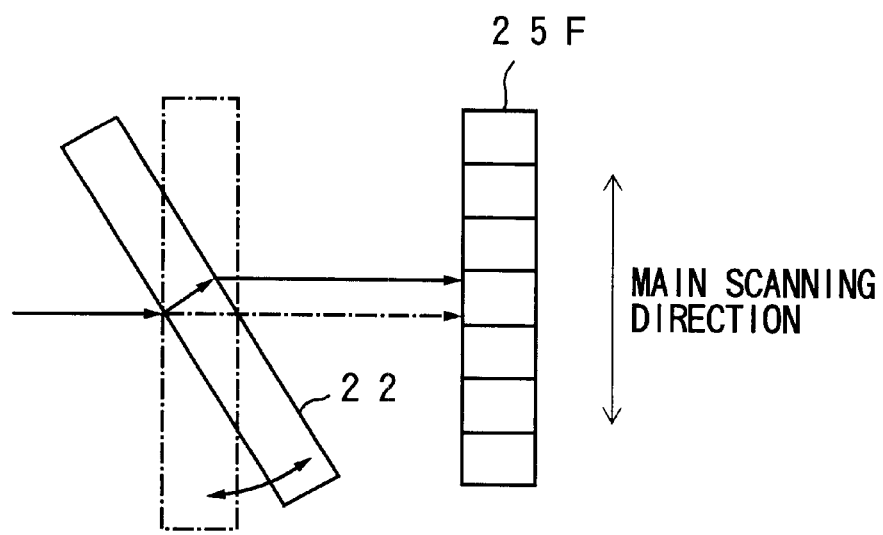
FIG. 45 is a diagram showing a modification of relative movement of the incidence light and the photo-detection surface.

In the fifth embodiment described above, the photo-electric conversion devices 25F, 25Fb are moved to be displaced by a predetermined amount from the slit light image SG. As an alternative, the slit light image SG and the photo-detection surface can be relatively moved by deflecting the incidence light before or after the image-forming lens 21 while the photo-electric conversion devices 25F, 25Fb are fixedly arranged. For example, as shown in FIG. 45, a glass plate 22 is arranged in the incidence light path and rotated finely by a minute angle each time, so that the incidence light axis can be displaced from the photo-detection surface in the main scanning direction.

Also, in place of the slit light shown as reference light, the spot light can be deflected in the main scanning direction. In this case, the signal processing system is configured to scan the same line repeatedly during the period when the photo-detection device is moved.

According to the fifth embodiment, the 3D measurement can be realized with a resolution higher than that of the photo-detection device configuring the 2D photo-detection surface.

What is claimed is:

1. A 3D measuring apparatus comprising:
    a projector for projecting a light beam;
    a scanning system for scanning said light beam in a main scanning direction and a subsidiary scanning direction perpendicular to the main scanning direction, thereby the main scanning being carried out for a predetermined span per step of the subsidiary scanning;
    a photo-detection system for receiving an optical image of an object to be scanned by said scanning system; and
    a controller for controlling said scanning system so as to change said span of the main scanning in accordance with a field of view of said photo-detection system.

2. A 3D measuring apparatus according to claim 1, wherein said photo-detection system captures the received optical image per sampling period, and
    said 3D measuring apparatus further comprises a processing element for changing the sampling period in accordance with the changed span of the main scanning.

3. A 3D measuring apparatus according to claim 1, wherein said photo-detection system outputs a signal corresponding to an angle of incidence of light reflected from said object.

4. A 3D measuring apparatus according to claim 3, wherein
    the scanning system moves a projecting direction of the projector for the scanning, and
    said 3D measuring apparatus further comprises a calculation element for calculating distance data to said object using the trigonometry based on a projection angle of said light beam, the angle of incidence of light reflected from said object to said photo-detection system and the relative positions between and projector and said photo-detection system.

5. A 3D measuring apparatus comprising:
    a projector for projecting a light beam;
    a scanning system for scanning said light beam in a main scanning direction and a subsidiary scanning direction perpendicular to the main scanning direction, thereby the main scanning being carried out for a predetermined breadth per step of the subsidiary scanning direction;
    a photo-detection system for receiving an optical image of an object to be scanned by said scanning system by a predetermined angle of visibility; and
    a controller for setting the breadth of the main scanning and the angle of visibility in association with each other.

6. A 3D measuring apparatus comprising:
    a projector for projecting a light beam;
    a scanning system for scanning said light beam in a main scanning direction and a subsidiary scanning direction perpendicular to the main scanning direction, thereby the main scanning being carried out for a predetermined breadth per step of the subsidiary scanning;
    a photo-detection system for receiving an optical image of an object to be scanned by said scanning system;
    an optical system for leading said optical image to said photo-detection system;
    a detector for detecting a focal distance of said optical system; and
    a controller for controlling said scanning system so as to change said breadth of the main scanning in accordance with the detection by said detector.

* * * * *